United States Patent
Tsiberidis

(10) Patent No.: US 9,604,509 B2
(45) Date of Patent: Mar. 28, 2017

(54) VEHICLE AXLE ASSEMBLY COMPRISING INTEGRATED PRESSURE MEDIUM LINE FOR FILLING TIRES

(71) Applicant: GV ENGINEERING GMBH, Heimsheim (DE)

(72) Inventor: Konstantinos Tsiberidis, Heilbronn (DE)

(73) Assignee: GV ENGINEERING GMBH, Heimsheim (DE)

( * ) Notice: Subject to any disclaimer, the term of this patent is extended or adjusted under 35 U.S.C. 154(b) by 165 days.

(21) Appl. No.: 14/438,702

(22) PCT Filed: Sep. 20, 2013

(86) PCT No.: PCT/EP2013/069599
§ 371 (c)(1),
(2) Date: Apr. 27, 2015

(87) PCT Pub. No.: WO2014/063873
PCT Pub. Date: May 1, 2014

(65) Prior Publication Data
US 2015/0290986 A1 Oct. 15, 2015

(30) Foreign Application Priority Data

Oct. 26, 2012 (DE) .......... 10 2012 021 044
Mar. 1, 2013 (DE) .......... 10 2013 003 562

(51) Int. Cl.
*B60C 23/00* (2006.01)
*F16J 15/00* (2006.01)
(Continued)

(52) U.S. Cl.
CPC .......... *B60C 23/003* (2013.01); *B60B 19/08* (2013.01); *B60C 23/10* (2013.01); *F16J 15/002* (2013.01);
(Continued)

(58) Field of Classification Search
CPC ....... B60C 23/003; B60C 23/10; B60B 19/08; F16J 15/166; F16J 15/324; F16J 15/3216
(Continued)

(56) References Cited

U.S. PATENT DOCUMENTS 3,254,898 A * 6/1966 Herbenar ............. F16J 15/3216
277/558
4,165,085 A 8/1979 Persson
(Continued)

FOREIGN PATENT DOCUMENTS

DE 30 01 056 A1 7/1981
DE 3206488 A1 9/1983
(Continued)

OTHER PUBLICATIONS

Examination Report for corresponding Australian Patent Application No. 2013336975 dated Jul. 13, 2016.
(Continued)

*Primary Examiner* — S. Joseph Morano
*Assistant Examiner* — Jean Charleston
(74) *Attorney, Agent, or Firm* — Carter, DeLuca, Farrell & Schmidt, LLP

(57) ABSTRACT

A vehicle axle assembly includes a hub, which is mounted on a cylindrical axle body so that it can rotate about a central longitudinal axis, and an axially inner and an axially outer shaft sealing ring for indirect or direct sealing between the axle body and the hub. In order to enable an autonomous feed of pressure medium into a vehicle tire, the vehicle axle assembly includes an annular chamber that is formed between the two shaft sealing rings, the axle body and the hub, a first pressure medium line that extends through the axle body or one of the two shaft sealing rings and opens out into the annular chamber, and a second pressure medium line that extends out of the annular chamber through the hub and is designed to be connected to a wheel that is secured on the hub.

36 Claims, 32 Drawing Sheets

Figure 1:
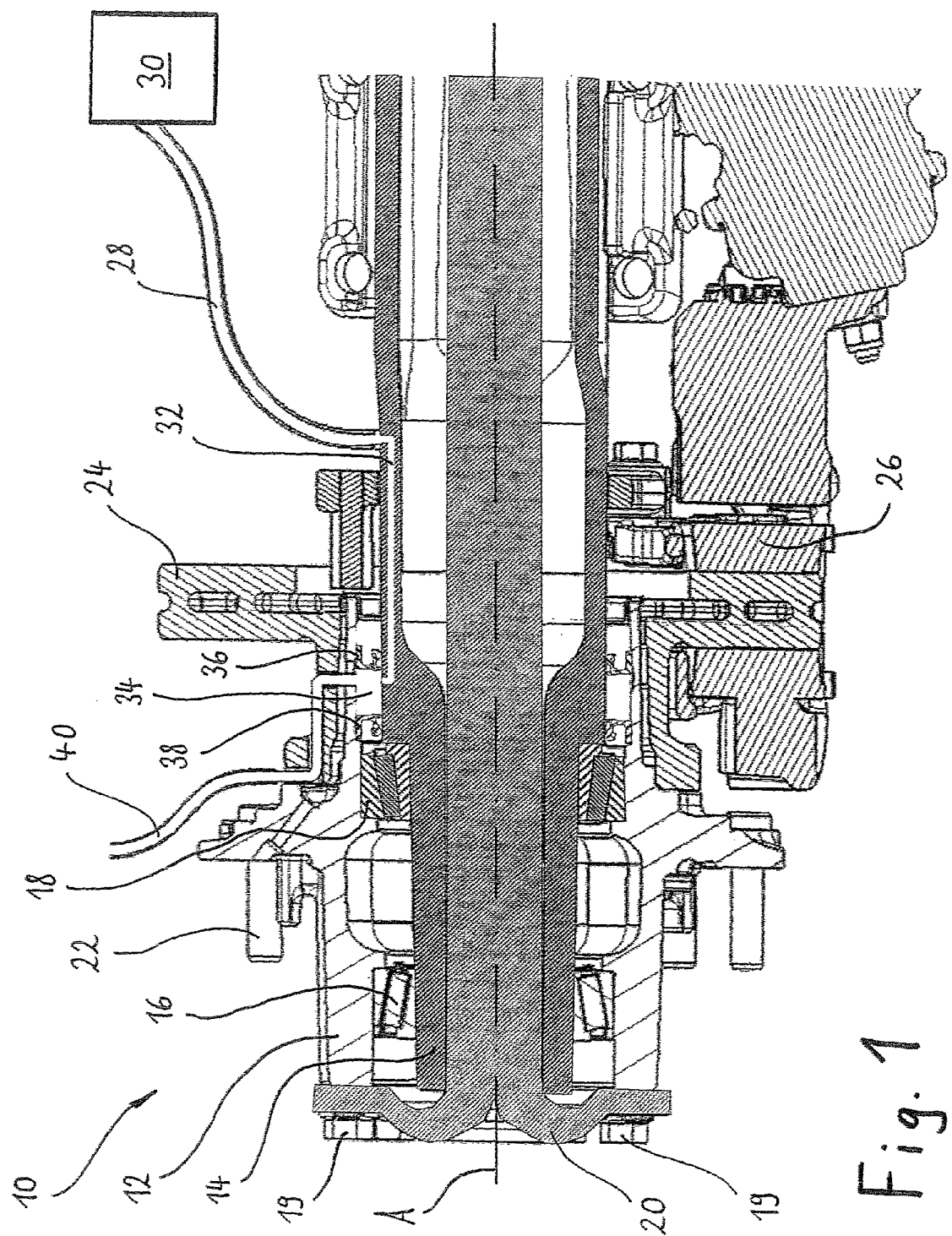

(51) Int. Cl.
| | | |
|---|---|---|
| *F16J 15/16* | (2006.01) | |
| *F16J 15/3216* | (2016.01) | |
| *F16J 15/3236* | (2016.01) | |
| *F16J 15/324* | (2016.01) | |
| *B60B 19/08* | (2006.01) | |
| *B60C 23/10* | (2006.01) | |

(52) U.S. Cl.
CPC .......... *F16J 15/166* (2013.01); *F16J 15/324* (2013.01); *F16J 15/3216* (2013.01); *F16J 15/3236* (2013.01)

(58) Field of Classification Search
USPC .................................. 152/415, 416, 417, 418
See application file for complete search history.

(56) References Cited

U.S. PATENT DOCUMENTS

| | | |
|---|---|---|
| 4,427,201 A | 1/1984 | Belsanti |
| 4,434,833 A | 3/1984 | Swanson et al. |
| 4,804,027 A | 2/1989 | Runels |
| 5,080,157 A * | 1/1992 | Oerter ..................... B25B 23/08 152/417 |
| 5,147,494 A * | 9/1992 | Torii ..................... B60C 23/003 156/417 |
| 7,997,316 B2 * | 8/2011 | Walter .................. B60C 23/003 152/417 |

FOREIGN PATENT DOCUMENTS

| | | |
|---|---|---|
| DE | 690 05 731 T2 | 4/1994 |
| DE | 10 2009 057 158 A1 | 6/2011 |
| EP | 0656267 A1 | 6/1995 |
| EP | 1787830 A1 | 5/2007 |
| EP | 2321561 A1 | 5/2011 |
| FR | 2874671 A1 | 3/2006 |
| WO | 00/15451 A1 | 3/2000 |
| WO | 2007/090361 A1 | 8/2007 |
| WO | 2012/084412 A1 | 6/2012 |

OTHER PUBLICATIONS

International Search Report issued in corresponding application No. PCT/EP2013/069599 on Jun. 11, 2014.
German Search Report issued in corresponding application No. DE 10 2012 021 044.2 on Jul. 15, 2013.

\* cited by examiner

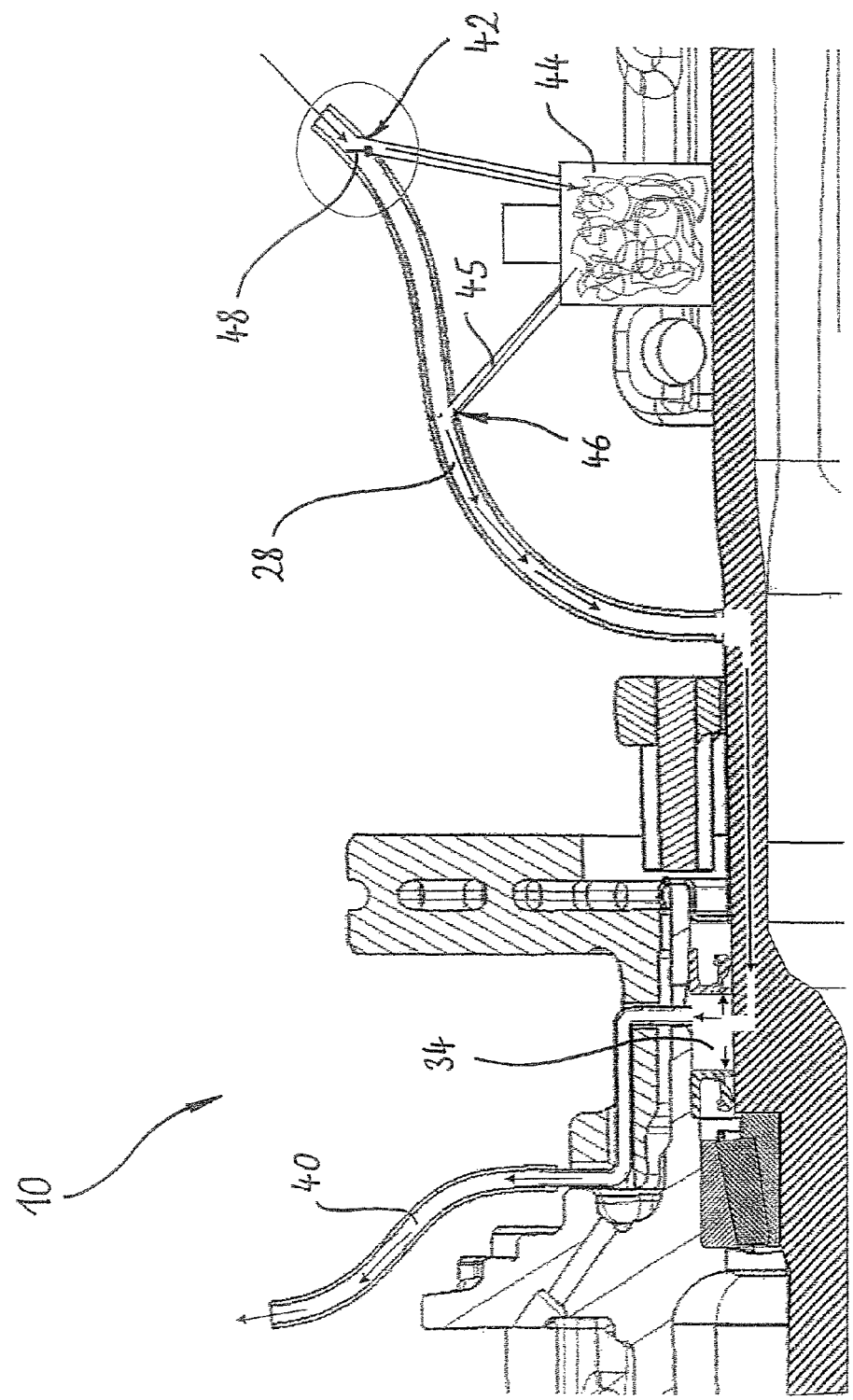

VEHICLE AXLE ASSEMBLY COMPRISING INTEGRATED PRESSURE MEDIUM LINE FOR FILLING TIRES

The present invention relates generally to the field of vehicles with pneumatic tires and in particular to a vehicle axle assembly comprising an integrated pressure medium line for feeding a pressure medium into a tire.

In order to fill a vehicle tire with a pressure medium, normally compressed air, it is known to provide on the vehicle wheel a valve, via which the pressure medium may be introduced into the tire. In cars, trucks or commercial vehicles such valves are conventionally disposed in the region of a wheel rim, on which the tire is mounted, in such a way as to be easily accessible to a person wishing to fill the tire. Typically in this case an—in relation to the vehicle—external pressure medium source is connected to the valve of the tire, conventionally by means of a hose, in order in this way to be able to check and, if need be, correct the tire pressure.

This method of tire pressure regulation fundamentally has the drawback that a regulation may be carried out only at locations where there is a pressure medium source, for example at filling stations, since an attachment to a vehicle-external pressure medium source is always required. In principle it would be desirable to be able to effect a tire pressure regulation autonomously, for example in order in the case of long-distance road haulage to adapt the tire pressure quickly to altered load conditions, road surfaces and ambient temperatures.

The object of the invention is therefore to indicate a solution, by means of which pressure medium may be fed into and removed from a vehicle tire autonomously and preferably also during travel.

Starting from a vehicle axle assembly comprising a hub, which is mounted on a cylindrical axle body so that it can rotate about a central longitudinal axis, and an axially inner and an axially outer shaft sealing ring for indirect or direct sealing between the axle body and the hub, this object is achieved according to the invention by an annular chamber that is formed between the two shaft sealing rings, the axle body and the hub, by a first pressure medium line that extends through the axle body or one of the two shaft sealing rings and opens out into the annular chamber, and by a second pressure medium line that extends out of the annular chamber through the hub and is designed to be connected to a wheel that is secured on the hub.

Such an arrangement has the advantage of enabling a feed of pressure medium from a vehicle-fixed part, namely the axle body, into the hub, which rotates relative to the axle body, and hence into the wheel that rotates about the axle body, without having to provide additional seals for this purpose. This is achieved by providing between the two shaft sealing rings an annular chamber that establishes a connection between the fixed axle body and the rotating wheel that is suitable for conveying a pressure medium.

In order to form the annular chamber, according to the invention a substantially hollow-cylindrical space that is situated between the axle body and the hub is used. The axially inner and the axially outer shaft sealing ring are arranged axially spaced apart from one another in such a way that the annular chamber is formed.

The sealing between the axle body and the hub by means of the shaft sealing rings may in this case be achieved directly or indirectly. In the case of direct sealing, the shaft sealing ring is directly in contact both with the axle body and with the hub, thereby achieving a sealing between the axle body and the hub solely by means of the shaft sealing ring. In the case of indirect sealing, further elements are disposed between the shaft sealing ring and the axle body and/or the hub so that the shaft sealing ring is not directly in contact with the axle body and/or the hub.

In the following, reference is made first to directly sealing shaft sealing rings. The case of indirectly sealing shaft sealing rings will be described later. In the case of directly sealing shaft sealing rings, the annular chamber is delimited by the lateral surface of the cylindrical axle body, the inner surface of the hub facing the lateral surface of the axle body, and the two shaft sealing rings.

The first pressure medium line is provided for conveying a pressure medium, such as for example compressed air, from a pressure medium source situated on board the vehicle into the annular chamber. The pressure medium source may be for example a compressor or a pressure medium container, in which for example compressed air is stored. The first pressure medium line is fixed relative to the axle body. It may be run outside of the axle body and fastened thereto by means of suitable brackets. If the first pressure medium line is run outside of the axle body, it may extend preferably axially through one of the two shaft sealing rings before opening out into the annular chamber. It is equally possible to run the first pressure medium line at least in sections through the axle body, for example through a bore formed in the axle body. The first pressure medium line may then open out directly into the annular chamber, i.e. without passing through one of the shaft sealing rings.

The second pressure medium line is used to convey the pressure medium out of the annular chamber and at its chamber-remote end is designed to be connected to a wheel that is secured on the hub. The second pressure medium line extends out of the annular chamber and may in this case run at least in sections through the hub, for example through a bore in the hub. A wheel secured on the hub may comprise a wheel rim and a tire, which is mounted on the wheel rim and has a valve for attachment of the second pressure medium line. The second pressure medium line may therefore run as far as the tire valve and be attached thereto so that a feed of pressure medium into the tire may be effected. The tire valve may advantageously be configured as a Y-connection to enable a feed of pressure medium selectively through the second pressure medium line or through another feed line, for example through an above-mentioned coupling to an external pressure medium source.

The two shaft sealing rings may be fixed on the hub, for example by means of frictional locking, and upon a rotation of the hub about the axle body may slide along the lateral surface of the axle body. Equally, both shaft sealing rings may be fixed on the axle body and upon a rotation of the hub about the axle body may slide along the inner surface of the hub. If the first pressure medium line opens out into the annular chamber through one of the two shaft sealing rings, then the shaft sealing ring in question has to be fixed relative to the axle body. If the first pressure medium line opens out into the annular chamber through the axle body, then the two shaft sealing rings may be each individually fixed relative to the axle body or relative to the hub.

The described axle assembly is particularly advantageous because in conventional axle assemblies, for example of trucks, there are typically two mutually adjacent shaft sealing rings already provided for guaranteeing sealing of a wheel bearing between the axle body and the hub. The shaft sealing rings are used to prevent lubricant from escaping out of the wheel bearing, on the one hand, and dust or dirt particles from getting into the wheel bearing, on the other hand. In the solution according to the invention these already provided components are simply re-arranged, i.e. spaced axially apart from one another, in order to form between the two shaft sealing rings a coupling space for the two pressure medium lines in the form of the annular chamber. Such a solution is advantageous also because, for example in the case of a truck or commercial vehicle, the vehicle typically already has a pressure medium source in the form of an air compressor for the brake system, which may be used for tire pressure regulation.

When pressure medium is fed through the first pressure medium line an overpressure, i.e. a pressure greater than atmospheric pressure, arises in the annular chamber and strives to press the two shaft sealing rings axially apart from one another. In order to counteract an axial drifting-apart of the two shaft sealing rings, at least one of the two shaft sealing rings, preferably however both, may be provided with a radial collar adjacent to the annular chamber.

If a shaft sealing ring is fixed on the hub, then such a collar may be formed on the shaft sealing ring radially inside. If a shaft sealing ring is fixed on the axle body, then the collar may be formed on the shaft sealing ring radially outside. In this case the collar may be configured in such a way that already at normal pressure, i.e. at approximately atmospheric pressure, it is in contact with the lateral surface of the axle body. It is equally conceivable that the collar at normal pressure is still spaced apart from the lateral surface of the axle body and only upon an overpressure in the chamber deforms elastically in such a way that it come into contact with the lateral surface of the axle body. In both cases the frictional force generated by the collar at the contacted surface leads to an improved axial fixing of the respective shaft sealing ring. Furthermore, on the collar an annular spring element may be additionally provided, the spring action of which further intensifies the frictional force generated at the contacted surface.

The collar may moreover have a sealing lip, which at least in the event of an overpressure in the chamber is in contact with the axle body and/or the hub. The sealing lip may be provided predominantly for the purpose of producing, in addition to the fixing effect of the collar, an even more improved sealing of the annular chamber.

In order to combat even more effectively a possible drifting-apart of the two shaft sealing rings, there may be provided on the lateral surface of the axle body opposite a radially inner collar of a shaft sealing ring an annular groove, into which the collar radially projects. Analogously, there may be provided on the inner surface of the hub opposite a radially outer collar of a shaft sealing ring an annular groove, into which the collar radially projects. In the event of an overpressure in the chamber, the collar is then pressed toward, and supported against, the groove wall so that the shaft sealing ring maintains its axial position.

An axial drifting-apart of the two shaft sealing rings may also be combated by providing on the lateral surface of the axle body a rib, which extends in peripheral direction and against which a radially inner collar of a shaft sealing ring is axially supported at least in the event of an overpressure in the chamber. Analogously, there may be provided on the inner surface of the hub a rib, which extends in peripheral direction and against which a radially outer collar of a shaft sealing ring is axially supported at least in the event of an overpressure in the chamber.

Such a rib may in this case be constructed integrally with the axle body and/or the hub, but may alternatively be formed by a retaining ring or O-ring of elastomer material that is inserted into a groove. According to an embodiment the rib has a substantially rectangular cross section.

A radially inner collar may in turn have a sealing lip, which at least in the event of an overpressure in the chamber is in contact with the axle body or the rib. Analogously, a radially outer collar may have a sealing lip, which at least in the event of an overpressure in the chamber is in contact with the hub or the rib. Such a sealing lip may, in addition to the support function achieved by the interaction of the collar and the rib, bring about an improved sealing of the annular chamber.

According to another configuration, between the two shaft sealing rings on the lateral surface of the axle body an annular flange comprising two flexible, radial side walls is mounted. The first pressure medium line may then open out into the annular chamber in the annular flange between the two side walls. Given such an arrangement, the sealing of the chamber may be effected in that the side walls of the annular flange in the event of an overpressure in the chamber are elastically deformed, i.e. pressed apart from one another and hence pressed axially against a respective one of the shaft sealing rings.

In a development of the previously described configuration, on the inner surface of the hub opposite the annular flange a ring with a U-shaped cross section is fastened, the side walls of which are directed radially inwards and engage over the flexible side walls of the annular flange. The second pressure medium line may then extend through the ring between the side walls thereof into the hub. The sealing of the annular chamber may in this case be effected in that in the event of an overpressure in the chamber the side walls of the annular flange elastically deform and in this case are pressed axially against a respective one of the side walls of the U-shaped ring.

The embodiment just described, comprising an annular flange with two flexible side walls on the lateral surface of the axle body as well as a ring with a U-shaped cross section fastened to the inner surface of the hub, or conversely (U-shaped ring on the axle body and annular flange on the hub), may also be used without the two shaft sealing rings since the annular chamber in this case is already defined by the interaction of the annular flange with the ring having the U-shaped cross section.

An axial drifting-apart of the two shaft sealing rings may also be prevented in that the two shaft sealing rings are coupled axially rigidly to one another. Such a rigid coupling may be achieved for example by mounting one or more rigid connecting elements between the two shaft sealing rings. The two shaft sealing rings may also be manufactured, for example cast, as a unit, wherein at the same time the clearance between both shaft sealing rings that is required for feeding and/or removing tire-filling air, together with the necessary radial through-holes may easily be structurally provided.

In a similar fashion, a drifting-apart of the two shaft sealing rings may be combated by coupling the two shaft sealing rings in an axially flexible manner to one another. A flexible coupling may be realized for example by mounting one or more spring elements between the two shaft sealing rings. The spring element or spring elements in this case may be configured in such a way that they exert a tensile force that combats a drifting-apart of the shaft sealing rings only when an overpressure prevails in the annular chamber. A combination of rigid and flexible coupling of the two shaft sealing rings is also possible, for example in order to allow a defined deformation of a specific region of the shaft sealing rings in axial direction.

According to a further embodiment, at least one of the two shaft sealing rings may be integrated into a ball bearing, which is disposed between the axle body and the hub. In this case, the sealing between the axle body and the hub is achieved, not directly by means of the shaft sealing ring, but only indirectly. Such a shaft sealing ring is preferably disposed between the radially inner race and the radially outer race of the ball bearing in such a way that it forms in the region between the races a sealing outer skin for the ball bearing that prevents dust and dirt particles from getting into the ball bearing and lubricants from escaping out of the ball bearing. The radially inner race of the ball bearing in this case lies flat against the lateral surface of the axle body and is fixed relative to the axle body. The radially outer race of the ball bearing lies flat against the inner surface of the hub and is fixed relative to the hub. In this arrangement the annular chamber at its side facing the ball bearing is accordingly delimited by the integrated shaft sealing ring and by the side faces of the two races facing the annular chamber.

An axial drifting-away of such a shaft sealing ring in the event of an overpressure in the chamber is prevented normally by the fixing of the ball bearing relative to the axle body and the hub. In addition, it is however perfectly feasible in an analogous manner to the previously described shaft sealing rings also to provide a support structure for such integrated shaft sealing rings, for example in the form of a groove or rib on one of the races, against which a respective collar may be supported at least in the event of an overpressure in the annular chamber.

Basically, for forming the annular chamber any desired combinations of indirectly and directly sealing shaft sealing rings are conceivable. Thus, according to an embodiment the annular chamber may be defined between an axially inner, directly sealing shaft sealing ring and an axially outer, indirectly sealing shaft sealing ring. A converse arrangement is also feasible, i.e. a delimitation of the chamber by means of an axially inner, indirectly sealing shaft sealing ring and an axially outer, directly sealing shaft sealing ring. If in a vehicle axle assembly there are two mutually spaced ball bearings with integrated shaft sealing rings, then according to a further embodiment it is possible to form the annular chamber between the two ball bearings, i.e. between two indirectly sealing shaft sealing rings.

Finally, a valve for pressure relief of the annular chamber may also be provided. After a pressure medium feed has been effected, an overpressure in the annular chamber may be reduced thereby in order to prevent both the two pressure medium lines and the annular chamber from being permanently under high pressure.

Further advantageous embodiments of the described vehicle axle assembly result from special configurations of the shaft sealing rings that are described below.

According to an embodiment at least one of the shaft sealing rings, particularly in the region of the collar, may have a core made of a material that stiffens the shaft sealing ring. The core is made more stable than the residual shaft sealing ring material and may be realized for example by means of a metal stiffening ring that is embedded into the shaft sealing ring material. In the event of an overpressure in the chamber the shaft sealing ring, and/or the collar, is stabilized by means of the core and is therefore better able to withstand the pressure in the chamber.

Furthermore, when the core is disposed not only in the collar, it may be provided that a portion of the core that is disposed in the region of the collar is pivotable relative to the rest of the core and/or is arranged in an articulated manner relative to the rest of the core. This may be achieved in that the core has a material weakening, for example as a result of thinner material or cutouts, in the region of the transition from the portion in the collar region to the rest of the core. It is also conceivable for the core to be of a multipart construction so that the portion of the core disposed in the region of the collar is separate from the rest of the core. By virtue of such an arrangement it is guaranteed that in the event of an overpressure in the chamber—despite the stiffening provided by the core—the collar may deform sufficiently to come sealingly into contact with the lateral surface of the axle body and/or the inner surface of the hub.

In all embodiments of the vehicle axle assembly according to the invention at least one shaft sealing ring is used, which seals off the space between the axle body and the hub. Such shaft sealing rings conventionally have a hollow space between their radially outer sealing surface and their radially inner sealing surface. According to an advantageous embodiment of the invention said hollow space may be filled with lubricant, which may gradually pass through suitable outlets out of the shaft sealing ring to the dynamically loaded sealing surface, i.e. to the sealing surface, at which as a result of the rotation of the hub about the axle body a relative movement between the shaft sealing ring and the opposing component surface arises. In this way at this point a permanent lubrication occurs, which markedly reduces the friction load of the seal and hence sharply increases the useful life thereof. In known shaft sealing rings the said hollow space is open in axial direction. Depending on the installation situation the shaft sealing ring therefore has to be modified to the effect that this axial opening of the hollow space is closed in order to prevent the lubricant filling from escaping through this opening.

In advantageous embodiments of the axle assembly according to the invention at least one of the shaft sealing rings has at least one channel, which extends out of an inner hollow space of the shaft sealing ring in substantially radial direction to a peripheral surface of the shaft sealing ring that lies in a region between the collar and a main sealing lip of the shaft sealing ring. Through such a channel lubricant situated in the hollow space may pass to the collar and the main sealing lip and, there, provide permanent lubrication and cooling of the sealing surfaces of the shaft sealing ring on the axle body and/or the hub.

For the purpose of a permanent supply of lubricant the hollow space at the side of the shaft sealing ring remote from the annular chamber may be provided with a cover. An annular cover may be clamped for example between the substantially axially extending limbs of the shaft sealing ring that enclose the hollow space and hence may seal the hollow space in an outward direction. The hollow space may in this case extend continuously in peripheral direction of the shaft sealing ring or only along part of the peripheral direction of the shaft sealing ring. In embodiments, in which the first pressure medium line extends through the shaft sealing ring, the first pressure line may run also through the cover.

The sealed hollow space may be filled with a lubricant and serve as a lubricant depot, which gradually releases lubricant for lubricating and cooling the sealing surfaces of the shaft sealing ring through the at least one channel. Shaft sealing rings with a pre-filled lubricant depot may be prefabricated and fitted as "self-lubricating" shaft sealing rings in a vehicle axle assembly according to the invention.

According to a development in the hollow space there may be a sponge-like foam material, which fills at least part of the hollow space and overlaps the at least one channel. Here, by "sponge-like" is meant in particular a specific absorptive capacity and/or the general ability to absorb liquid and so it is self-evident that, instead of foam material, other materials with comparable properties may be employed. The arrangement of a sponge-like foam material directly in front of and/or above a channel has the effect that lubricant situated in the hollow space of the shaft sealing ring cannot flow off immediately through the channel but is initially absorbed and stored by the foam material before then being released gradually into the channel. An intermediate space between the collar and the main sealing lip may also be filled at least partially with a sponge-like foam material. Lubricant that passes out of the hollow space of the sealing ring through the at least one channel into this intermediate space may then be absorbed by the foam material and then distributed thereby uniformly to the sealing surfaces on the lateral surface of the axle body and/or the inner surface of the hub. Preferably the foam material fills the entire hollow space formed between the collar, the main sealing lip and the axle body and/or the hub and is in contact in particular with the collar, the main sealing lip and the axle body and/or the hub in order to provide an appropriate lubrication and cooling of the sealing surfaces of the shaft sealing ring.

Furthermore, an inner hollow space of the axially outer shaft sealing ring and an inner hollow space of the axially inner shaft sealing ring may be connected to one another by at least one line. Such a line allows lubricant to pass from one hollow space into the other, with the result that lubricant situated in one hollow space may be distributed to both hollow spaces. In the case of shaft sealing rings that are rigidly coupled to one another, the line may be run through connecting elements disposed between the shaft sealing rings. If the two shaft sealing rings are manufactured as a unit, the line may be run through portions that connect the two shaft sealing rings to one another.

The line may extend in axial direction. In order to achieve a better transport of lubricant in particular from one hollow space into the hollow space of the other shaft sealing ring—which may be necessary if only one of the two hollow spaces stores lubricant and this lubricant is to be used also to lubricate the other shaft sealing ring —, the line may also ascend radially and/or extend obliquely counter to the main direction of rotation of the hub from one shaft sealing ring in the direction of the other shaft sealing ring. In this way, in the case of shaft sealing rings with a radially inner collar, i.e. shaft sealing rings, which upon a rotation of the hub about the axle body co-rotate with the hub, the centrifugal forces acting in the shaft sealing rings are utilized. Since the lubricant upon a rotational movement of the shaft sealing rings is pressed radially outwards because of centrifugal force, it may flow comparatively easily through a radially ascending line. Similarly, the lubricant owing to its inertia is moved more slowly than the shaft sealing rings, so that it may also flow comparatively easily through a line extending counter to the main direction of rotation of the shaft sealing rings. In the case of shaft sealing rings with an axially outer collar that are locked against rotation relative to the axle body, such centrifugal forces do not arise. Nevertheless, here too a course of the line that ascends radially from the one shaft sealing ring in the direction of the other shaft sealing ring may guarantee a better transport of lubricant, because here the lubricant as a result of gravity has a tendency to collect in the part of the hollow space of a shaft sealing ring that is close to the base. The lubricant may then flow off easily through a radially ascending line (which in the region of the shaft sealing rings that is close to the base has a descending course from the one shaft sealing ring to the other shaft sealing ring) from the hollow space of the one shaft sealing ring into the hollow space of the other shaft sealing ring.

If there is a sponge-like foam material in the hollow spaces of the two shaft sealing rings, the foam material fills the hollow spaces preferably in such a way that the openings of the line are not covered by the foam material, so that lubricant can flow unimpeded through the line. In a concrete embodiment the foam material may have for example a closing surface that extends in axial direction and lies on the far side of an inlet- and/or outlet opening of the line. At the closing surface, moreover, an axially extending partition provided with through-openings may be provided in the shaft sealing ring and subdivide the hollow space into a part, which is filled with foam material, and a part, which is free of foam material and serves as a lubricant depot. The foam material is in communication with the lubricant depot via the through-openings.

According to a further aspect the object mentioned in the introduction is achieved by a vehicle axle assembly comprising a hub, which is mounted on a cylindrical axle body so that it can rotate about a central longitudinal axis. Disposed on an inner surface of the hub is an annular profile with a U-shaped cross section, the side walls of which extend axially or radially. Disposed between the side walls is a sealing ring, which is locked against rotation relative to the axle body and in the annular profile delimits an annular chamber. A first pressure medium line extends through the sealing ring and opens out into the annular chamber. A second pressure medium line, which extends out of the annular chamber through the annular profile and the hub, is designed to be connected to a wheel that is secured on the hub.

This embodiment of the vehicle axle assembly allows the formation of an annular chamber without the two shaft sealing rings. Instead, the annular chamber is delimited only by the annular profile, which is connected to the inner surface of the hub, and the sealing ring, which is disposed between the side walls of the annular profile.

The annular profile connected to the inner surface of the hub may be configured as a separate part, which is fastened to the inner surface of the hub, but it may also be formed integrally with the hub, for example cast together with the hub body if the hub is a cast part.

As in the case of the vehicle axle assembly first described, a feed of pressure medium leads in the annular chamber to an overpressure that, here, strives to press the sealing ring axially out of the annular profile.

In order to counteract such a pressing-out of the sealing ring, a bracket may be provided, which in the case of axially extending side walls of the annular profile fixes the axial position of the sealing ring and in the case of radially extending side walls of the annular profile fixes the radial position of the sealing ring. Such a bracket may be realized for example in the form of a stop on the first pressure medium line close to where this line opens out into the annular chamber, against which stop the sealing ring is supported axially in the case of axially extending side walls of the annular profile and radially in the case of radially extending side walls of the annular profile. A support may also be provided on the annular profile, for example in the form of a peripheral rib that is formed on the inside of a side wall or both side walls of the annular profile. Furthermore, the sealing ring adjacent to the annular chamber may be provided, in the case of axially extending side walls of the annular profile, radially inside and radially outside and/or, in the case of radially extending side walls of the annular profile, axially inside and axially outside with a collar, which at least in the event of an overpressure in the chamber is pressed against the side walls of the annular profile and as a result of the thus arising frictional force contributes, in the case of axially extending side walls, to an axial fixing of the sealing ring and/or, in the case of radially extending side walls, to a radial fixing of the sealing ring. In the case of axially extending side walls of the annular profile, the radially inner and the radially outer collar may also be axially supported positively in the annular chamber and, in the case of radially extending side walls of the annular profile the axially inner and the axially outer collar may be radially supported positively in the annular chamber, for example against a support structure that is disposed on the inside of the side walls of the annular profile. Such a support structure may be configured analogously to the first-described vehicle axle assembly, for example in the form of a groove or rib, against which the respective collar may be supported at least in the event of an overpressure in the annular chamber.

As in the case of the first-described vehicle axle assembly further advantageous embodiments arise as a result of special configurations of the sealing ring. Thus, here too the provided sealing ring, particularly in the region of at least one of the two collars, may have a core made of a material that stiffens the sealing ring, and a portion of the core disposed in the region of a collar may be pivotable and/or disposed in an articulated manner relative to the rest of the core. Furthermore, the sealing ring may have at least one channel, which extends out of an inner hollow space of the sealing ring, in the case of an annular profile with axially extending side walls, in substantially radial direction and/or, in the case of an annular profile with radially extending side walls, in substantially axial direction to a peripheral portion of the sealing ring that lies in a region between a collar and a main sealing lip of the sealing ring. Furthermore, the hollow space at the side of the sealing ring remote from the annular chamber may be provided with a cover and the thus sealed hollow space may be filled with a lubricant that may be gradually released to lubricate the sealing surfaces of the sealing ring. There may moreover be disposed in the hollow space a sponge-like foam material, which fills at least part of the hollow space and overlaps the at least one channel. An intermediate space between the collar and the main sealing lip may likewise be filled at least partially with a sponge-like foam material.

With all of the previously described embodiments an autonomous tire pressure regulation may be represented. Here, by "tyre pressure regulation" is meant on the one hand a tire pressure regulation that ensures the observance of a desired tire pressure on request or also automatically, and on the other hand a desired change of tire pressure in order to adapt the tire pressure for example to altered conditions (load, temperature etc.,), or also a combination of both. In order to realize an automatic tire pressure regulation, use may be made of signals of sensors or detectors that in any case already exist in many vehicles for the purpose of for example varying the split of braking force between a front axle and a rear axle of a vehicle as a function of load. What may be evaluated for this purpose are for example signals of an apparatus that indicate the extent of the load-dependent spring deflection of a rear axle of a vehicle, or signals that indicate the pressure in pneumatic spring elements of an axle, or a signal of an electric plug-in connector of a trailer coupling that communicates that a trailer is attached to the vehicle, etc.

Figure 3A:
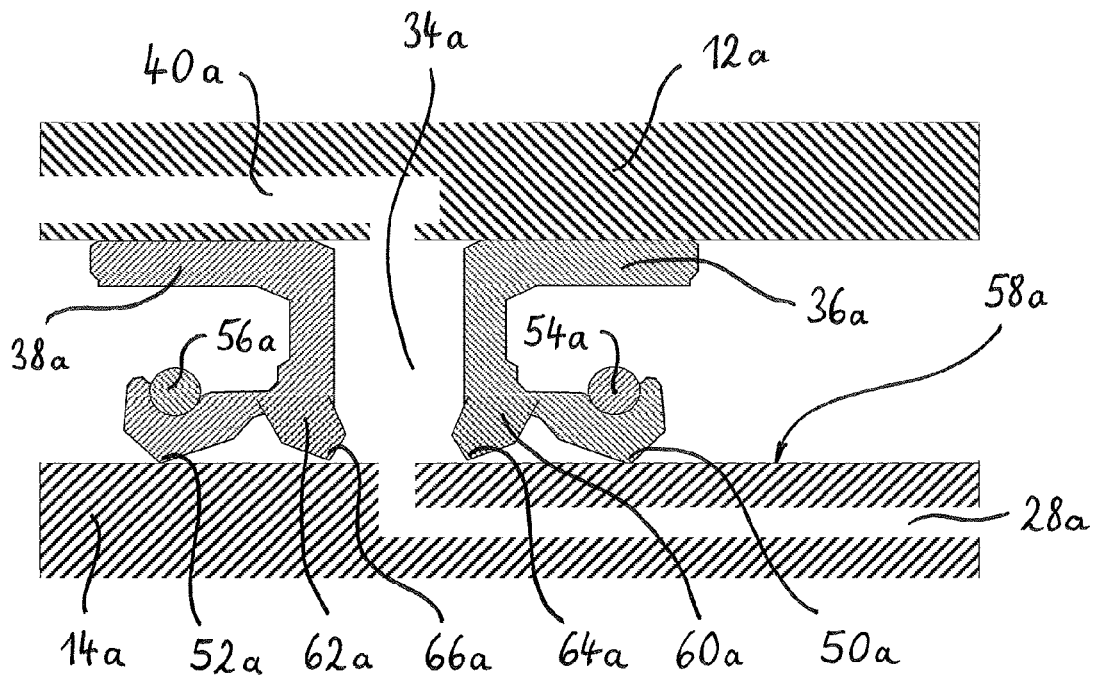
Figure 3B:
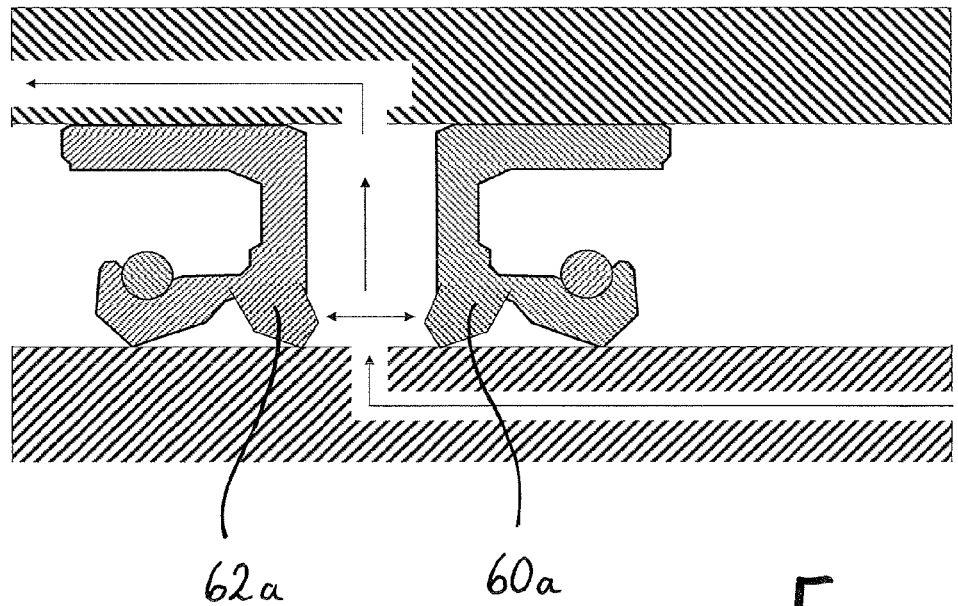
Figure 4A:
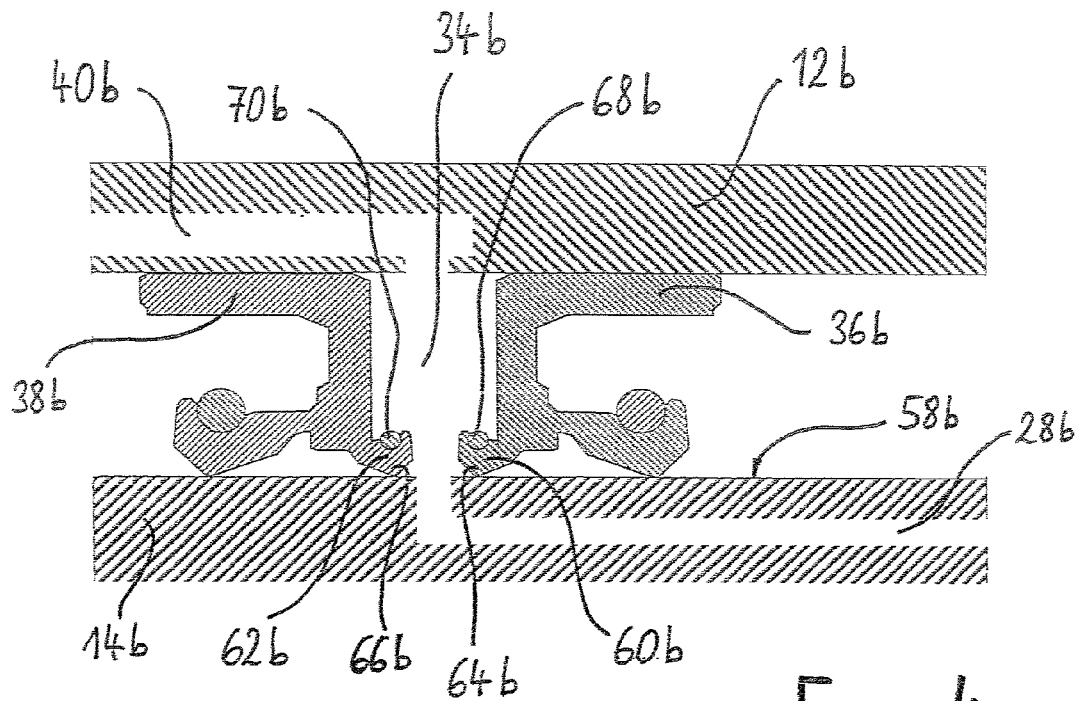
Figure 4B:
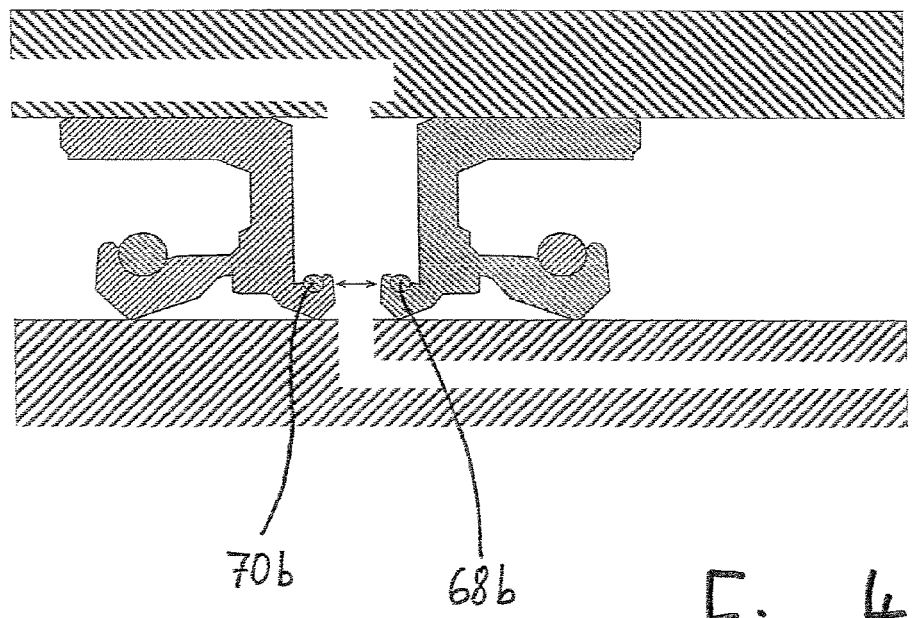
Figure 5A:
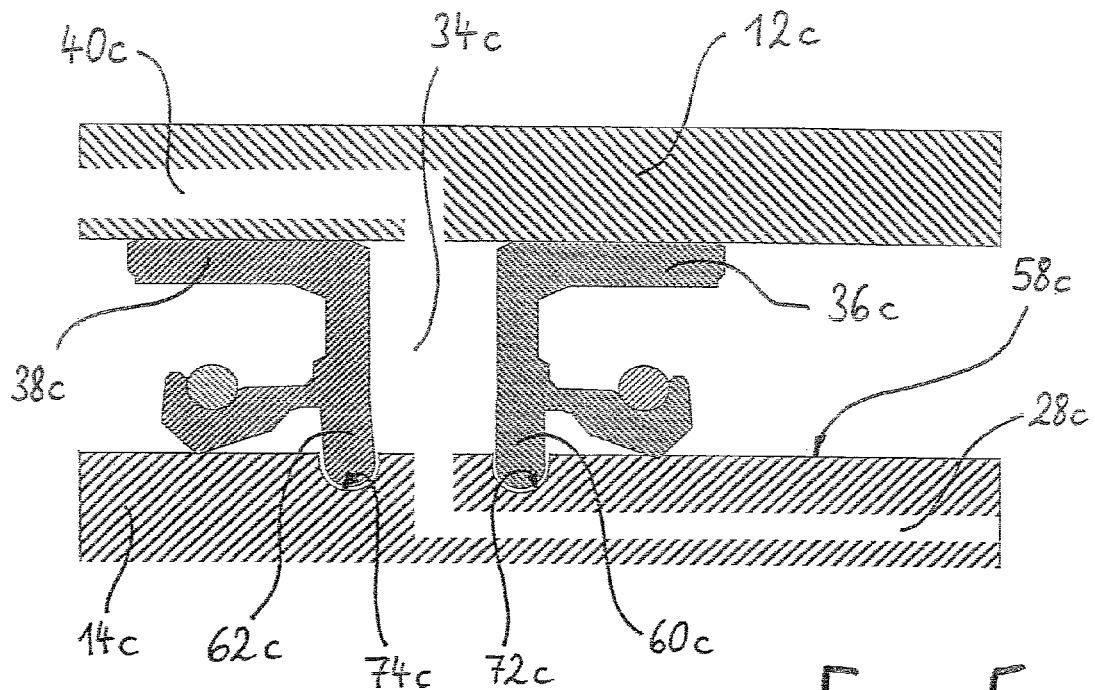
Figure 5B:
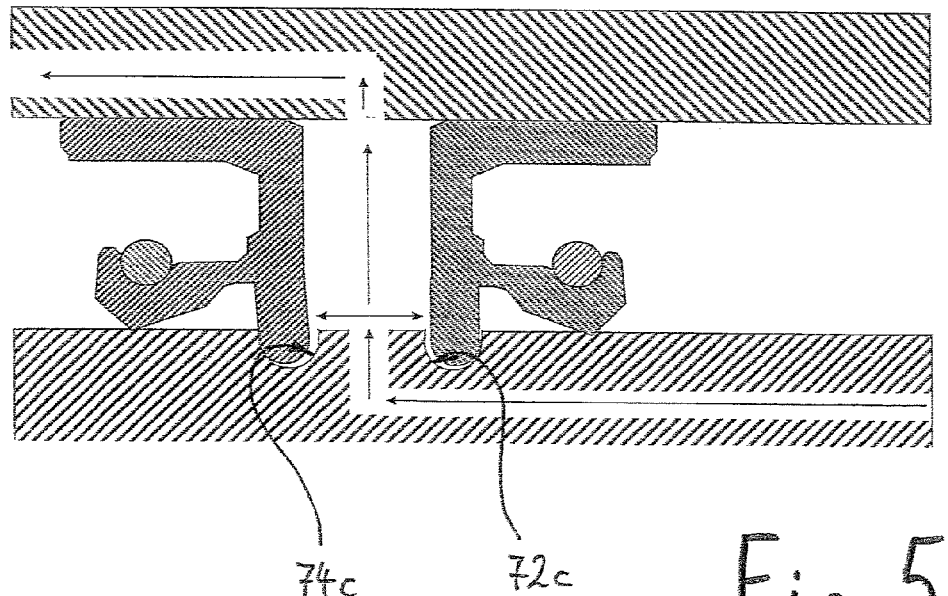
Figure 6A:
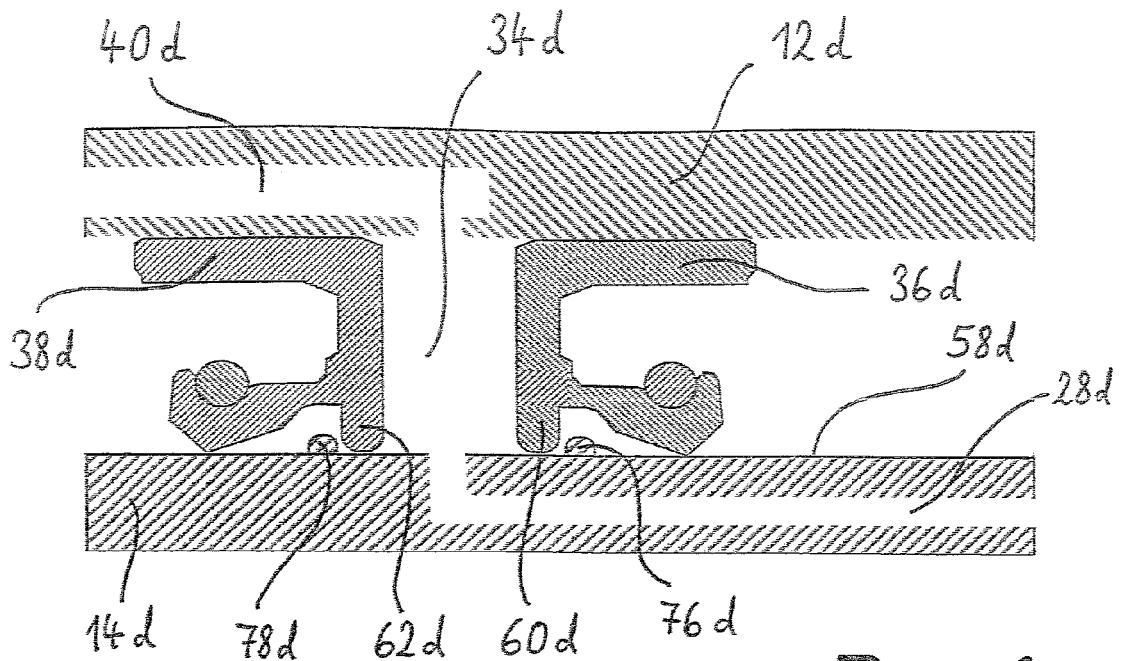
Figure 6B:
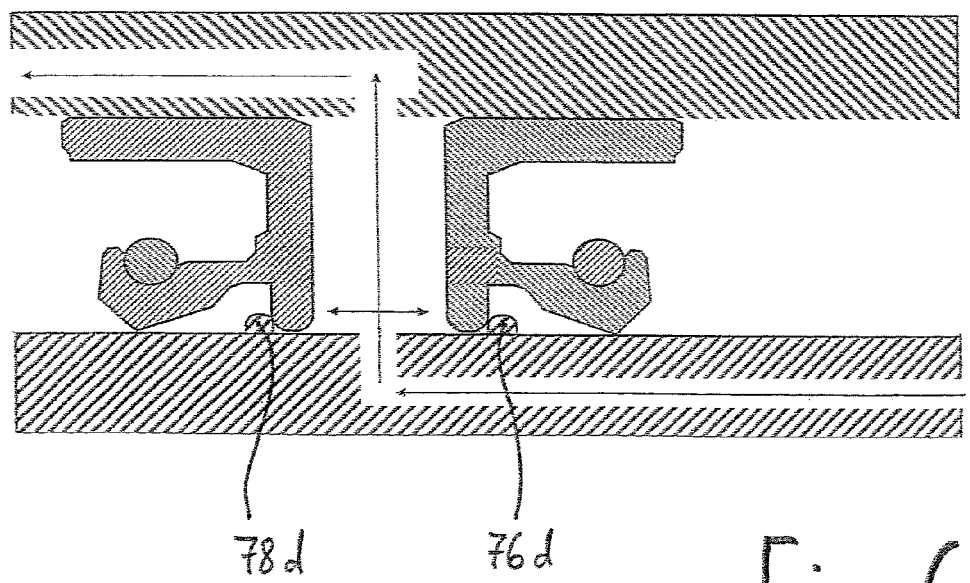
Figure 7A:
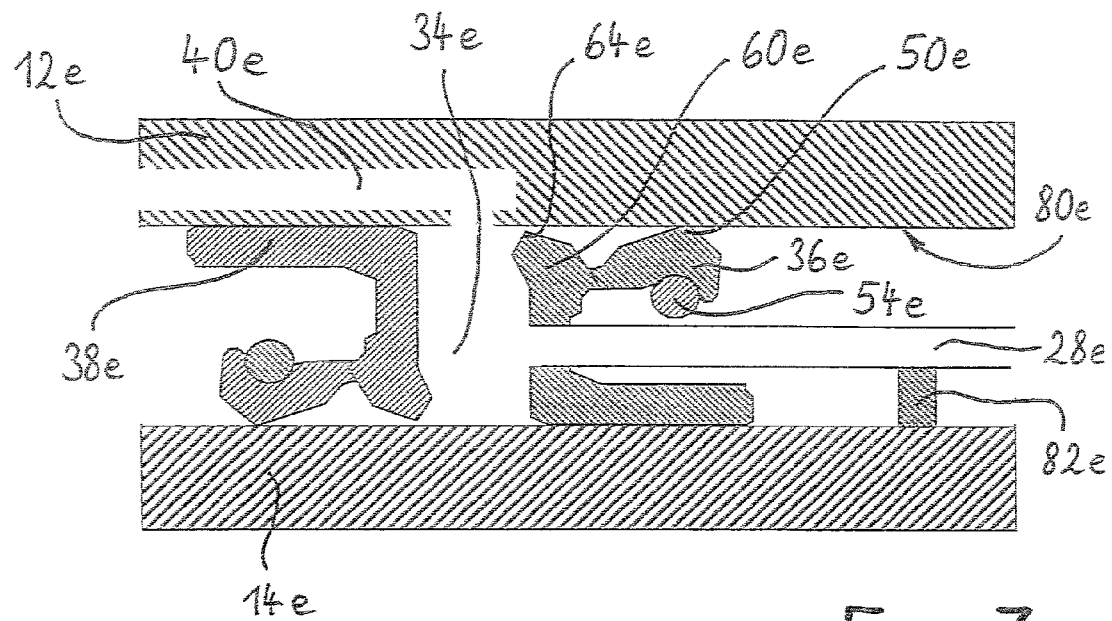
Figure 7B:
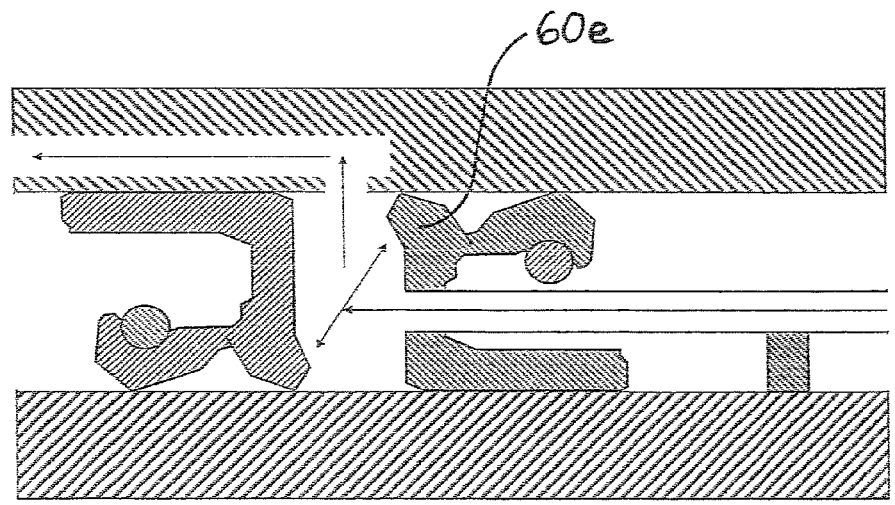
Figure 8A:
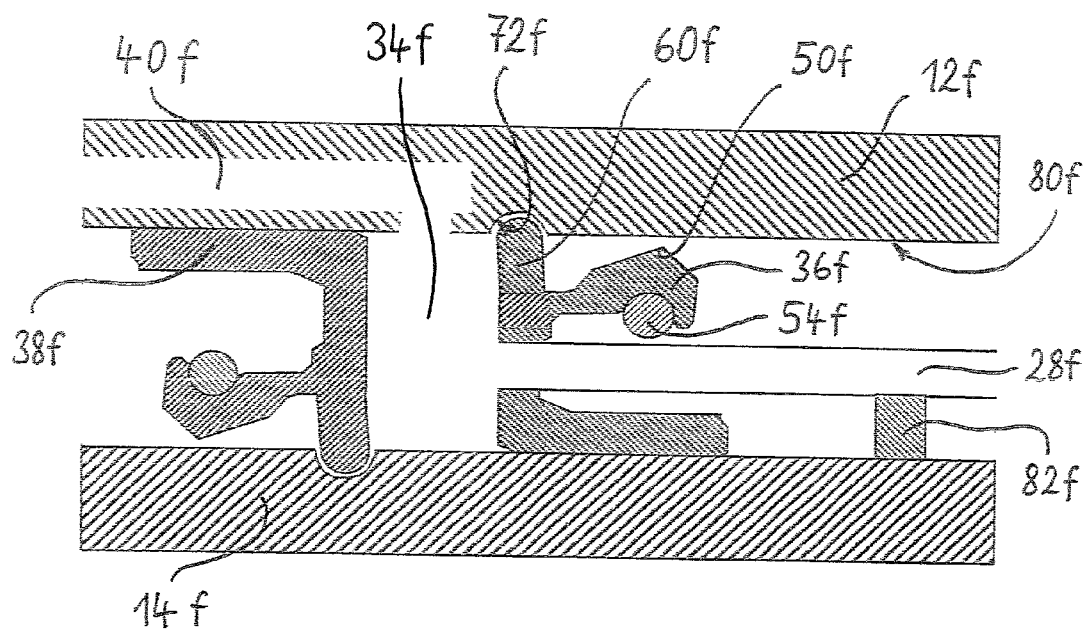
Figure 8B:
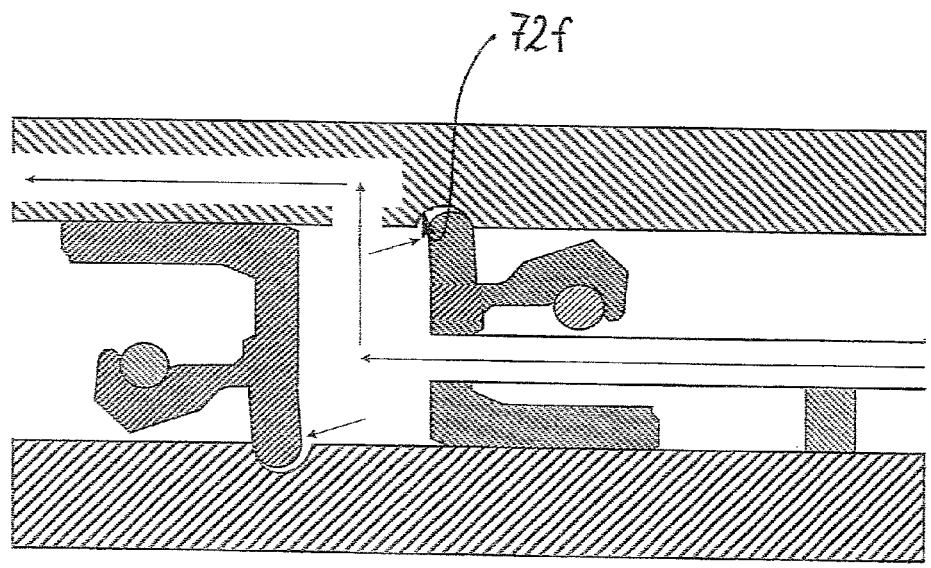
Figure 9A:
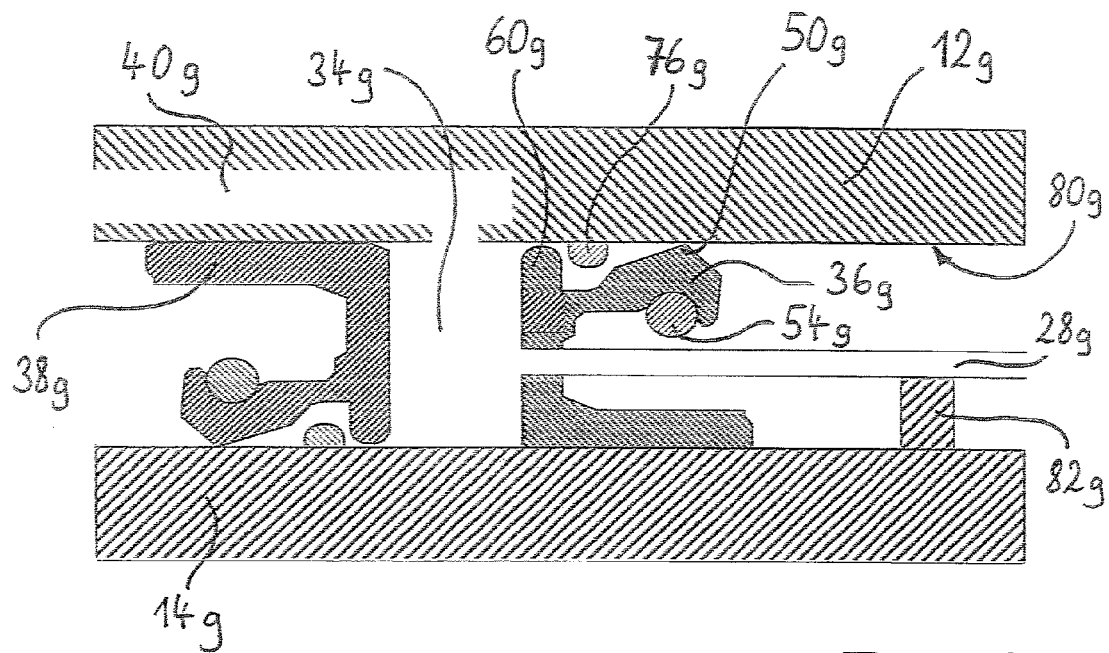
Figure 9B:
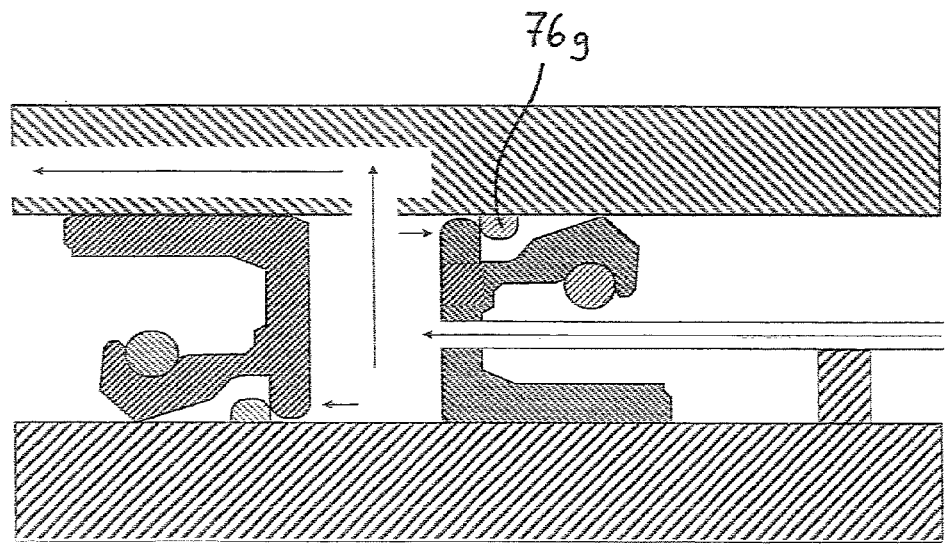
Figure 10A:
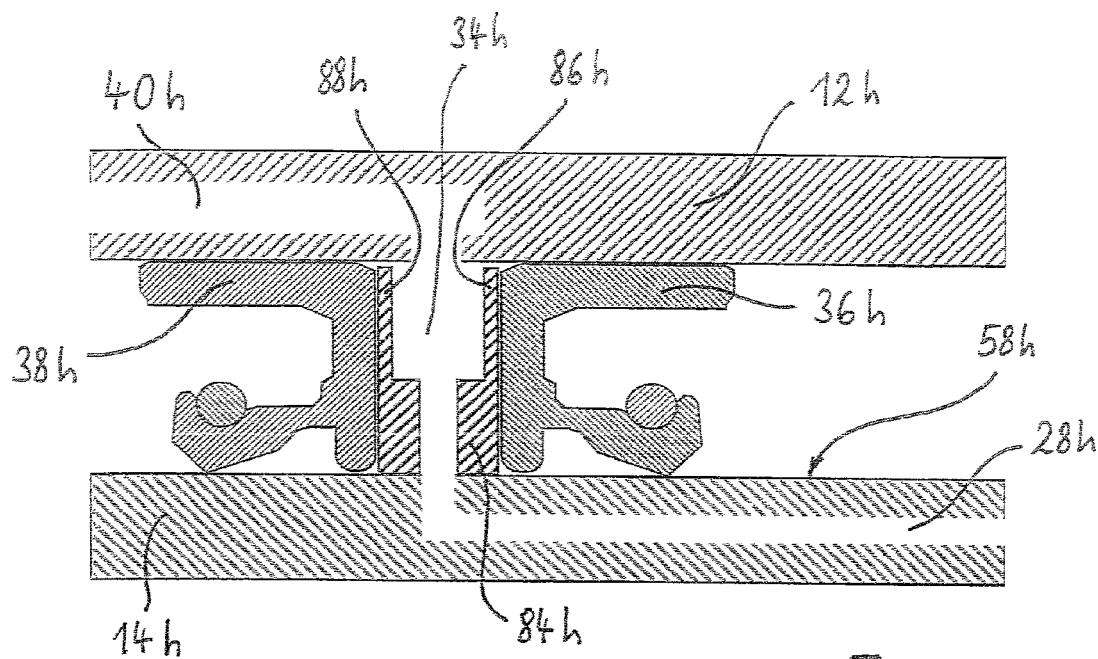
Figure 10B:
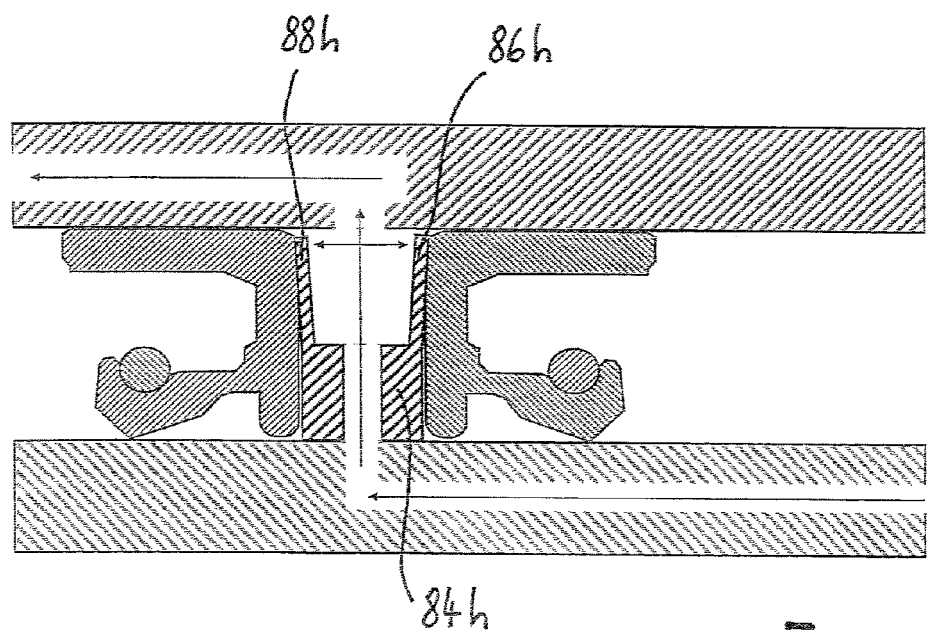
Figure 11A:
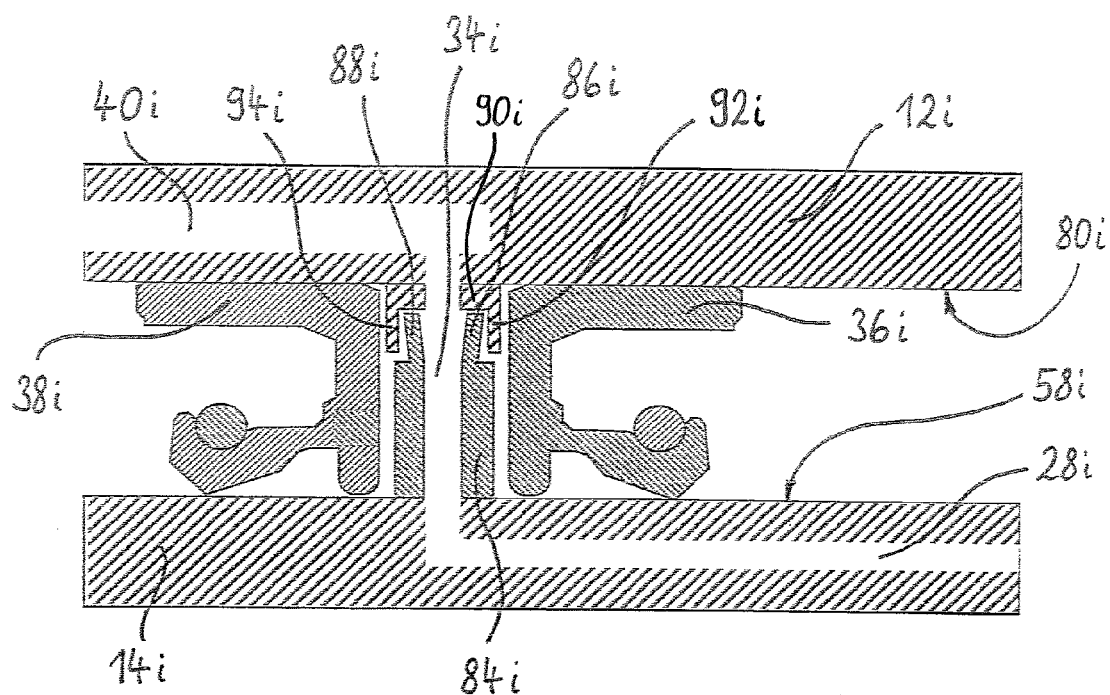
Figure 11B:
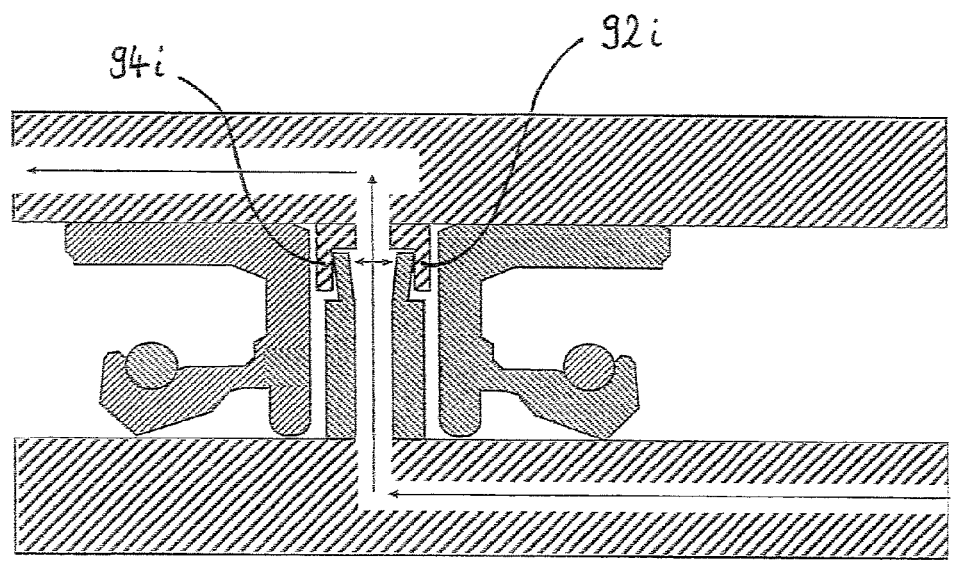
Figure 12A:
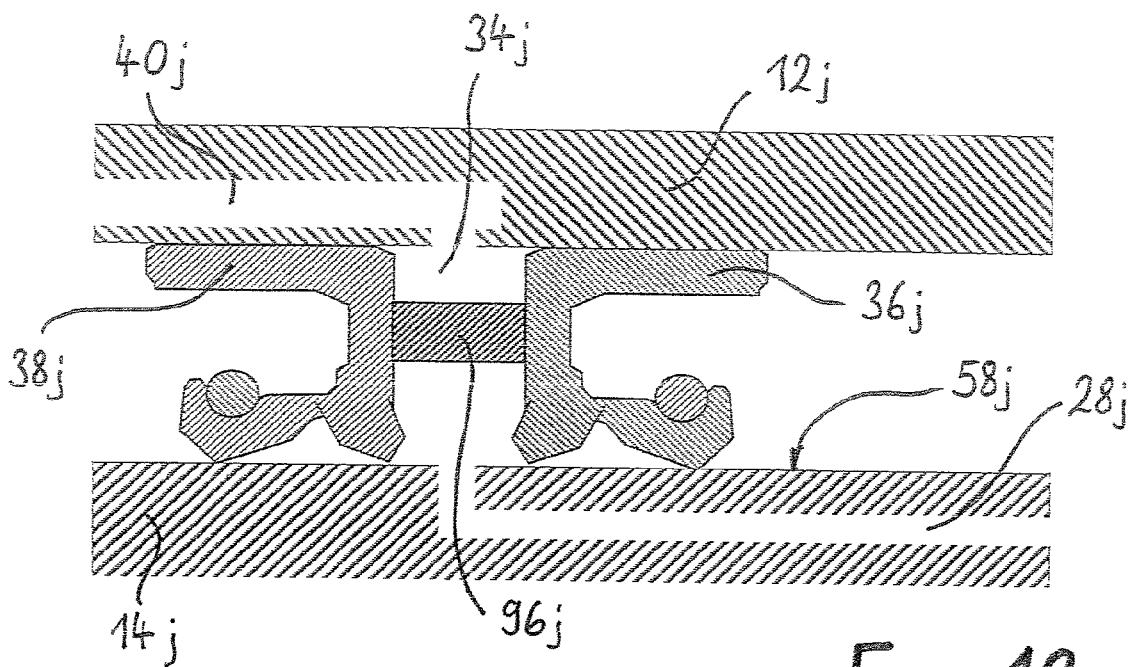
Figure 12B:
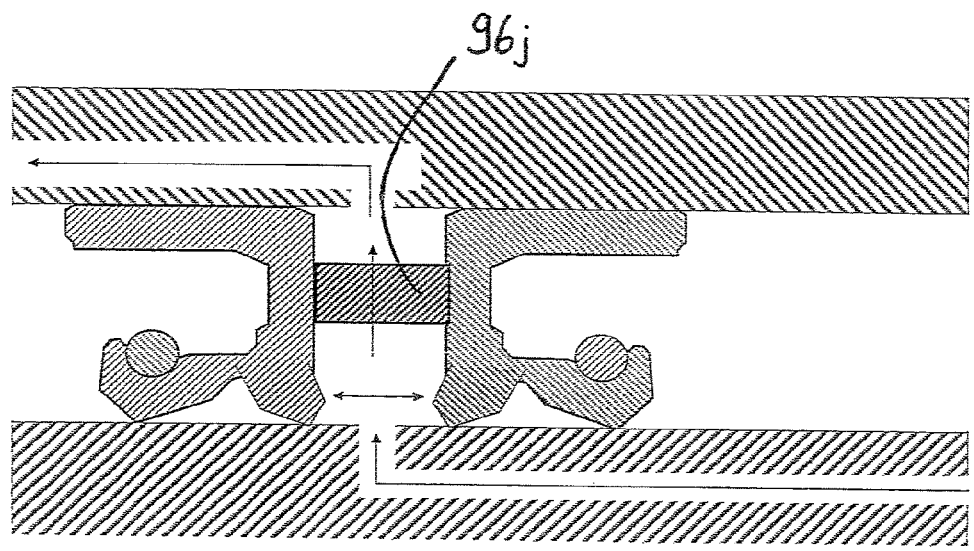
Figure 13A:
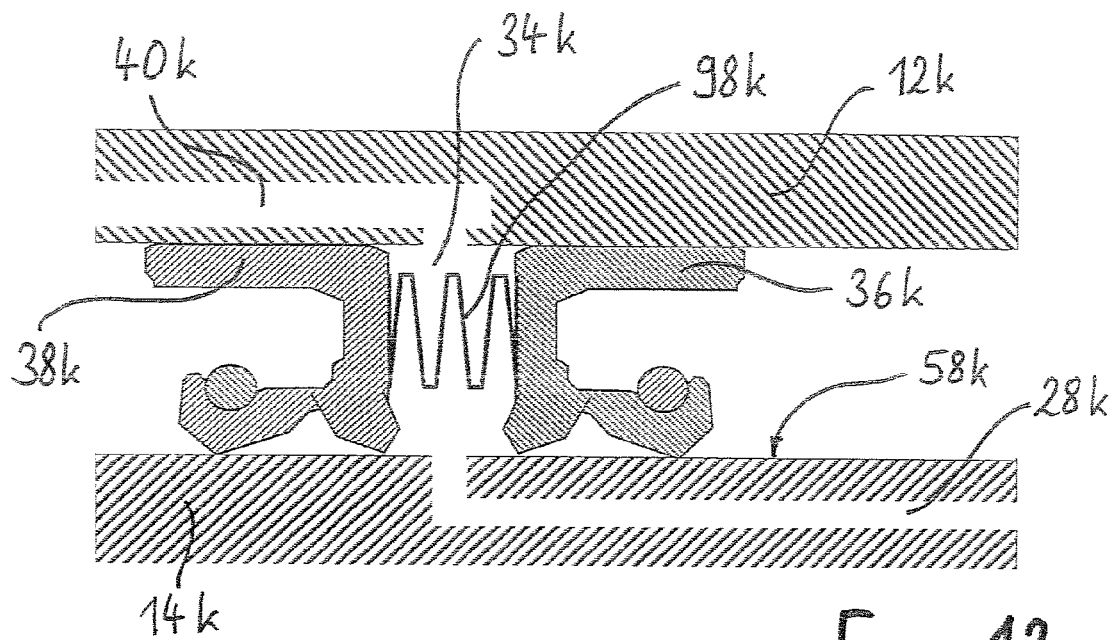
Figure 13B:
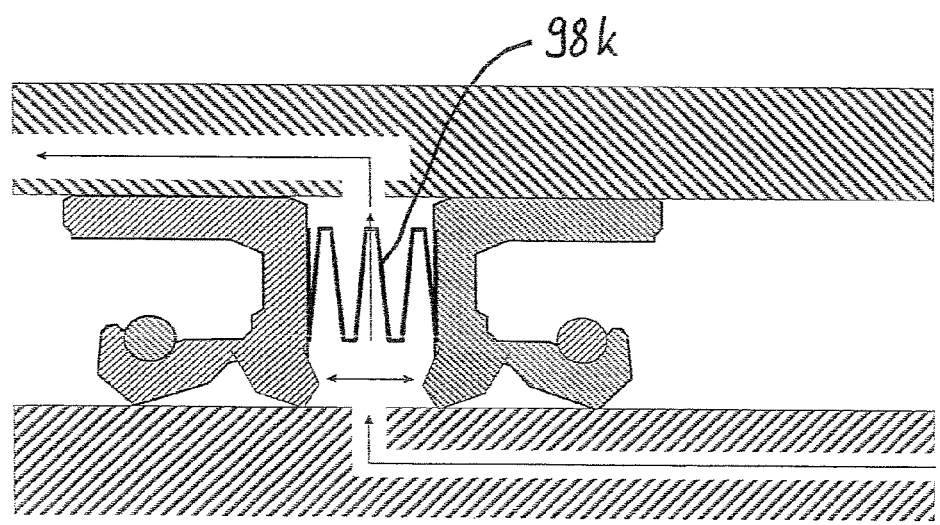
Figure 14A:
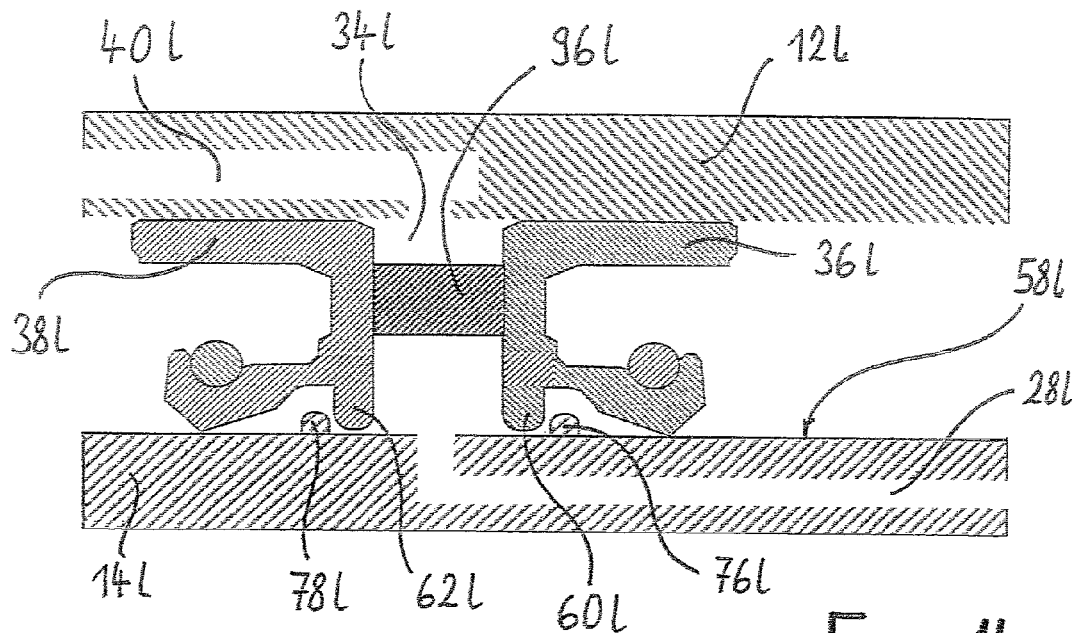
Figure 14B:
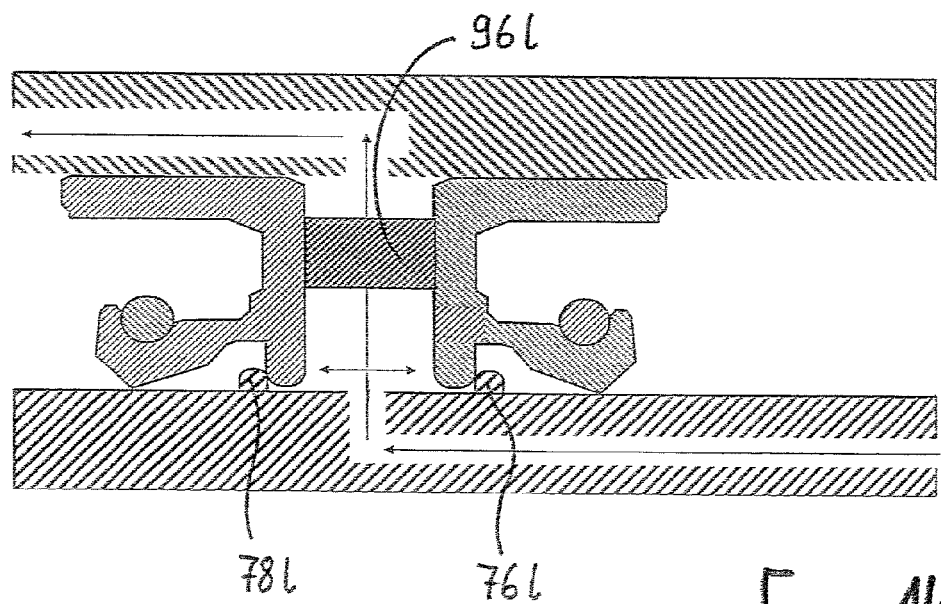
Figure 15A:
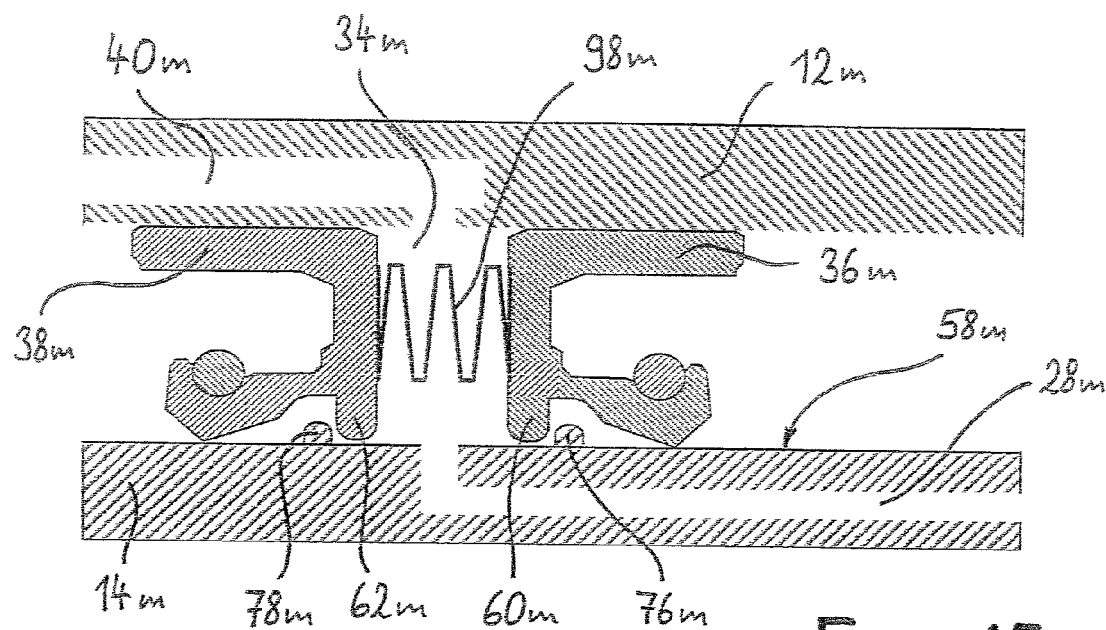
Figure 15B:
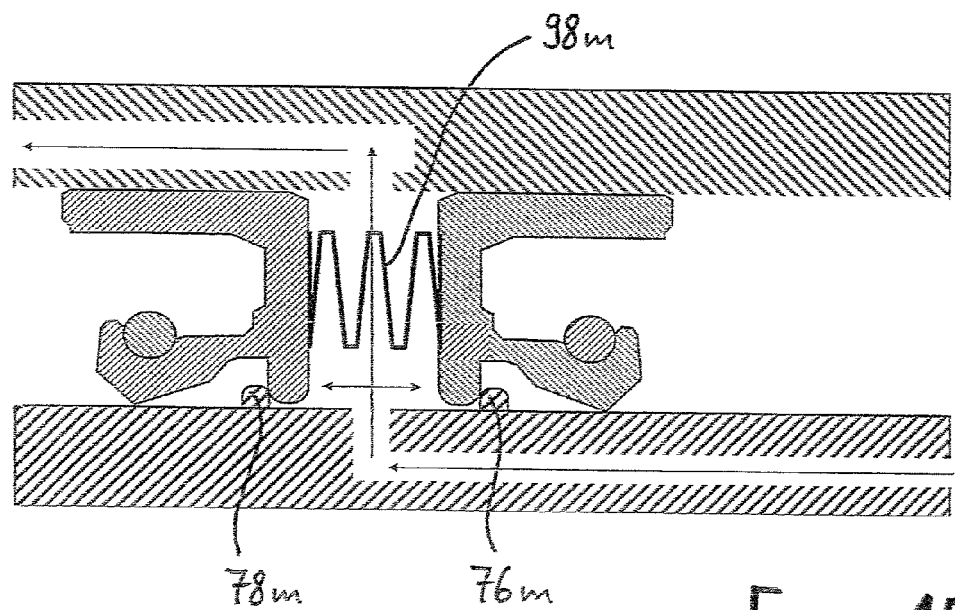
Figure 16A:
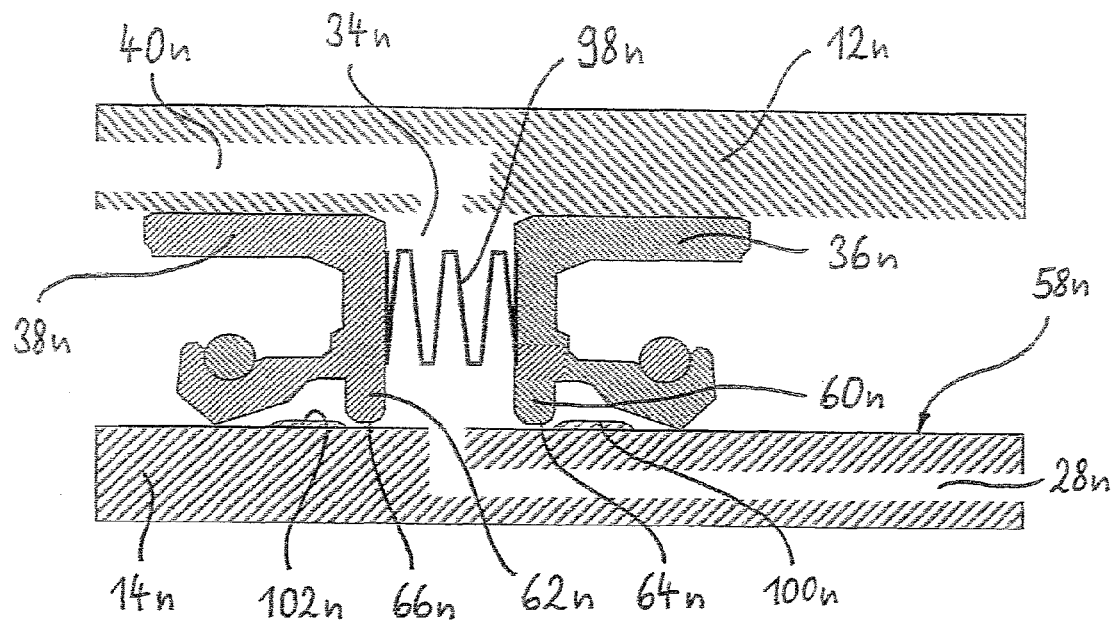
Figure 16B:
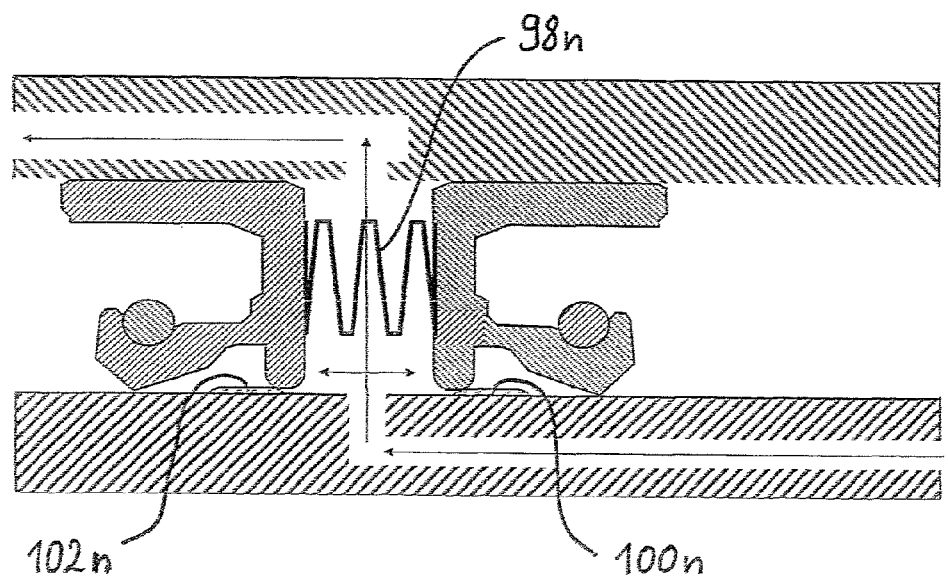
Figure 17A:
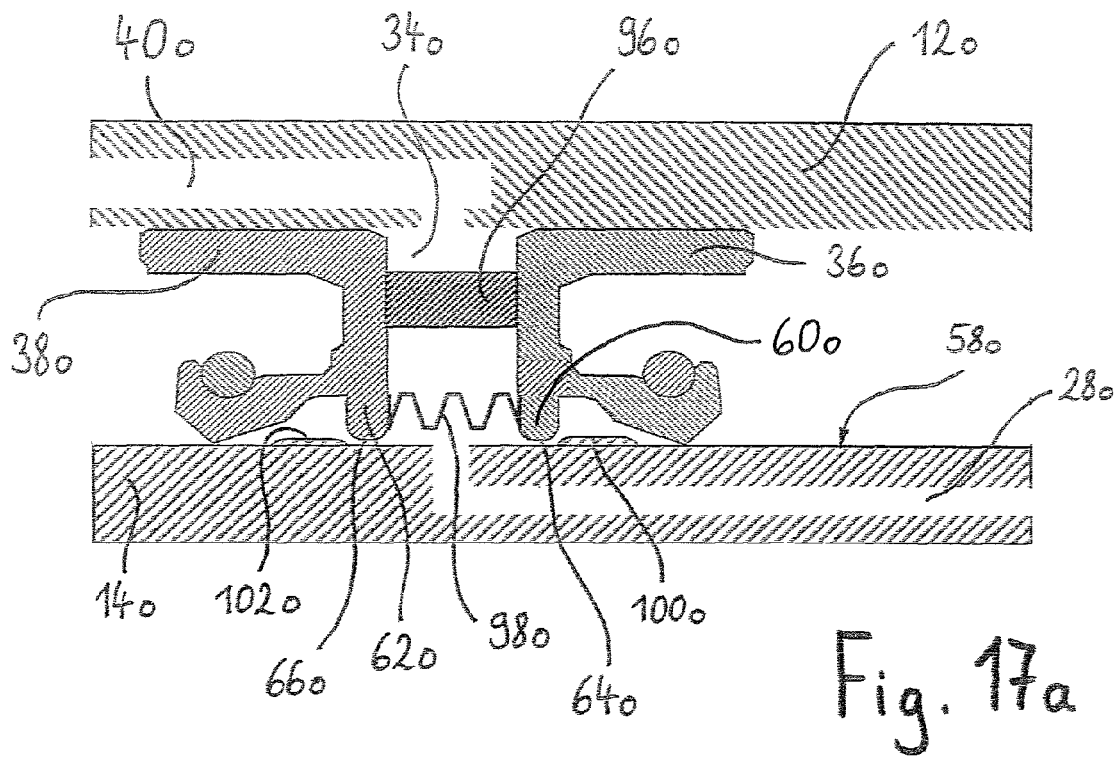
Figure 17B:
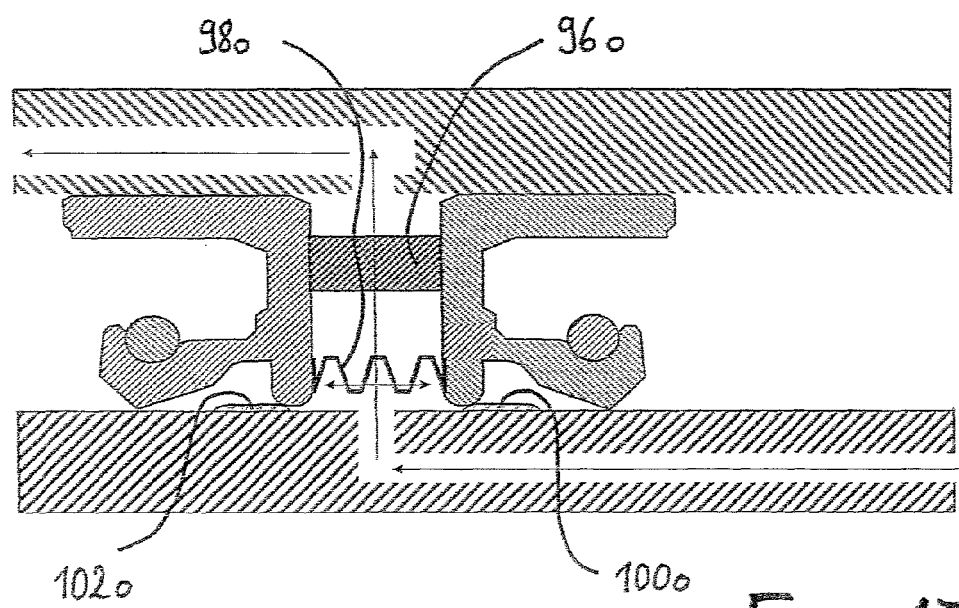
Figure 18:
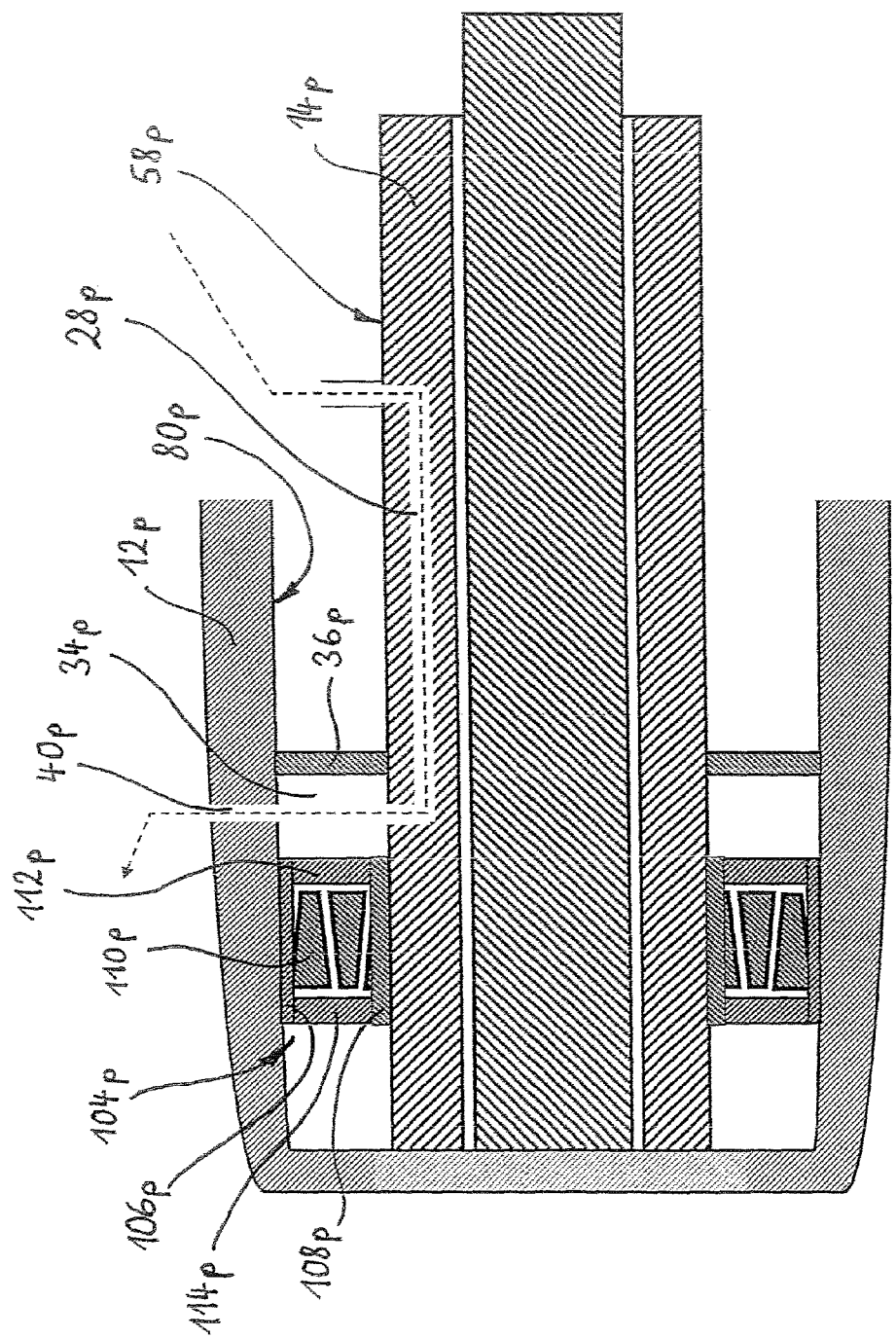
Figure 19:
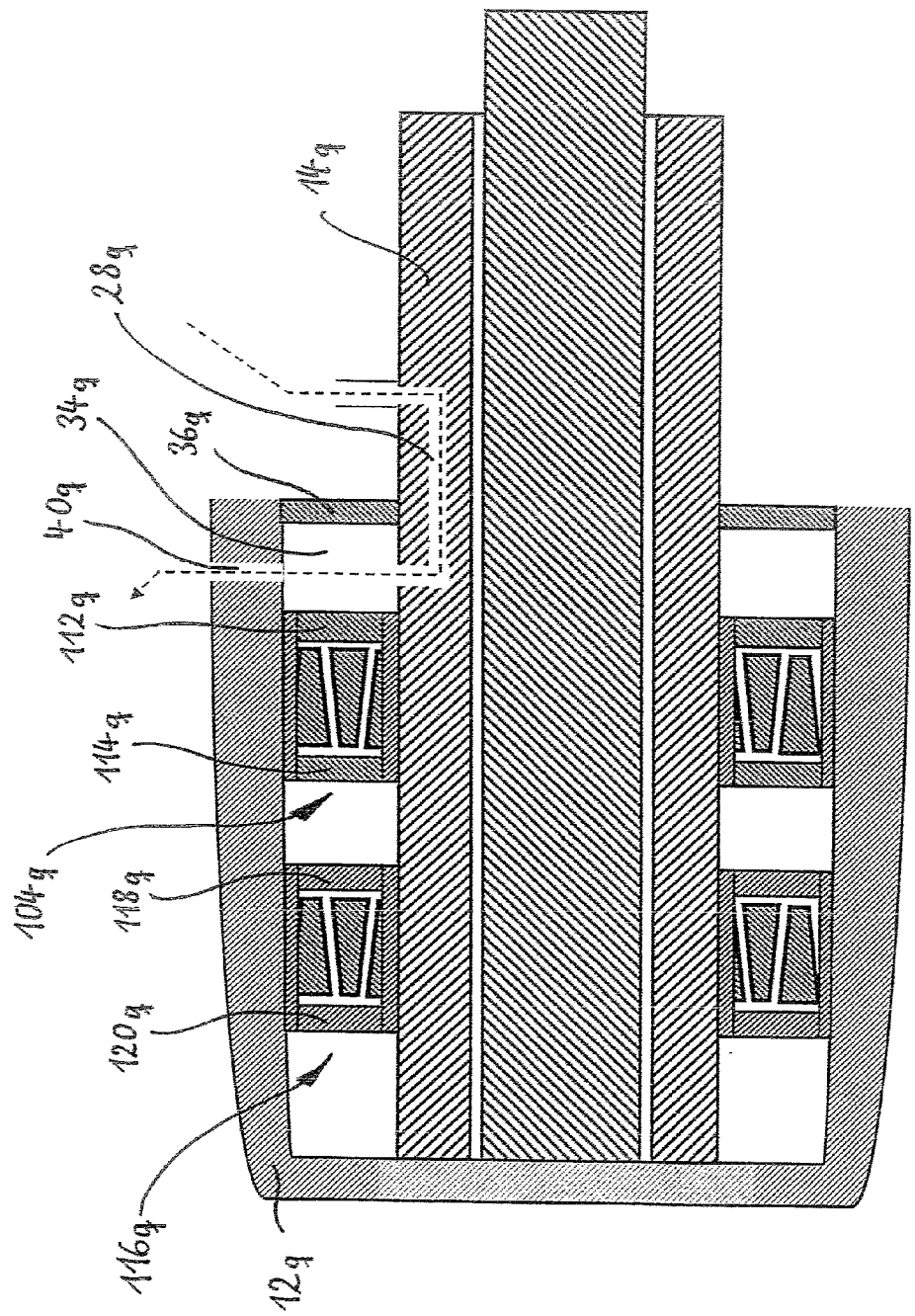
Figure 20:
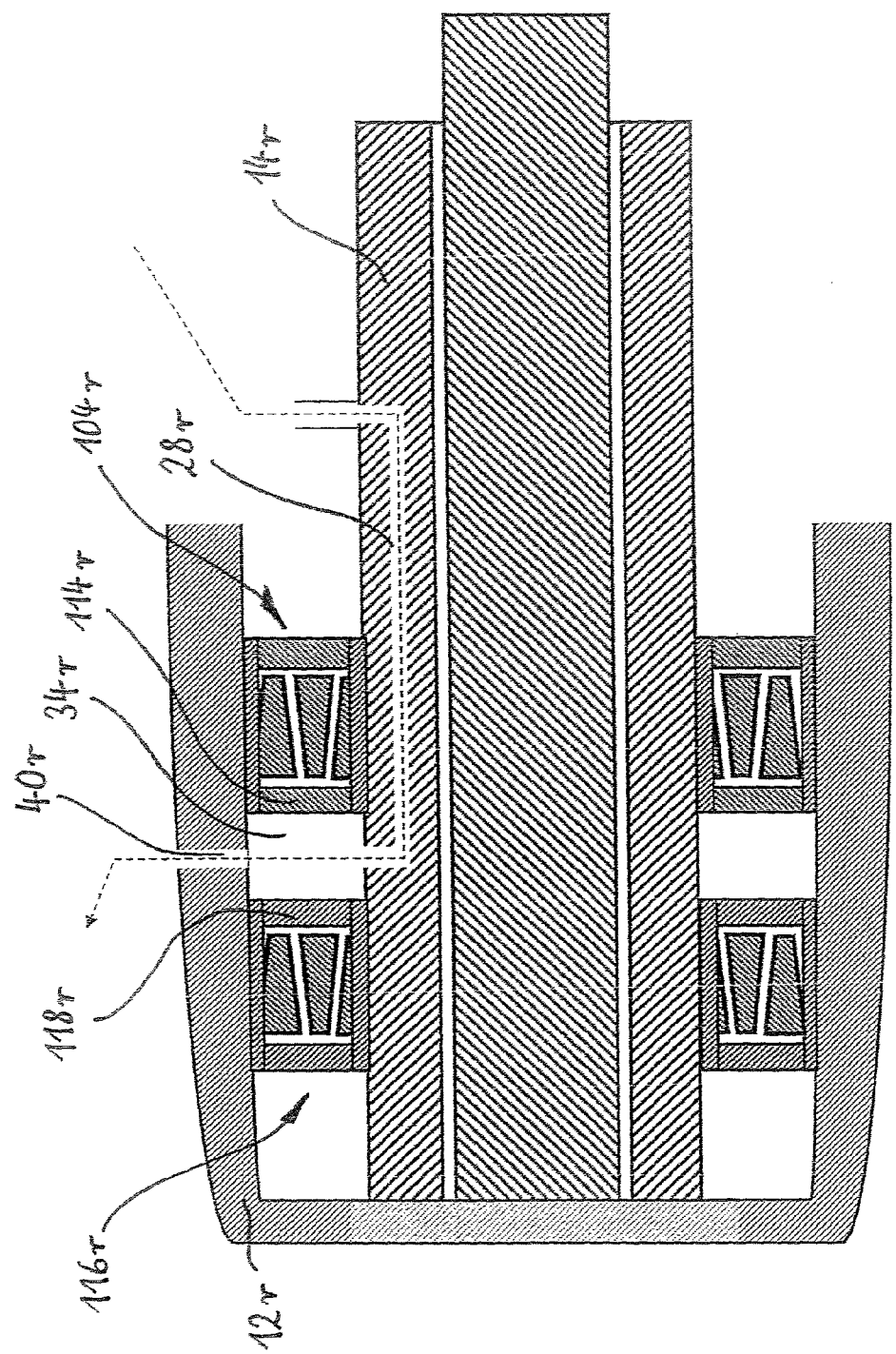
Figure 21A:
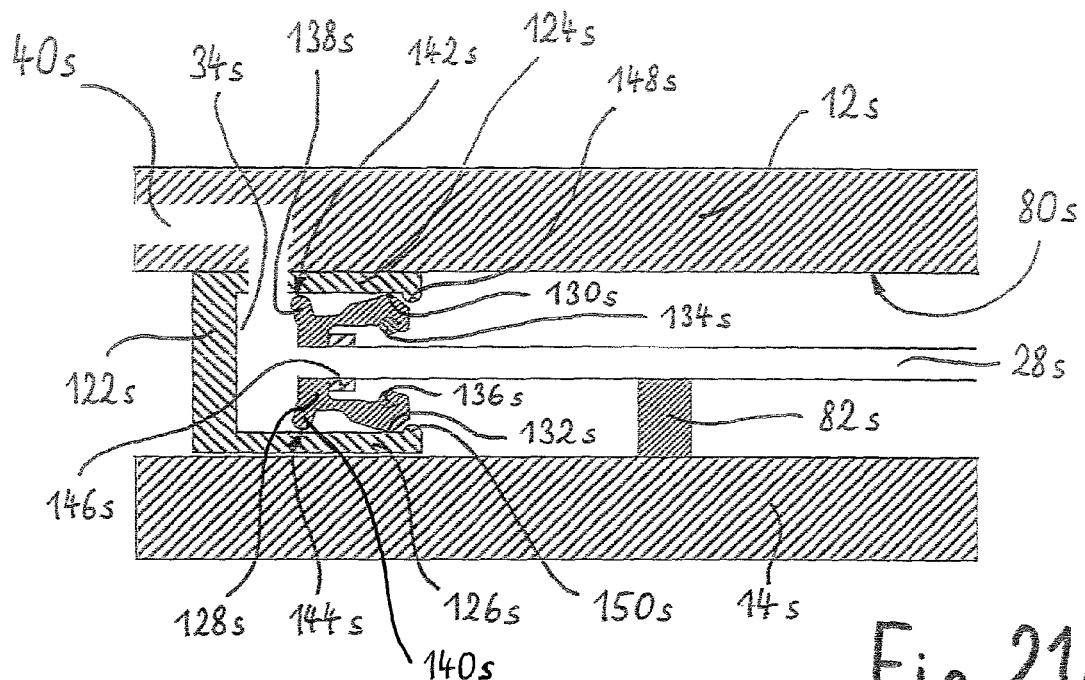
Figure 21B:
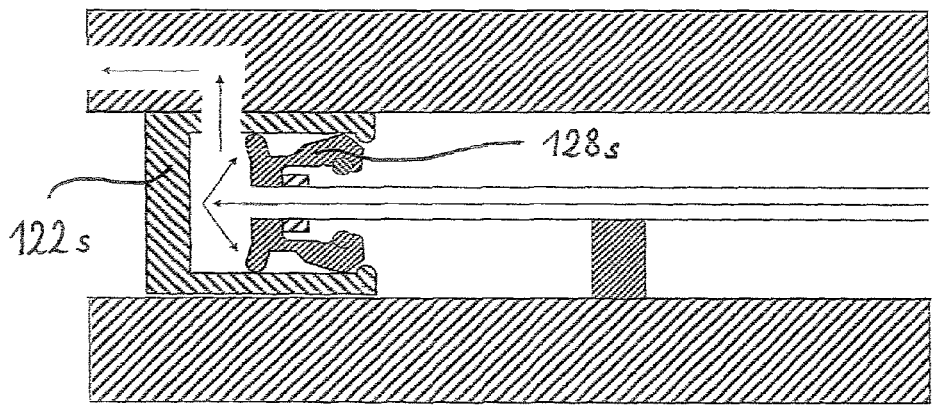
Figure 22A:
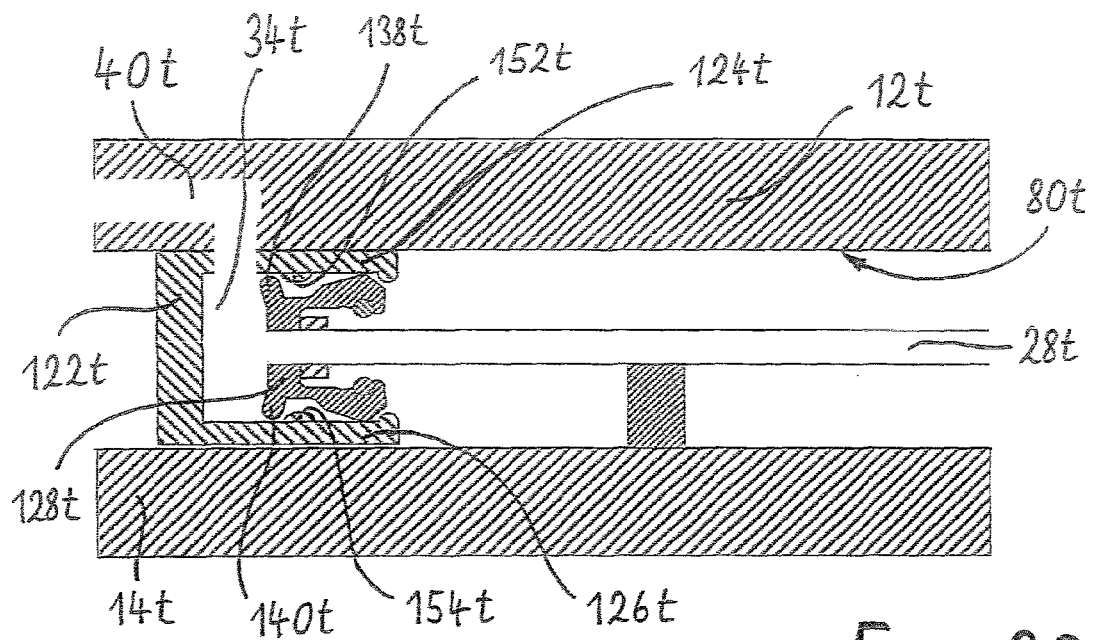
Figure 22B:
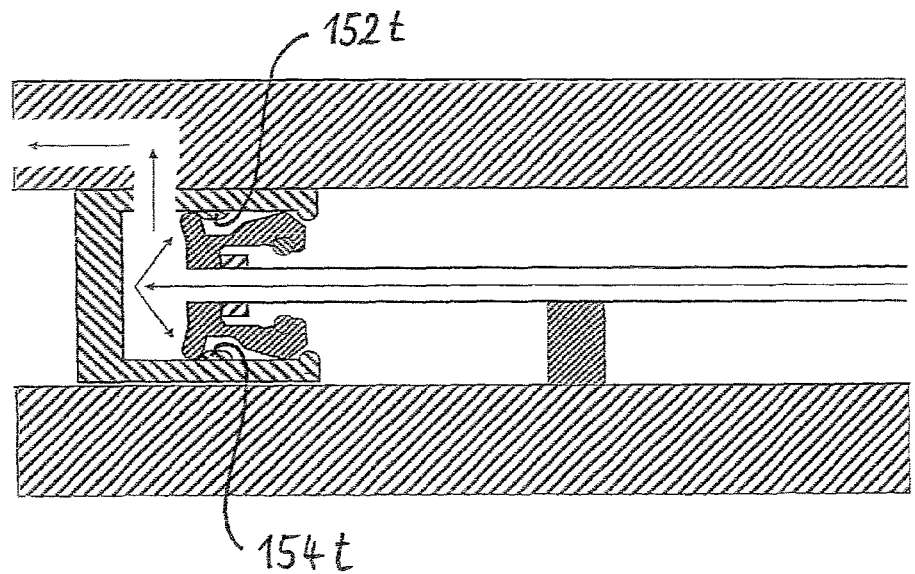
Figure 23A:
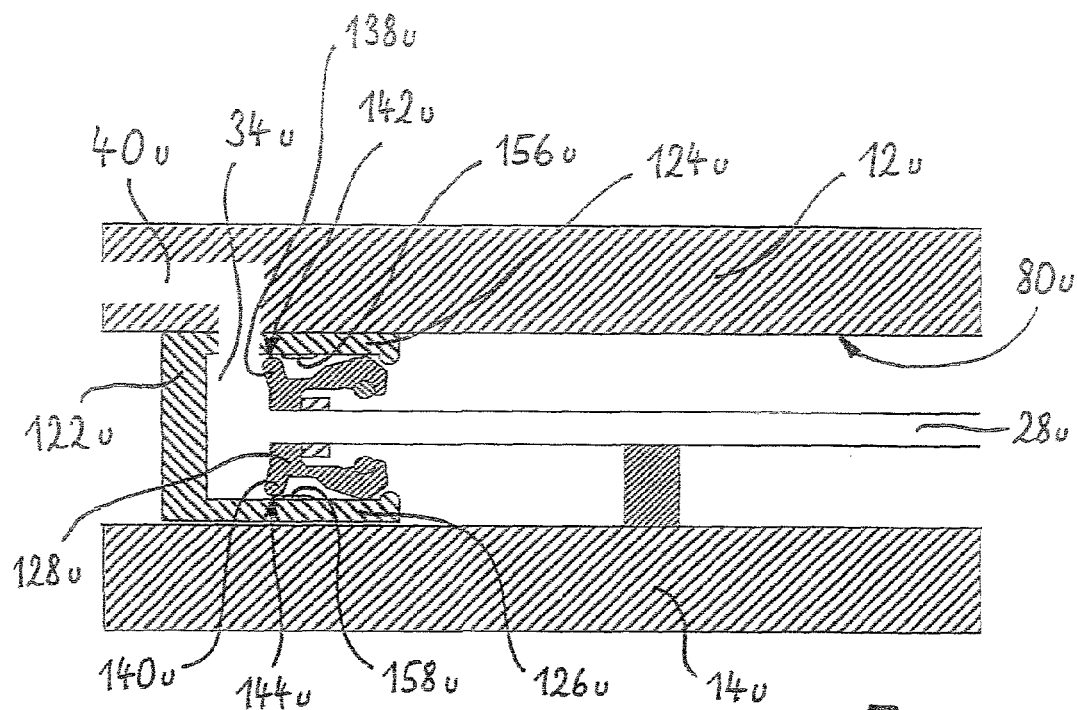
Figure 23B:
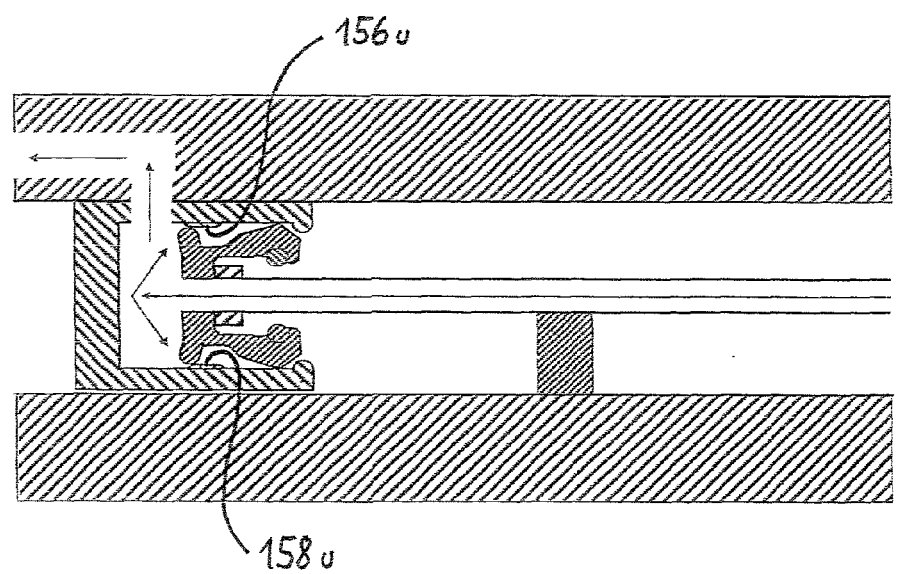
Figure 24A:
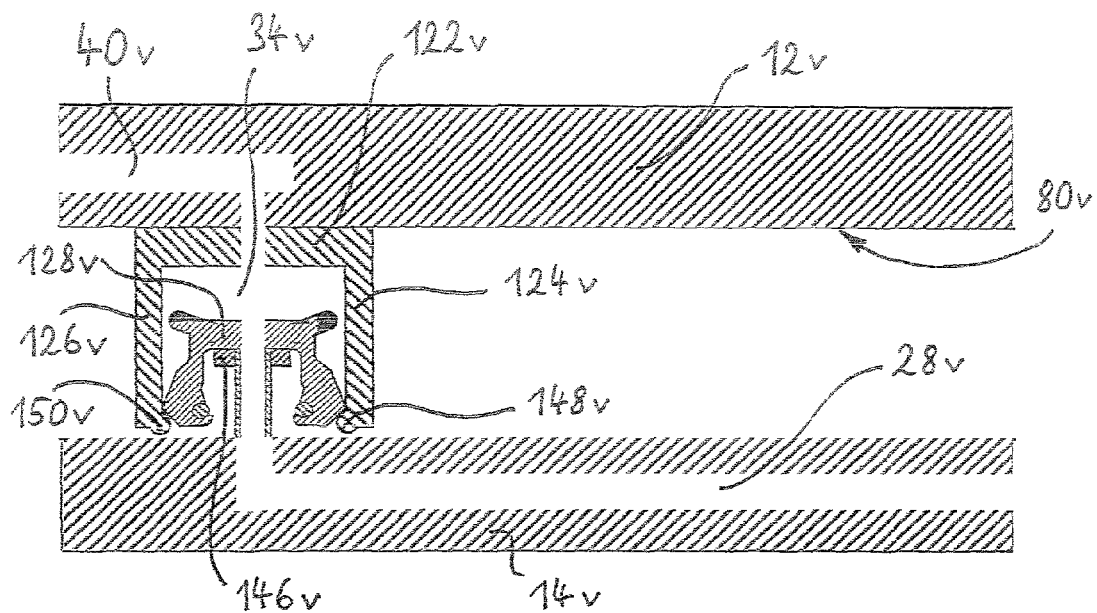
Figure 24B:
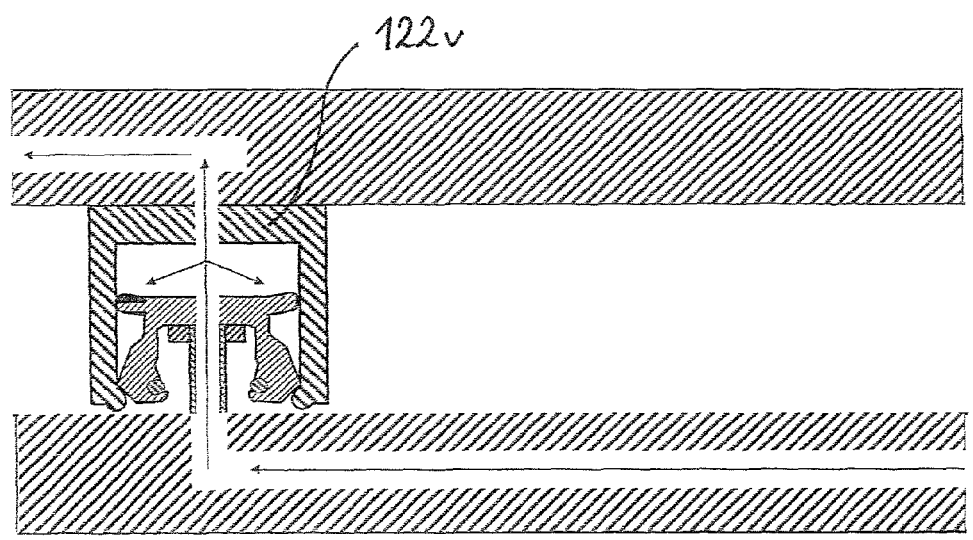
Figure 25A:
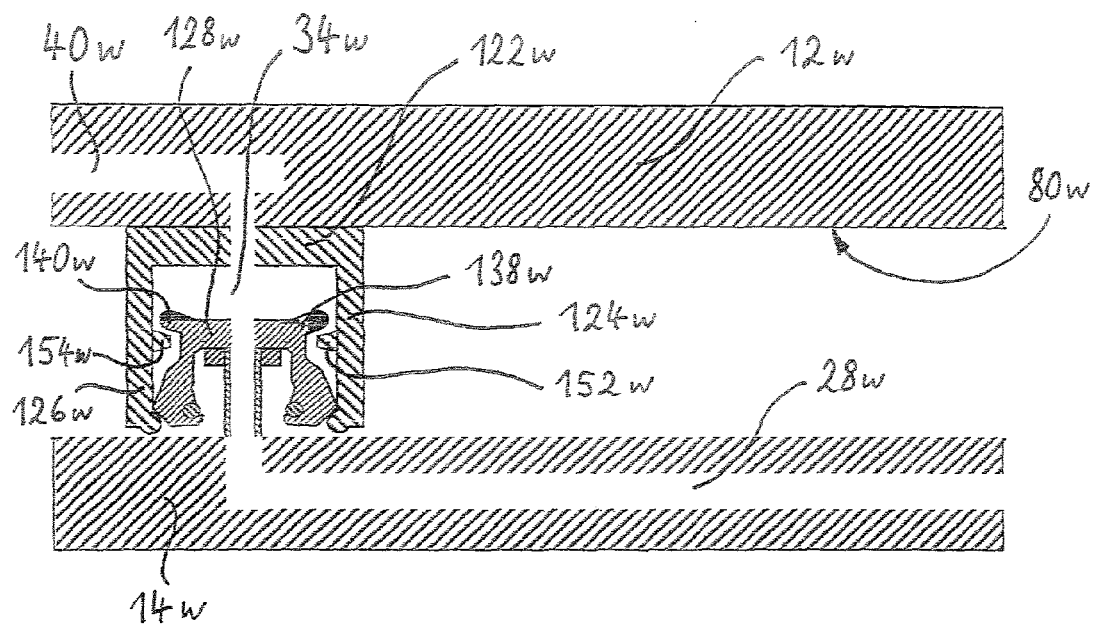
Figure 25B:
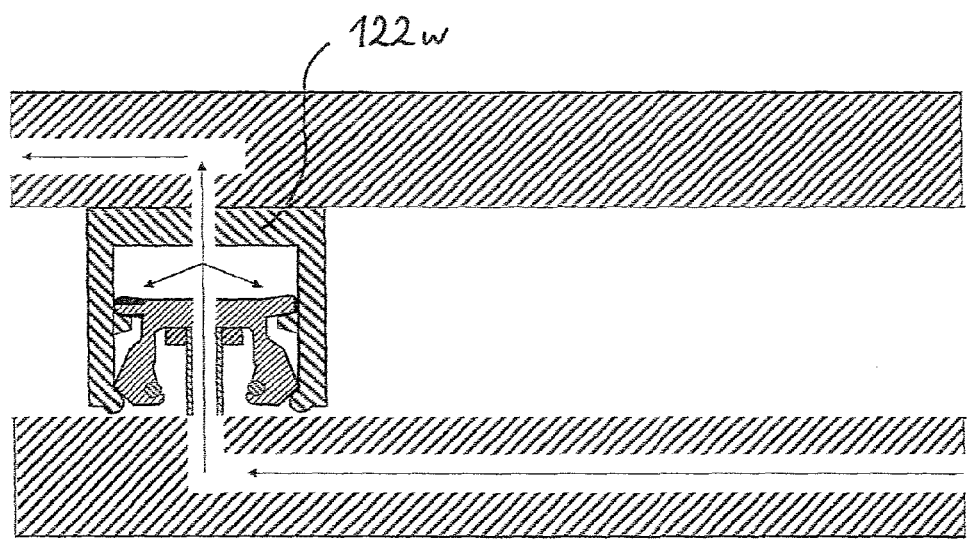
Figure 26A:
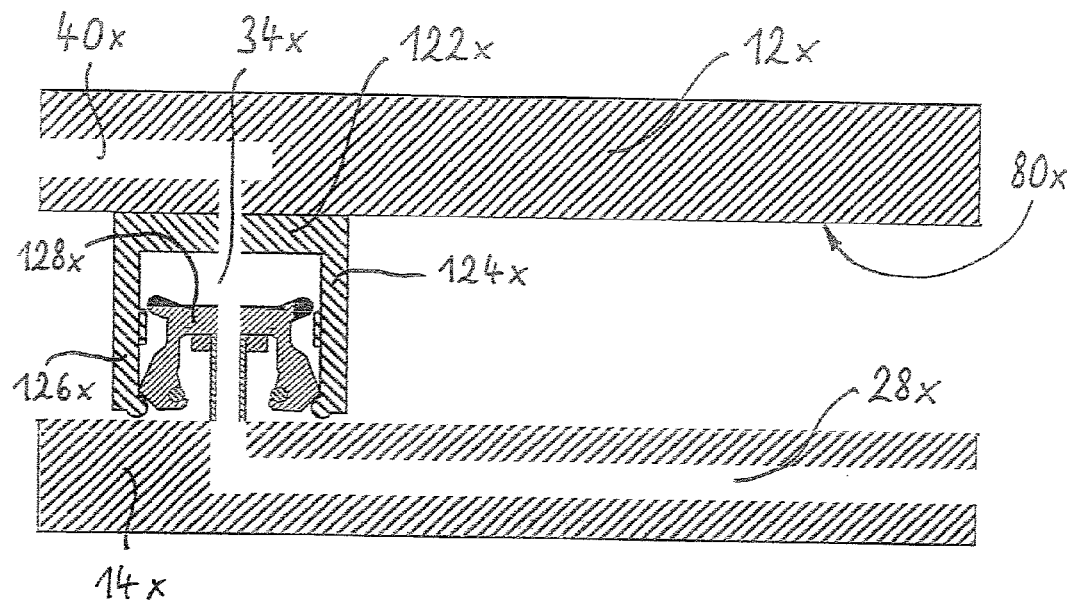
Figure 26B:
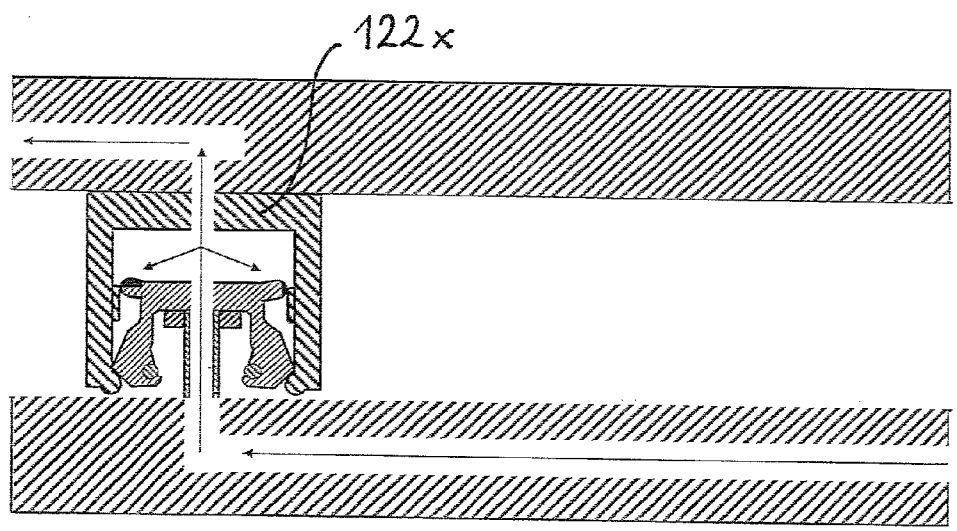
Figure 27A:
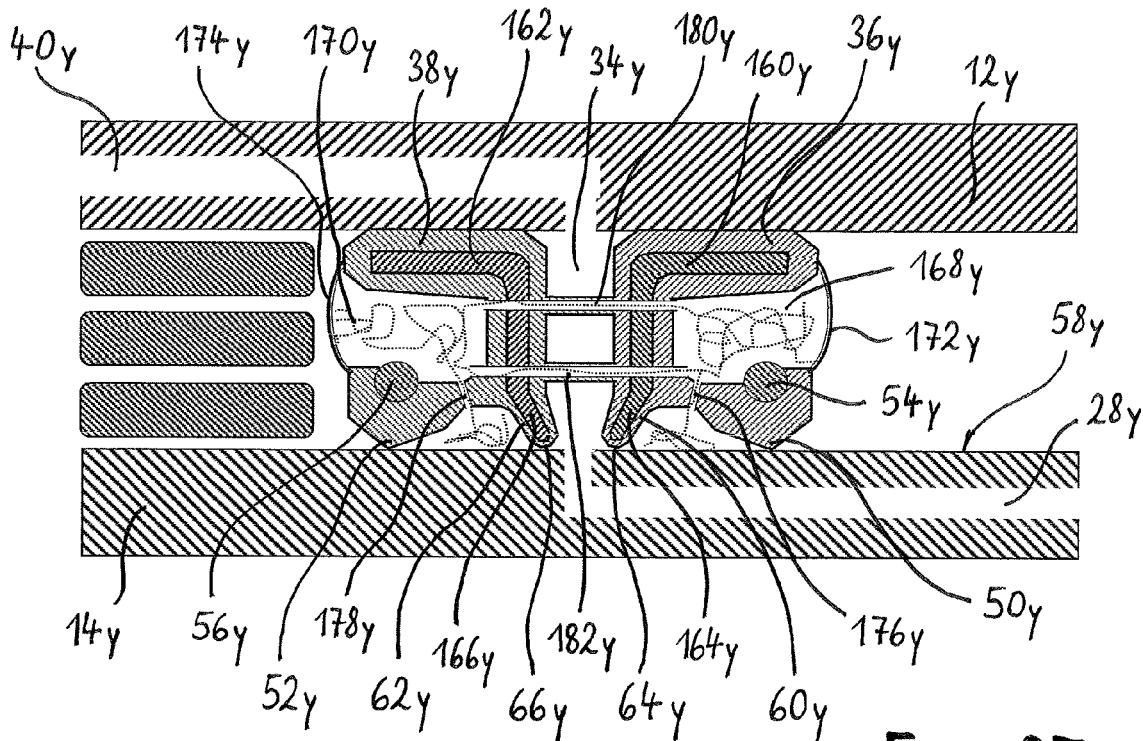
Figure 27B:
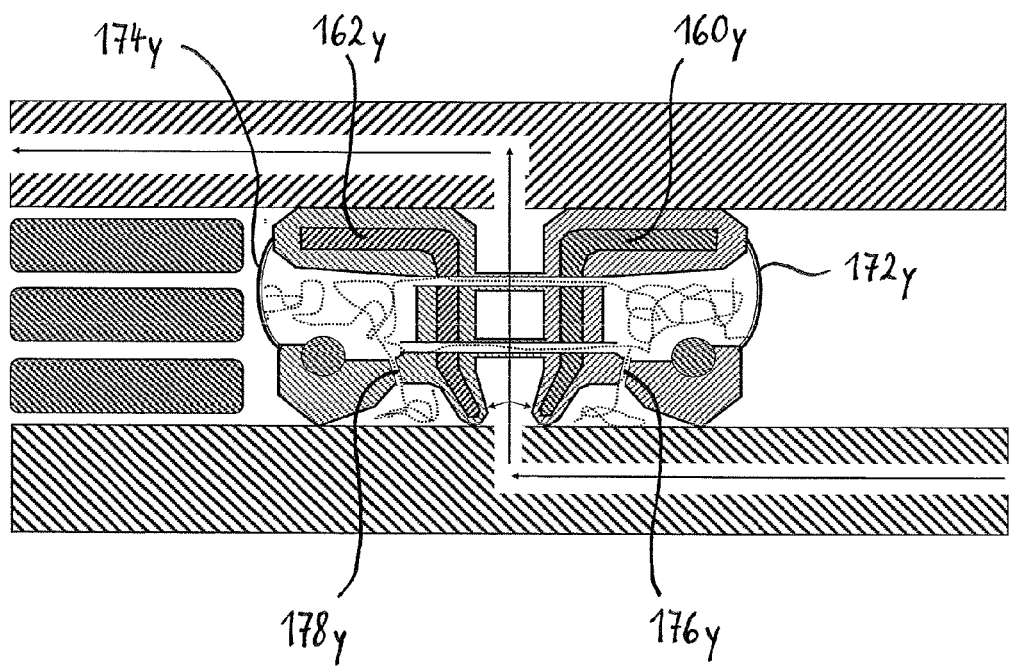
Figure 28A:
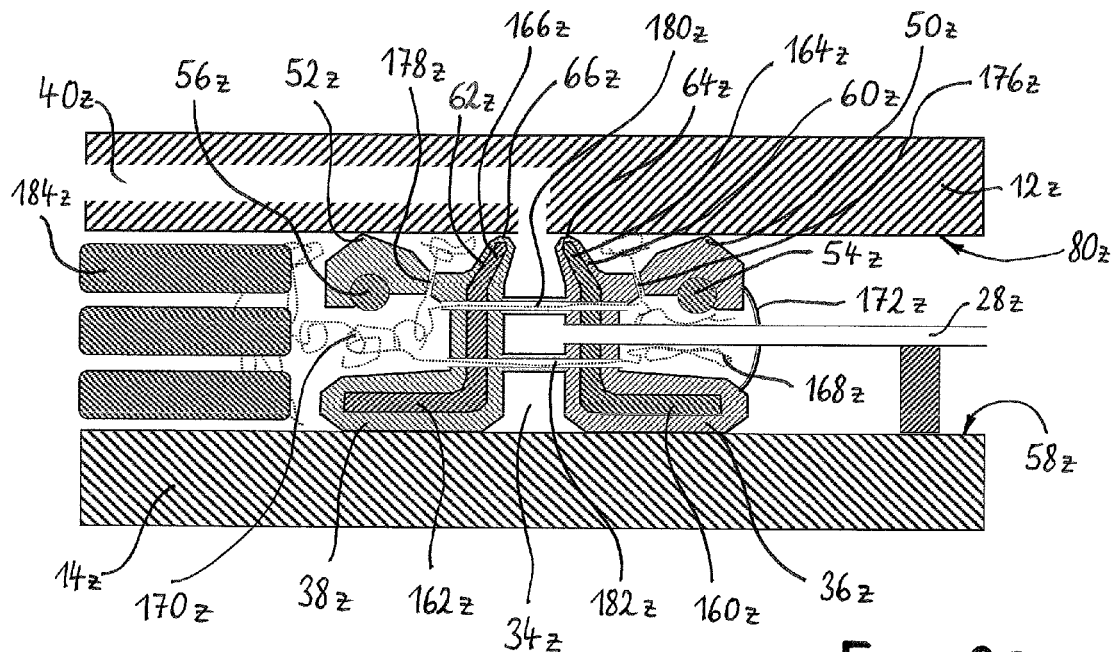
Figure 28B:
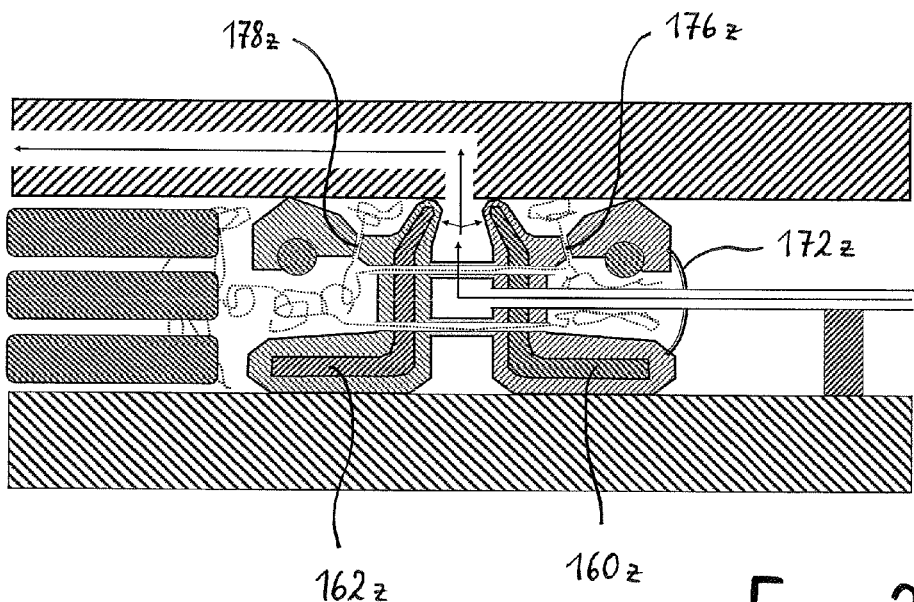
Figure 29A:
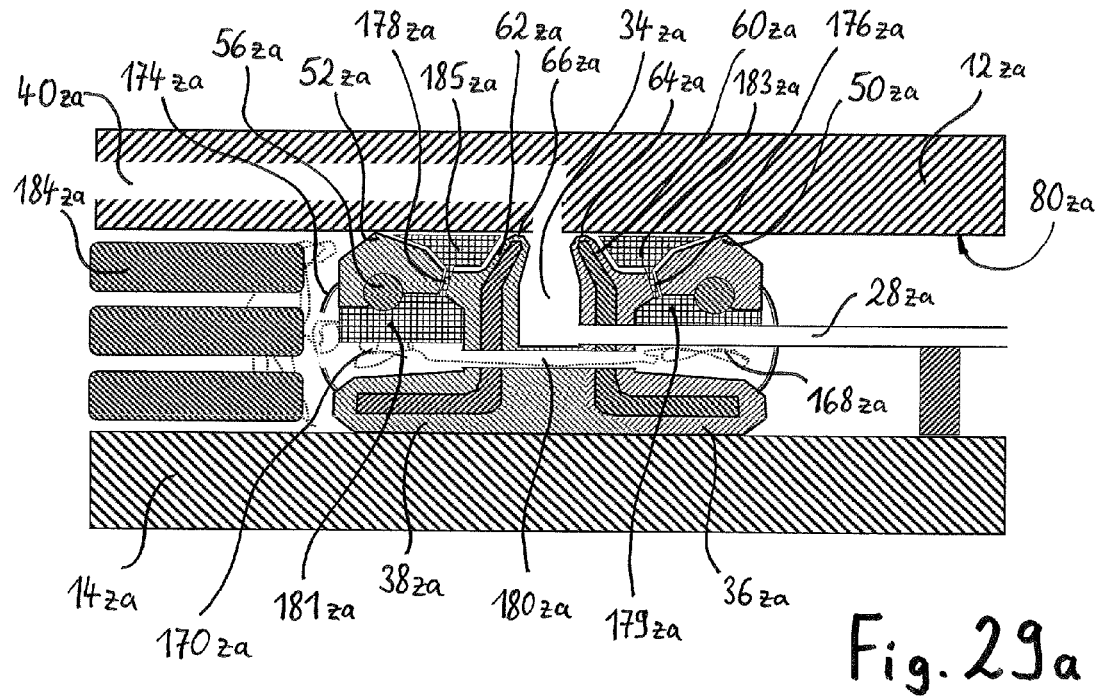
Figure 29B:
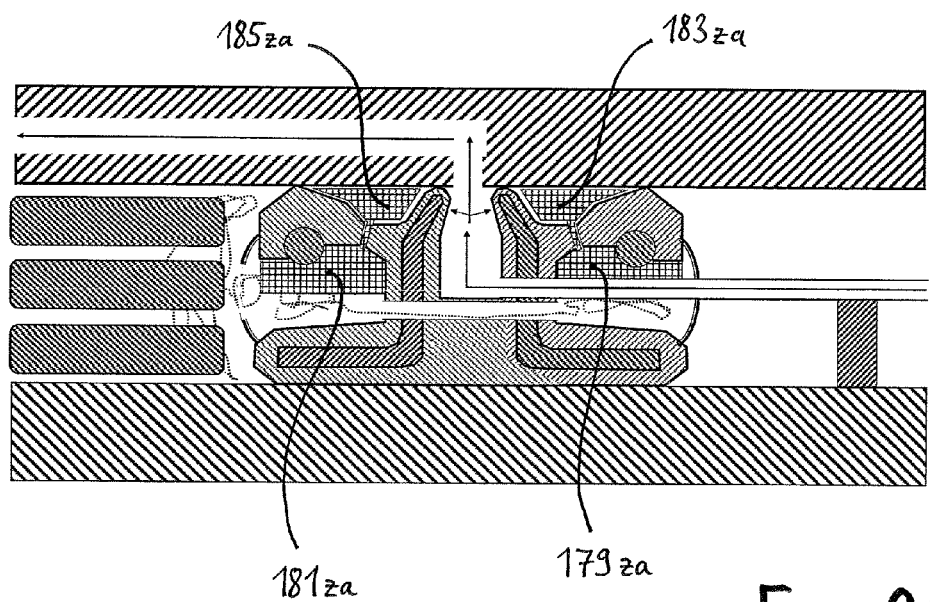
Figure 30A:
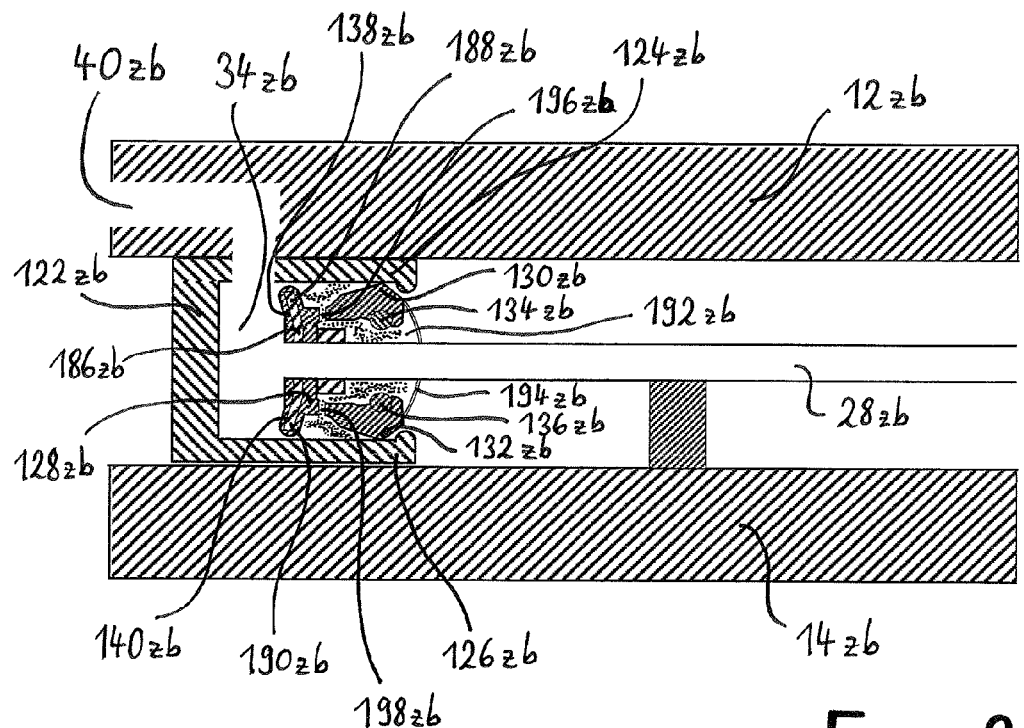
Figure 30B:
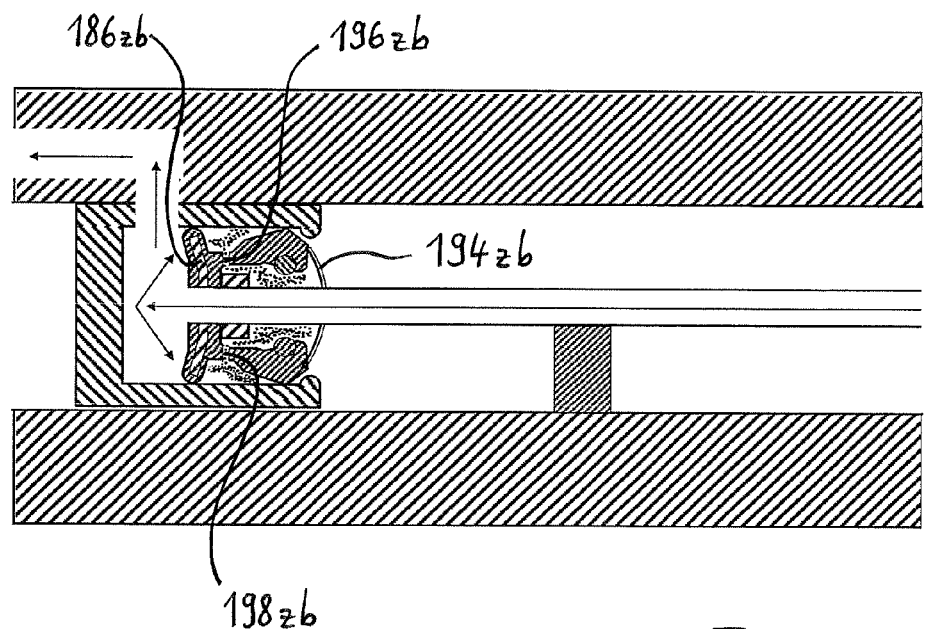
Figure 31A:
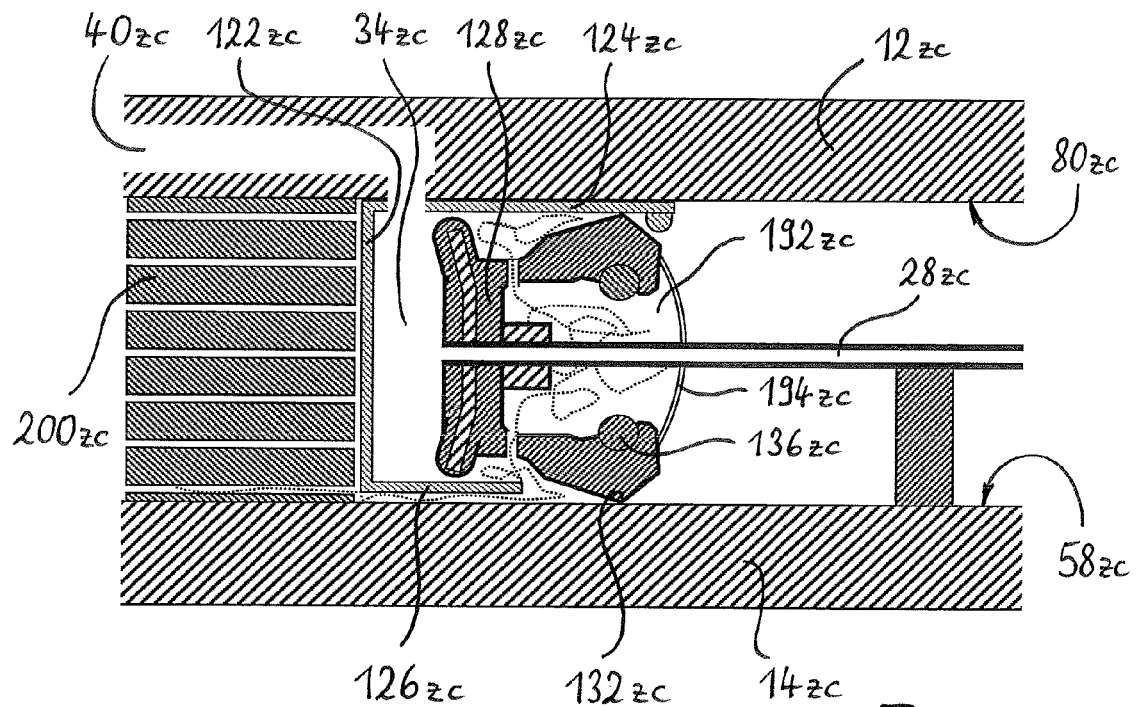
Figure 31B:
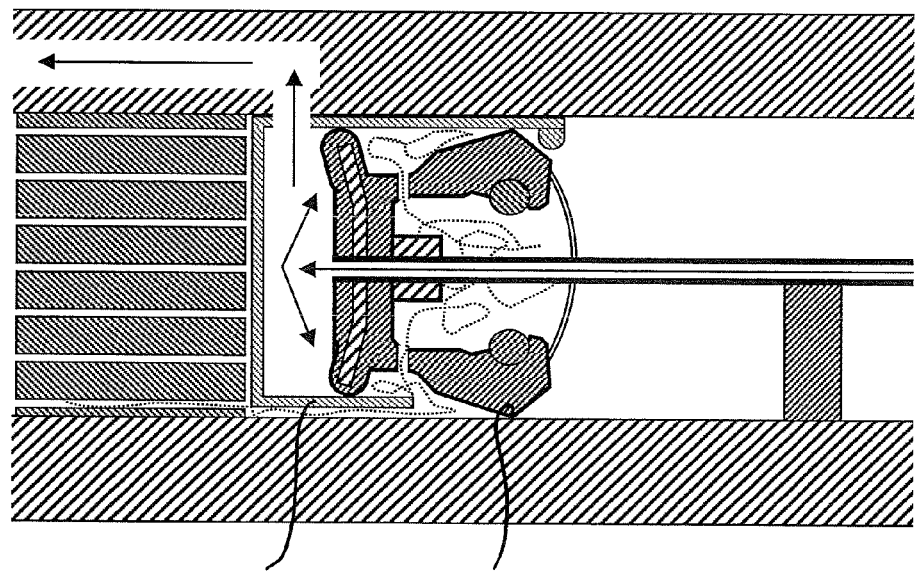
Figure 32A:
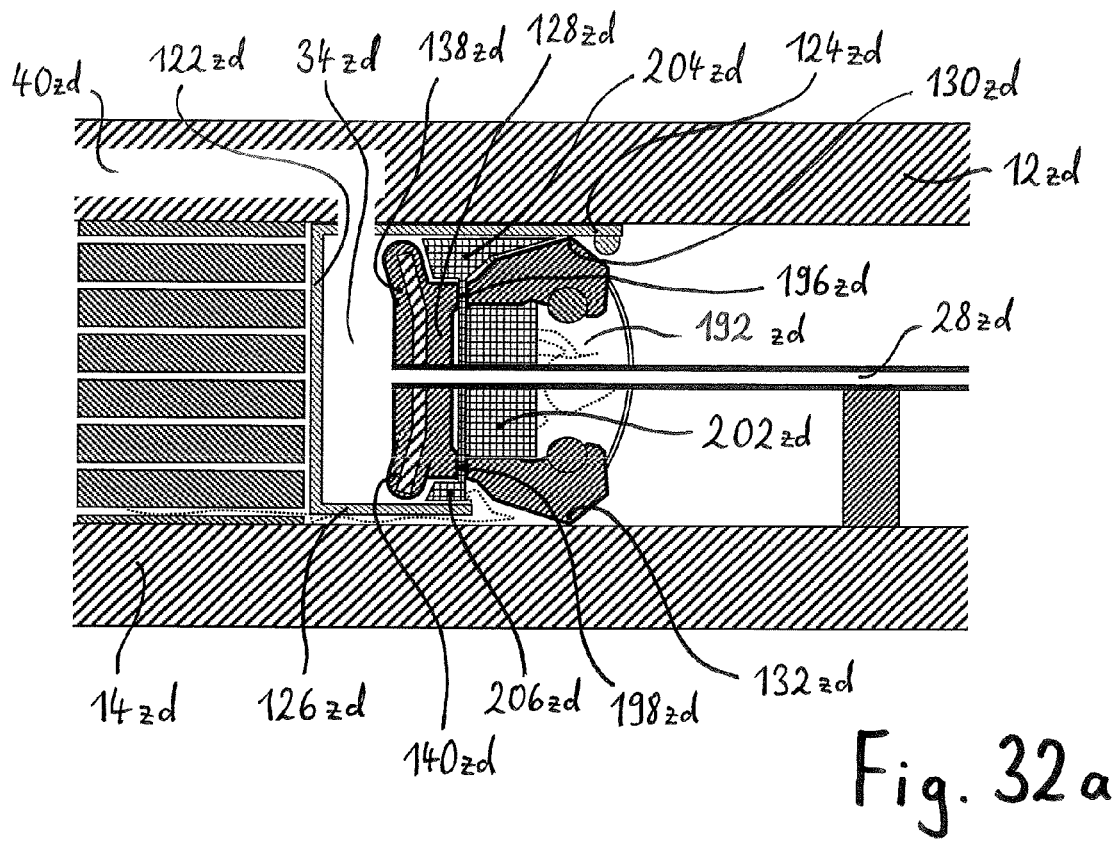
Figure 32B:
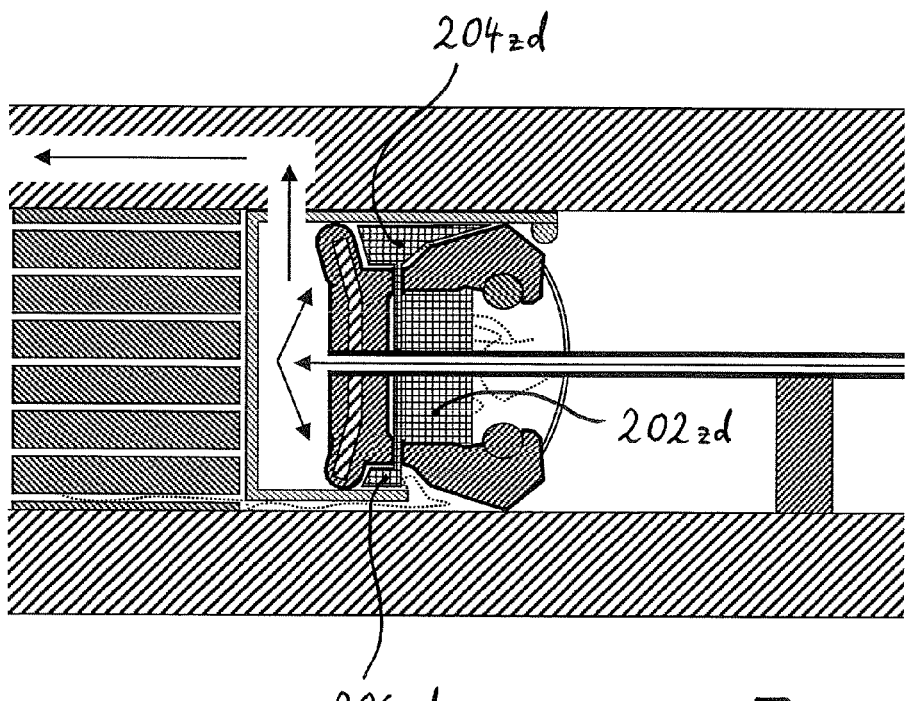

There now follows a detailed description of several embodiments of a vehicle axle assembly according to the invention with reference to the accompanying schematic drawings. These show:

FIG. 1 a longitudinal sectional view of an embodiment of a vehicle axle assembly according to the invention in an overview;

FIG. 2 part of the longitudinal sectional view of the vehicle axle assembly of FIG. 1 to an enlarged scale and with a modification for feeding a tire-sealing medium;

FIGS. 3a and 3b a detail view of an embodiment comprising two shaft sealing rings, which both have a radially inner collar;

FIGS. 4a and 4b a detail view of an embodiment comprising two shaft sealing rings, which both have a radially inner collar with a spring element;

FIGS. 5a and 5b a detail view of an embodiment comprising two shaft sealing rings with a radially inner collar and with annular grooves formed in the axle body;

FIGS. 6a and 6b a detail view of an embodiment comprising two shaft sealing rings with a radially inner collar and with ribs formed on the axle body;

FIGS. 7a and 7b a detail view of an embodiment comprising a shaft sealing ring with a radially inner collar and a shaft sealing ring with a radially outer collar;

FIGS. 8a and 8b a detail view of an embodiment comprising a shaft sealing ring with a radially inner collar, a shaft sealing ring with a radially outer collar, and associated annular grooves formed in the axle body and hub;

FIGS. 9a and 9b a detail view of an embodiment comprising a shaft sealing ring with a radially inner collar, a shaft sealing ring with a radially outer collar, and associated ribs formed on axle body and hub;

FIGS. 10a and 10b a detail view of an embodiment comprising an annular flange disposed between two shaft sealing rings on the axle body;

FIGS. 11a and 11b a detail view of an embodiment comprising an annular flange disposed between two shaft sealing rings on the axle body and comprising a U-shaped ring disposed on the hub;

FIGS. 12a and 12b a detail view of an embodiment comprising two rigidly coupled shaft sealing rings, which each have a radially inner collar;

FIGS. 13a and 13b a detail view of an embodiment comprising two flexibly coupled shaft sealing rings, which each have a radially inner collar;

FIGS. 14a and 14b a detail view of an embodiment comprising two rigidly coupled shaft sealing rings with a radially inner collar and comprising associated ribs formed on the axle body;

FIGS. 15a and 15b a detail view of an embodiment comprising two flexibly coupled shaft sealing rings with a radially inner collar and comprising associated ribs formed on the axle body;

FIGS. 16a and 16b a detail view of an embodiment comprising two flexibly coupled shaft sealing rings with a radially inner collar and comprising flat ribs formed on the axle body;

FIGS. 17a and 17b a detail view of an embodiment comprising two rigidly coupled shaft sealing rings and flexibly coupled, radially inner collars as well as flat ribs formed on the axle body;

FIG. 18 a longitudinal sectional view of an embodiment of an axle assembly comprising a ball bearing, wherein the axially outer shaft sealing ring is integrated into the ball bearing;

FIG. 19 a longitudinal sectional view of an embodiment of an axle assembly comprising two ball bearings, wherein the axially outer shaft sealing ring is integrated into the axially inner of the two ball bearings;

FIG. 20 a longitudinal sectional view of an embodiment of an axle assembly comprising two ball bearings, wherein both shaft sealing rings are integrated into in each case one of the two ball bearings;

FIGS. 21a and 21b a detail view of an embodiment comprising a U-shaped annular profile with axially extending side walls and comprising a sealing ring disposed therein;

FIGS. 22a and 22b a detail view of an embodiment comprising an U-shaped annular profile with axially extending side walls, a sealing ring disposed therein, and ribs formed on the side walls;

FIGS. 23a and 23b a detail view of an embodiment comprising a U-shaped annular profile with axially extending side walls, a sealing ring disposed therein, and flat ribs formed on the side walls;

FIGS. 24a and 24b a detail view of an embodiment comprising a U-shaped annular profile with radially extending side walls and a sealing ring disposed therein;

FIGS. 25a and 25b a detail view of an embodiment comprising a U-shaped annular profile with radially extending side walls, a sealing ring disposed therein, and ribs formed on the side walls;

FIGS. 26a and 26b a detail view of an embodiment comprising a U-shaped annular profile with radially extending side walls, a sealing ring disposed therein, and flat ribs formed on the side walls;

FIGS. 27a and 27b a detail view of an embodiment comprising two additionally stiffened shaft sealing rings, which both have a radially inner collar and the lubricant-filled hollow spaces of which are connected to one another by lines;

FIGS. 28a and 28b a detail view of an embodiment comprising two additionally stiffened shaft sealing rings, which both have a radially outer collar and the hollow spaces of which are connected to one another by lines;

FIGS. 29a and 29b a detail view of an embodiment comprising two additionally stiffened shaft sealing rings, which are manufactured as a unit, have radially outer collars, are provided with sponge-like foam material and the hollow spaces of which are connected to one another by a line;

FIGS. 30a and 30b a detail view of an embodiment comprising a U-shaped annular profile with axially extending side walls and a stiffened sealing ring, which is disposed therein and has a lubricant-filled hollow space;

FIGS. 31a and 31b a detail view of an embodiment comprising a U-shaped annular profile with axially extending side walls and a stiffened sealing ring, which is disposed therein and has a lubricant-filled hollow space and the radially inner main sealing lip of which is in contact with the axle body; and FIGS. 32a and 32b a detail view of an embodiment comprising a U-shaped annular profile with axially extending side walls and a stiffened sealing ring, which is disposed therein, is provided with a sponge-like foam material and the radially inner main sealing lip of which is in contact with the axle body.

In the following description of embodiments identical reference characters are used to denote elements which are identical or have an identical effect.

FIG. 1 shows in longitudinal section a vehicle axle assembly 10 comprising a hub 12, which is mounted on a cylindrical hollow axle body 14 so that it can rotate about a central longitudinal axis A. In the illustrated embodiment the mounting of the hub 12 is realized by means of two ball bearings 16 and 18, which are spaced apart from one another along the axis A. The hub 12 is fastened by means of screws 19 to a drive shaft 20, which extends through the axle body 14 and transmits the driving power generated by a non-illustrated motor to the hub 12 in order to rotate the latter about the axle body 14. Disposed on the hub 12 are bolts 22, at which a wheel (not shown here) may be placed by means of a rim onto the hub and secured. Further secured to the wheel hub 12 is a brake disk 24, which rotates with the wheel hub 12 about the axle body 14 in order in a manner known to a person skilled in the art to be able to brake a vehicle wheel mounted on the hub 12 by means of a brake 26 that is fixed to the vehicle.

A first pressure medium line 28 is connected to a pressure medium source 30 (represented only schematically here), which is disposed in the vehicle and may be for example a compressor for generating compressed air or a container of pressurized tire-filling medium. In the illustrated embodiment the first pressure medium line 28 extends from the pressure medium source 30 initially outside of the axle body 14 and then verges into a portion 32, which is formed inside the axle body 14 and opens out into an annular chamber 34 formed between the axle body 14 and the hub 12. The portion 32 extending inside the axle body 14 may be realized, as illustrated, by a bore in the axle body 14.

The annular chamber 34 is delimited radially outside by the inner surface of the hub 12, radially inside by the lateral surface of the axle body 14 and on either side by an axially inner shaft sealing ring 36 and an axially outer shaft sealing ring 38 and hence provides a hollow space, which is sealed directly by the shaft sealing rings 36 and 38 and extends around the axle body 14. Extending out of the annular chamber 34 is a second pressure medium line 40, which at its chamber-remote end is designed to be connected to a wheel that is secured on the hub 12. The second pressure medium line 40 extends in sections through the hub 12, for example through a bore in the hub 12, and further along may be run for example through a rim (not represented in detail here) to a valve of a tire mounted on the rim. For example, the tire valve may be configured as a Y-connection in order to be able to feed a pressure medium selectively through the second pressure medium line 40 or through another feed line, for example of an external pressure medium source, into the tire.

In order better to understand the following description, attention is drawn in particular to the fact that, of the components described thus far, only the axle body 14 as well as the first pressure medium line 28 and the pressure medium source 30 are fixed. The components that are connected directly or indirectly to the hub 12, however, rotate with the hub 12 about the axle body 14 so soon as the hub 12 is driven by the drive shaft 20. And so in particular the second pressure medium line 40 rotates and in the course of rotation is coupled by the annular chamber 34 and/or the sealed hollow space formed thereby always in a fluid-conveying manner to the first pressure medium line 28. As this coupling is independent of the respective rotated position of the hub 12, a feed and/or removal of pressure medium may occur not only in the stationary state but also during travel while the hub 12 is rotating. With the described arrangement therefore a tire pressure regulation may easily be automated.

According to a development the described arrangement of the axle assembly 10 may be used not only to feed a gaseous pressure medium, such as for example compressed air, but also to feed a liquid pressure medium, for example a tire-sealing medium. This may be advantageous particularly in the event of a flat tire. Such an embodiment requires only slight modifications in the region of the first pressure medium line 28 of the axle assembly 10 shown in FIG. 1. This is represented by way of example in FIG. 2, where the first pressure medium line 28 divides at a fork 42 and the branch is then run into a reservoir 44 containing a tire-sealing medium. From the reservoir 44 a connecting line 45 conveys the tire-sealing medium if necessary into the pressure medium line 28, into which the connecting line 45 opens out at a junction 46. In the illustrated embodiment at the fork 42 a switchover mechanism 48 is provided, which frees in each case only one of the two line paths, i.e. either the main line 28 or the branch leading to the reservoir 44. If the switchover mechanism 48 is set to the branch, the tire-sealing medium situated in the reservoir 44 is introduced into the first pressure medium line 28 and conveyed from there via the annular chamber 34 into the second pressure medium line 40 and then into the tire. It is self-evident that this arrangement for introducing a tire-sealing medium is merely by way of example. In principle other arrangements are conceivable, by means of which a tire-sealing medium may be introduced into the pressure medium line 28, for example by means of a manual docking manoeuvre.

In a further embodiment of the axle assembly 10 a pressure relief device is provided. Since during a feed of pressure medium an overpressure of up to 10 or even 15 bar is generated both in the first and the second pressure medium line 28 and 40 as well as in the annular chamber 34, it is meaningful on completion of the pressure regulation to carry out a pressure relief operation to prevent the pressure medium lines 28 and 40 and the chamber 34 from being constantly under pressure. The pressure relief device may be a relief valve, for example a mechanical or an electronically controlled valve, which is disposed at a suitable point in the first pressure medium line 28, the second pressure medium line 40 or in the region of the annular chamber 34 and may bring about a controlled pressure relief.

With regard to the detailed configuration of the annular chamber 34 and of the shaft sealing rings 36 and 38 that axially laterally delimit it, reference is now made to FIGS. 3 to 17, which illustrate in each case by means of a detail view in longitudinal section different embodiments of the region of the annular chamber 34. In each case the figure numbered with the lower-case letter "a" shows the state of the arrangement at normal pressure and the figure numbered with the lower-case letter "b" shows the state of the same arrangement in the event of an overpressure in the chamber 34. Elements which are identical or have an identical effect are moreover denoted by the same reference characters as in the previous figures, the reference characters for each of the following embodiments however being supplemented by individual lower-case letters. In each case, unless stated otherwise, for the description of elements bearing reference characters of an identical numeral reference is made to the previous descriptions.

In the embodiment shown in FIGS. 3a and 3b an axially inner shaft sealing ring 36a and an axially outer shaft sealing ring 38a are disposed between the axle body 14a and the hub 12a. As shaft sealing rings commercially available shaft sealing rings, for example so-called Simmer Rings®, may be used. Both shaft sealing rings 36a and 38a adhere in each case radially outside by means of frictional locking to the hub 12a and are provided in each case radially inside with a main sealing lip 50a and/or 52a, which is pressed by an application force generated by a tubular spring 54a and/or 56a against the axle body 14a and hence effects a direct sealing between the axle body 14a and the hub 12a. Upon a rotation of the hub 12a about the axle body 14a the two shaft sealing rings 36a and 38a as a result of the said frictional locking co-rotate with the hub 12a, so that the main sealing lips 50a and 52a slide over the lateral surface 58a of the axle body 14a.

Both shaft sealing rings 36a and 38a are moreover provided radially inside and adjacent to the annular chamber 34a with in each case one collar 60a and/or 62a. Both collars 60a and 62a have a sealing lip 64a and/or 66a, which at least in the event of an overpressure in the chamber 34a, represented in FIG. 3b, are both in contact with the lateral surface 58a of the axle body 14a and in addition to the main sealing lips 50a and/or 52a produce a sealing effect. In the embodiment shown in FIG. 3a the sealing lips 64a and 66a at normal pressure are not in contact with the axle body 14a but are pressed against the lateral surface 58a of the axle body 14a only in the event of an overpressure in the chamber 34a. It is however self-evident that the collars 60a and 62a with the sealing lips 64a and 66a may already be in contact with the axle body 14a at normal pressure.

The application force that is generated in the event of an overpressure in the chamber 34a and presses the collars 60a and 62a with the sealing lips 64a and 66a onto the lateral surface 58a of the axle body 14a allows the two shaft sealing rings 36a and 38a to adhere more strongly to the lateral surface 58a of the axle body 14a, with the result that the shaft sealing rings 36a and 38a are able to maintain their axial position for longer. A force, which in the event of an overpressure in the chamber 34a might cause the two shaft sealing rings 36a and 38a to move apart from one another, is counteracted by the pressing of the collars 60a and 62a against the lateral surface 58a of the axle body 14a, thereby making it markedly more difficult for the two shaft rings 36a and 38a to drift apart from one another.

FIGS. 4a and 4b show a development of this embodiment. Here, in a departure from the previous embodiment, the collars 60b and 62b are additionally provided with an annular spring element 68b and/or 70b, the spring action of which further intensifies the previously described application force that presses the collars 60b and 62b with the sealing lips 64b and 66b onto the lateral surface 58b of the axle body 14b. The spring elements 68b and 70b for this purpose may be configured for example as tubular springs. Unlike the previous embodiment the collars 60b and 62b and/or the sealing lips 64b and 66b, because of the application force generated by the spring elements 68b and 70b, at normal pressure in the chamber 34b are already in contact with the lateral surface 58b of the axle body 14b. It is however also conceivable to provide on the lateral surface 58b of the axle body 14b opposite the collars 60b and 62b and/or the sealing lips 64b and 66b a cutout that extends in peripheral direction, so that the spring action generated by the spring elements 68b and 70b is not quite sufficient to press the collars 60b and 62b and/or the sealing lips 64b and 66b at normal pressure in the region of the cutout against the axle body 14b. In this situation the collars 60b and 62b and/or the sealing lips 64b and 66b would contact the axle body 14b in the region of the cutout only in the event of an overpressure in the chamber 34b.

A means whereby an axial drifting-apart of the two shaft sealing rings 36 and 38 may be combated even more effectively is shown in the embodiment according to FIGS. 5a and 5b. This embodiment differs from the example shown in FIGS. 3a and 3b in that the radially inner collars 60c and 62c of the shaft sealing rings 36c and 38c are designed longer in a radially inward direction, so that they project radially into annular grooves 72c and/or 74c provided on the lateral surface 58c of the axle body 14c. In the event of an overpressure in the chamber 34c the collars 60c and 62c are pressed against the side walls of the annular grooves 72c and 74c, as is represented in FIG. 5b. An axial drifting-apart of the two shaft rings 36c and 38c is effectively prevented by means of this support. Furthermore, the contact of the collars 60c and 62c with the walls of the annular grooves 72c and 74c gives rise to an additional sealing of the annular chamber 34c.

FIGS. 6a and 6b show a further example of how an axial drifting-apart of the two shaft sealing rings 36 and 38 may be combated. The embodiment shown here differs from the example shown in FIGS. 3a and 3b in that on the lateral surface 58d of the axle body 14d there are ribs 76d and 78d, which extend in peripheral direction and against which the collars 60d and 62d are axially supported at least in the event of an overpressure in the chamber 34d. In the embodiment shown in FIG. 6a the collars 60d and 62d at normal pressure are still spaced apart from the ribs 76d and 78d and come into contact with the ribs 76d and 78d only in the event of an overpressure. It is however self-evident that at normal pressure there may already be a contact between the collars 60d and/or 62d and the ribs 76d and/or 78d.

Another embodiment is shown in FIGS. 7a and 7b. This embodiment differs from the example according to FIGS. 3a and 3b in that the inner shaft sealing ring 36e is held by means of frictional locking on the axle body 14e and is therefore locked against rotation relative to the axle body 14e. The shaft sealing ring 36e is provided with a main sealing lip 50e, which is pressed against the hub 12e by means of an application force generated by a tubular spring 54e and hence effects a sealing between the axle body 14e and the hub 12e. Upon a rotation of the hub 12e about the axle body 14e the shaft sealing ring 36e is stationary relative to the axle body 14e, while the main sealing lip 50e that is in contact with the hub 12e slides along the inner surface 80e of the hub 12e.

The shaft sealing ring 36e is moreover provided radially outside with a collar 60e adjacent to the annular chamber 34e. The collar 60e has a sealing lip 64e, which at least in the event of overpressure in the annular chamber 34e, represented in FIG. 7b, is in contact with the inner surface 80e of the hub 12e and in addition to the sealing lip 50e produces a sealing effect. In the embodiment shown in FIG. 7a the sealing lip 64e at normal pressure is still not in contact with the hub 12e but is pressed against the inner surface 80e of the hub 12e only in the event of an overpressure in the chamber 34e. It is however self-evident that the collar 60e with the sealing lip 64e may already be in contact with the hub 12e at normal pressure in the chamber 34e.

This embodiment further differs from the example according to FIGS. 3a and 3b in that here the first pressure medium line 28e is run, not through a bore in the axle body 14e that extends parallel to the axis A, but in the hollow space between the hub 12e and the axle body 14e and extends through the inner shaft sealing ring 36e before opening out into the annular chamber 34e. In this case a suitable bracket 82e is provided, which fixes the first pressure medium line 28e on the axle body 14e.

In an analogous manner the embodiments shown in FIGS. 8a and 8b and/or 9a and 9b also differ from the embodiments according to FIGS. 5a and 5b and/or 6a and 6b.

A further embodiment is represented in FIGS. 10a and 10b. This embodiment differs from the example according to FIGS. 3a and 3b in that between the two shaft sealing rings 36h and 38h an annular flange 84h having two flexible, radial side walls 86h and 88h is mounted on the lateral surface 58h of the axle body 14h, wherein the first pressure medium line 28h opens out into the annular chamber 34h in the annular flange 84h between the two side walls 86h and 88h. With this arrangement the sealing of the chamber 34h is effected in that at least in the event of an overpressure in the chamber 34h the side walls 86h and 88h of the annular flange 84h elastically deform, in so doing are pressed apart from one another and are pressed axially against in each case one of the shaft sealing rings 36h and 38h. This situation is shown in FIG. 10b.

A modification of this embodiment is represented in FIGS. 11a and 11b. In addition to the previous example, here on the inner surface 80i of the hub 12i opposite the annular flange 84i a ring 90i with a U-shaped cross section is fastened, the side walls 92i and 94i of which are directed radially inwards and overlap the flexible side walls 86i and 88i of the annular flange 84i. The second pressure medium line 40i extends between the side walls 92i and 94i through the ring 90i into the hub 12i. In this example the flexible side walls 86i and 88i of the annular flange 84i in the event of an overpressure in the chamber 34i are pressed, not against the shaft sealing rings 36i and 38i, but against the side walls 92i and 94i of the ring 90i. This situation is represented in FIG. 11b. A sealing of the annular chamber 34i therefore occurs here between the side walls 86i and 88i of the annular flange 84i and the side walls 92i and 94i of the ring 90i. It is self-evident that in this case the shaft sealing rings 36i and 38i are dispensable as regards the sealing of the annular chamber 34i, since the annular chamber 34i is already defined by the interaction of the annular flange 84i with the ring 90i having the U-shaped cross section.

FIGS. 12a and 12b show a development of the embodiment according to FIGS. 3a and 3b, in which the two shaft sealing rings 36j and 38j are coupled axially rigidly to one another. In the illustrated embodiment there is fastened between the two shaft sealing rings 36j and 38j a connecting element 96j, which extends in peripheral direction and keeps the two shaft sealing rings 36j and 38j spaced axially rigidly apart from one another. If the connecting element 96j extends continuously in peripheral direction, it has to have at least one opening to enable a pressure medium to pass through the chamber 34j from the first pressure medium line 28j to the second pressure medium line 40j. Advantageously, instead of a continuous connecting element with one or more openings, a plurality of individual, mutually spaced connecting elements may be fastened between the shaft sealing rings 36j and 38j, for example a number of individual webs or pins. It is self-evident that, given such a configuration, an axial drifting-apart of the two shaft sealing rings 36j and 38j is no longer possible.

Instead of a rigid coupling, a flexible coupling of the shaft sealing rings may alternatively be provided. This is shown in the embodiment of FIGS. 13a and 13b, which differs from the previous embodiment only in that, instead of the rigid connecting element 96j, a spring element 98k is fastened between the two shaft sealing rings 36k and 38k. The spring element 98k may for example be formed, as illustrated, by a helical tension spring, the tensile force of which counteracts the force, which arises in the event of an overpressure in the chamber 34k and would press the two shaft sealing rings 36k and 38k axially apart from one another. An axial drifting-apart of the two shaft sealing rings 36k and 38k is locally restricted or prevented in this way and, upon a relief of pressure in the chamber 34k, the two shaft sealing rings 36k and 38k take up their original position again. It is self-evident that a plurality of spring elements may alternatively be fastened between the two shaft sealing rings 36*k* and 38*k*. It is also self-evident that other types of spring than a helical tension spring may be used.

Further embodiments arise as a result of any desired combination of the features of the previously described embodiments. FIGS. 14*a* and 14*b* as well as FIGS. 15*a* and 15*b* show by way of example two such combinations. In FIGS. 14*a* and 14*b* the features of the embodiments according to FIGS. 6*a* and 6*b* as well as FIGS. 12*a* and 12*b* are combined. In FIGS. 15*a* and 15*b* the features of the embodiments according to FIGS. 6*a* and 6*b* as well as FIGS. 13*a* and 13*b* are combined.

FIGS. 16*a* and 16*b* show by way of example a variation of the embodiment of FIGS. 15*a* and 15*b*. The difference here lies in the fact that the ribs 100*n* and 102*n* provided on the lateral surface 58*n* of the axle body 14*n* are configured as flat ribs. In this embodiment, in the event of an overpressure in the chamber 34*n* the collars 60*n* and 62*n* are not supported in axial direction against the flat ribs 100*n* and 102*n* but are pushed up in axial direction onto the flat ribs 100*n* and 102*n* so that the collars 60*n* and 62*n* and/or their sealing lips 64*n* and 66*n* are pressed radially onto the flat ribs 100*n* and 102*n*. Upon a relief of pressure the two shaft sealing rings 36*n* and 38*n* are pulled by the spring element 98*n* axially back down off the flat ribs 100*n* and 102*n*. This embodiment is advantageous above all when a pressure regulation is carried out while the vehicle is travelling. The frictional forces that arise in the event of an overpressure in the chamber 34*n* between the sealing lips 64*n* and 66*n* and the flat ribs 100*n* and 102*n* are therefore markedly lower than between the collars 60*m* and 62*m* and the ribs 76*m* and 78*m* according to the embodiment according to FIGS. 15*a* and 15*b*.

A further possible combination and/or variation of the previous embodiments is presented by FIGS. 17*a* and 17*b*. Here, the shaft sealing rings 36*o* and 38*o* are kept spaced apart in an axially fixed manner from one another by a rigid connecting element 96*o*. In addition a spring element 98*o* is provided, which is disposed only in the region between the collars 60*o* and 62*o*. This arrangement in the event of an overpressure in the chamber 34*o* keeps the two shaft sealing rings 36*o* and 38*o* spaced apart from one another basically in a fixed manner, while the collars 60*o* and 62*o* owing to their flexibility may move axially slightly apart from one another. A deformation is therefore allowed only in a specific region of the shaft sealing rings 36*o* and 38*o*. In the illustrated embodiment the collars 60*o* and 62*o* are pushed in axial direction onto the flat ribs 100*o* and 102*o*, so that the collars 60*o* and 62*o* and/or their sealing lips 64*o* and 66*o* are pressed radially onto the flat ribs 100*o* and 102*o*. Upon a relief of pressure the two collars 60*o* and 62*o* are pulled by the spring element 98*o* axially back down off the flat ribs 100*o* and 102*o*.

FIGS. 18 to 20 now schematically represent further embodiments, in which indirectly sealing shaft sealing rings are used to form the annular chamber 34.

In the embodiment shown in FIG. 18 a ball bearing 104*p* is disposed between the axle body 14*p* and the hub 12*p*. The ball bearing 104*p* comprises a cylindrical, radially outer race 106*p*, which lies flat against the inner surface 80*p* of the hub 12*p* and is fixed relative to the hub 12*p*. The ball bearing 104*p* further comprises a cylindrical, radially inner race 108*p*, which lies flat against the axle body 14*p* and is fixed relative to the axle body 14*p*. Disposed between the two races 106*p* and 108*p* are tapered rollers 110*p*, which enable a controlled rotation of the radially outer race 106*p* about the radially inner race 108*p*. Disposed axially outside between the two races 106*p* and 108*p* are shaft sealing rings 112*p* and 114*p*, the function of which is similar to the shaft sealing rings 36 and 38 described above, except that the shaft sealing rings 112*p* and 114*p* radially at the outside, instead of contacting the hub 12*p*, are in contact with the radially outer race 106*p* and radially at the inside, instead of contacting the axle body 14*p*, are in contact with the radially inner race 108*p*. The two shaft sealing rings 112*p* and 114*p* therefore only indirectly effect a sealing between the axle body 14*p* and the hub 12*p*.

In principle, for forming an annular chamber 34 any desired combinations of indirectly and directly sealing shaft sealing rings are conceivable. In the embodiment shown in FIG. 18 the annular chamber 34*p* is defined for example by the axially inner, directly sealing shaft sealing ring 36*p* and the axially outer, indirectly sealing shaft sealing ring 108*p*. More precisely, the annular chamber 34*p* is therefore delimited by the lateral surface 58*p* of the axle body 14*p*, the inner surface 80*p* of the hub 12*p*, the axially inner shaft sealing ring 36*p*, the axially outer shaft sealing ring 112*p* and by the surfaces—facing the annular chamber 34*p*—of the two races 106*p* and 108*p* of the ball bearing 104*p*.

FIG. 19 shows a further embodiment, which differs from the previous example in that the axle assembly shown here comprises a second ball bearing 116*q* with corresponding shaft sealing rings 118*q* and 120*q*, which is disposed between the axle body 14*q* and the hub 12*q*. In the illustrated example the ball bearing 116*q* is mounted axially further out than the ball bearing 104*q*. In a configuration with two ball bearings 104*q* and 116*q* it is of course conceivable to dispose the annular chamber 34*q* at a different position to that shown in FIG. 19. By virtue of suitable positioning of the directly sealing shaft sealing ring 36*q* it is easily possible to form the annular chamber 34*q* by means of the interaction of the shaft sealing ring 36*q* with in each case any desired one of the shaft sealing rings 112*q*, 114*q*, 118*q* and 120*q*.

FIG. 20 shows a further embodiment, which differs from the example according to FIG. 19 in that, here, the annular chamber 34*r* is formed between the two indirectly sealing shaft sealing rings 114*r* and 118*r* of the adjacent, mutually spaced ball bearings 104*r* and 116*r*. Here, a directly sealing shaft sealing ring has been dispensed with entirely.

FIGS. 21 to 26, a description of which now follows, moreover show embodiments of a vehicle axle assembly that, in contrast to the embodiments described above, does not require the axially inner and axially outer shaft sealing ring.

As FIGS. 21*a* and 21*b* show, in such an axle assembly the annular chamber 34*s* is delimited by an annular profile 122*s* with a U-shaped cross section, which is connected to the inner surface 80*s* of the hub 12*s* and the side walls 124*s* and 126*s* of which extend axially, and by a sealing ring 128*s*, which is disposed between the side walls 124*s* and 126*s*. The sealing ring 128*s* in this case is locked against rotation relative to the axle body 14*s*. The first pressure medium line 28*s* is likewise fixed relative to the axle body 14*s* and extends through the sealing ring 128*s* before opening out into the annular chamber 34*s*. The second pressure medium line 40*s* extends out of the annular chamber 34*s* initially through the annular profile 122*s* and then through the hub 12*s*. The sealing ring 128*s* may be realized for example by a commercially available, double-sided action Simmer Ring®.

The sealing ring 128*s* is provided both radially inside and radially outside with a main sealing lip 130*s* and/or 132*s*, each of which is pressed by an application force generated by a tubular spring 134*s* and/or 136*s* against the side wall 124s and/or 126s and hence effects a sealing between the two side walls 124s and/or 126s. Upon a rotation of the hub 12s about the axle body 14s the sealing ring 128s is fixed relative to the axle body 14s, while the main sealing lips 130s and/or 132s that are in contact with the side walls 124s and/or 126s slide over the inner surfaces of the side walls 124s and/or 126s. The sealing ring 128s is moreover provided, adjacent to the annular chamber 34s, both radially inside and radially outside with a collar 138s and/or 140s. The collars 138s and 140s each have a sealing lip 142s and/or 144s, which at least in the event of overpressure in the annular chamber 34s, as is represented in FIG. 21b, are in contact with the inner surfaces of the side walls 124s and/or 126s and in addition to the main sealing lips 130s and 132s produce a sealing effect. In the embodiment illustrated in FIG. 21a the sealing lips 142s and 144s at normal pressure are not in contact with the side walls 124s and 126s and are pressed against the inner surfaces of the side walls 124s and 126s only in the event of an overpressure in the chamber 34s. It is of course self-evident that the collars 138s and 140s with the sealing lips 142s and 144s may alternatively already be in contact with the side walls 124s and 126s at a normal pressure (atmospheric pressure) in the chamber 34s.

In order in the event of an overpressure in the chamber 34s to counteract a pressing of the sealing ring 128s out of the side walls 124s and/or 126s of the annular profile 122s, a bracket is provided, which is realized in the form of a stop 146s on the first pressure medium line 28s close to where the latter opens out into the chamber 34s. The sealing ring 128s may be supported axially against the stop 146s. In addition, in the region of the open ends of the side walls 124s and/or 126s of the annular profile 122s on the inner surfaces of the side walls 124s and/or 126s there are retaining ribs 148s and/or 150s, which extend in peripheral direction and prevent an axial movement of the sealing ring 128s out of the annular profile 122s as soon as the main sealing lips 130s and/or 132s abut against the retaining ribs 148s and/or 150s. It is self-evident that it is possible also to dispense with the retaining ribs 148s and/or 150s.

FIGS. 22a and 22b further show how an axial pressing of the sealing ring 128t out of the side walls 124t and/or 126t of the annular profile 122t may moreover be combated. The embodiment shown here differs from the example shown in FIGS. 21a and 21b in that on the inner surfaces of the side walls 124t and/or 126t there are ribs 152t and/or 154t, which extend in peripheral direction and against which the collars 138t and/or 140t are positively axially supported at least in the event of an overpressure in the chamber 34t. As is shown in FIG. 22a, the collars 138t and/or 140t at normal pressure are still spaced apart from the ribs 152t and/or 154t and come into contact with the ribs 152t and/or 154t only in the event of an overpressure. It is self-evident that also at normal pressure a contact between the collars 138t and/or 140t and the ribs 152t and/or 154t may already exist.

FIGS. 23a and 23b show a variation of the embodiment according to FIGS. 22a and 22b. The difference here is that the ribs 156u and/or 158u provided on the inner surfaces of the side walls 124u and/or 126u take the form of flat ribs. In this embodiment in the event of an overpressure in the chamber 34u the collars 138u and/or 140u are not supported in axial direction against the flat ribs 156u and/or 158u but are pushed in axial direction onto the flat ribs 156u and/or 158u, so that the collars 138u and 140u and/or their sealing lips 142u and 144u are pressed radially onto the flat ribs 156u and/or 158u. This embodiment is advantageous above all when a pressure regulation is to be effected while the vehicle is travelling. Thus, the frictional forces arising in the event of an overpressure in the chamber 34u between the sealing lips 142u and/or 144u and the flat ribs 156u and/or 158u are markedly lower than between the collars 138t and/or 140t and the ribs 152t and/or 154t according to the embodiment of FIGS. 22a and 22b.

Further embodiments are presented in FIGS. 24 to 26. These embodiments are fundamentally identical to those of FIGS. 21 to 23. One difference is however that the side walls 124v, 124w, 124x and/or 126v, 126w, 126x of the annular profiles 122v, 122w, 122x extend, not axially, but radially. The previous descriptions pertaining to FIGS. 21 to 23 therefore apply analogously to FIGS. 24 to 26, with the exception that the elements and/or features that were described above with an axial alignment are now to be denoted with a radial alignment, and the elements and/or features that were described above with a radial alignment are now to be denoted with an axial alignment.

It is self-evident that further variations of these embodiments are conceivable. In particular it is possible to combine further features that are known from the previously described embodiments according to FIGS. 3 to 17 with the embodiments of FIGS. 21 to 26. It is therefore feasible for example to make the collars of the sealing ring longer so that the collars project into annular grooves provided on the inner surfaces of the side walls of the annular profile. In the event of an overpressure in the annular chamber these collars are then pressed against the walls of the annular grooves.

Further advantageous embodiments of the described vehicle axle assemblies result from special configurations of the shaft sealing rings and/or sealing rings that are used.

In this respect FIGS. 27a and 27b again take up the example of the first-described vehicle axle assembly according to FIGS. 3a and 3b. The embodiment shown in FIGS. 27a and 27b differs from the example of FIGS. 3a and 3b in that the two shaft sealing rings 36y and 38y each have a core 160y and/or 162y made of a material that stiffens the shaft sealing rings 36y and 38y. The cores 160y and 162y lead to a strengthening and stabilizing of the shaft sealing rings 36y and 38y, including the collars 60y and 62y thereof, so that they are better able to withstand an overpressure in the chamber 34y and do not fold down.

The cores 160y and 162y may be configured for example as sheet metal rings that are embedded into the material of the shaft sealing rings 36y and 38y. In the illustrated example the cores 160y and 162y have an approximately L-shaped cross section, wherein in each case one L-limb extends axially inside the limb of the shaft sealing ring 36y and/or 38y that adheres radially outside by means of frictional locking to the hub 12y. The, in each case other, L-limb extends in substantially radial direction inside the side of the shaft sealing ring 36y and/or 38y facing the annular chamber 34y. The portions 164y and/or 166y of the cores 160y and 162y in the region of the collars 60y and 62y follow the shape of the collars 60y and 62y and extend in the direction of the axle body 14y slightly obliquely towards the annular chamber 34y.

The cores 160y and 162y illustrated by way of example here are of an integral construction, so that there is only a restricted mobility of the portions 164y and 166y relative to the remaining portions of the cores 160y and 162y. It is however perfectly possible to provide a material weakening, for example by means of thinner material or cutouts, in the region of the transition from the portions 164y and 166y to the adjoining portions of the cores 160y and 162y. The cores 160y and 162y may also be of a two-part construction, so that the portions 164y and 166y are separate from the adjoining portions of the cores 160y and 162y. In this way a pivotability of the portions 164y and 166y relative to the adjoining portions of the cores 160y and 162y may be realized, which in the event of an overpressure in the chamber 34y allows the collars 60y and 62y—despite the achieved stiffening—to deform more readily in order to come sealingly into contact with the lateral surface 58y of the axle body 14y.

Furthermore, the embodiment of FIGS. 27a and 27b differs from the example of FIGS. 3a and 3b in that the hollow spaces 168y and 170y, which are delimited by the substantially axially extending limbs of the shaft sealing rings 36y and 38y, are used as lubricant depots. For this purpose, the sides of the shaft sealing rings 36y and 38y remote from the annular chamber 34y are provided with covers 172y and/or 174y. The covers 172y and 174y may be realized for example in the form of annular spring steel sheets, which are clamped between the axially extending limbs of the shaft sealing rings 36y and 38y and hence close the hollow spaces 168y and 170y in an outward direction.

The dotted serpentines in the illustration of FIGS. 27a and 27b indicate that the hollow spaces 168y and 170y are filled with a lubricant. In order to enable lubricant that is situated in the hollow spaces 168y and 170y to reach the sealing surfaces of the shaft sealing rings 36y and 38y on the lateral surface 58y of the axle body 14y, channels 176y and/or 178y are provided, which extend out of the hollow spaces 168y and 170y in substantially radial direction through the limbs of the shaft sealing rings 36y and 38y that connect the collars 60y and 62y and the main sealing lips 50y and 52y of the shaft sealing rings 36y and 38y to one another. The hollow spaces 168y and 170y therefore serve as lubricant depots, which gradually release lubricant for lubricating and cooling the sealing surfaces of the shaft sealing rings 36y and 38y.

Finally in the illustrated embodiment, in contrast to the example of FIGS. 3a and 3b, two lines 180y and 182y are additionally provided, which connect the hollow space 168y of the axially inner shaft sealing ring 36y and the hollow space 170y of the axially outer shaft sealing ring 38y to one another. As is apparent, the lines 180y and 182y are run through connecting elements that couple the two shaft sealing rings 36y and 38y rigidly to one another. The lines 180y and 182y enable a transport of lubricant from one of the two hollow spaces 168y and 170y into the respective other one, so that the lubricant may be distributed to both hollow spaces 168y and 170y. If for example it is desired that lubricant is to be transported predominantly only from the shaft sealing ring 38y into the shaft sealing ring 36y, because for example only the hollow space 170y has been pre-filled with a lubricant, then—if the main direction of rotation of the shaft sealing rings 36y and 38y, viewed in drawing depth of FIGS. 27a and 27b, extends away from the viewer—the lines 180y and 182y may extend obliquely counter to the main direction of rotation, i.e. viewed in drawing depth of FIGS. 27a and 27b may come from the shaft sealing ring 38y to the shaft sealing ring 36y gradually towards the viewer.

The use of the covers 172y and 174y, particularly in the form of a realization by means of annular spring steel sheets, offers the added advantage of making it possible to dispense with the tubular springs 54y and 56y of the shaft sealing rings 36y and 38y because the application force, which is generated by the tubular springs 54y and 56y and presses the main sealing lips 50y and 52y against the lateral surface 58y of the axle body 14y, may alternatively be applied by the covers 172y and 174y.

A particularly advantageous embodiment is illustrated in FIGS. 28a and 28b. The embodiment shown there differs from the example of FIGS. 27a and 27b substantially in that the two shaft sealing rings 36z and 38z have a—compared to the shaft sealing rings 36y and 38y-mirror-inverted cross section and are locked against rotation relative to the axle body 14z. Also, the first pressure medium line 28z extends through the inner shaft sealing ring 36z before opening out into the annular chamber 34z. As such a configuration of the inner shaft sealing ring 36z is described already in the example of FIGS. 7a and 7b, reference may be made to the descriptions there. The configuration of the inner shaft sealing ring 36z described there is moreover to be translated analogously to the axially outer shaft sealing ring 38z. The first pressure medium line 28z in the present case extends through the cover 172z.

The features described with reference to FIGS. 27a and 27b are substantially to be found again in the embodiment of FIGS. 28a and 28b, only in each case in a mirror-inverted form. To this extent reference is made to the above descriptions pertaining to FIGS. 27a and 27b, with the exception that the elements and/or features that were described above with a radially outer alignment now have a radially inner alignment, and the elements and/or features that were described above with a radially inner alignment now have a radially outer alignment. It is equally self-evident that wording that refers to the axle body 14y and/or the lateral surface 58y of the axle body 14y relates here to the hub 12z and/or the inner surface 80z of the hub 12z.

A fundamental difference from the embodiment according to FIGS. 27a and 27b is that the outer shaft sealing ring 38z in the example illustrated here has no cover, so that the hollow space 170z in axial direction is open in an outward direction. Such an arrangement enables lubricant, which is situated in the space of a ball bearing 184z disposed adjacent to the outer shaft sealing ring 38z, to pass into the hollow space 170z and, from there, through the channel 178z to the sealing surfaces of the shaft sealing ring 38z on the inner surface 80z of the hub 12z. Equally, the lubricant may pass out of the ball bearing 184z through the lines 180z and 182z into the hollow space 168z of the inner shaft sealing ring 36z and, from there, through the channel 176z to the sealing surfaces of the shaft sealing ring 36z on the inner surface 80z of the hub 12z.

It is self-evident that, in this embodiment too, the shaft sealing ring 38z may be equipped with a cover that closes the hollow space 170z in order to form a lubricant depot in the hollow space 170z. It is also conceivable to mount such a cover but provide it with one or more through-openings that allow the lubricant from the ball bearing 184z to enter further into the hollow space 170z.

Such a situation is represented in the example of FIGS. 29a and 29b. The cover 174za shown here is provided with a through-opening, through which lubricant situated in the ball bearing 184za may enter into the hollow space 170za. The cover 174za therefore substantially has the design purpose of making the tubular spring 56za of the shaft sealing ring 38za dispensable, because the application force that presses the main sealing lip 52za against the inner surface 80za of the hub 12za may be applied by the cover 174za. It is therefore possible to dispense with the tubular spring 56za.

Apart from this aspect, the embodiment of FIGS. 29a and 29b differs from the example of FIGS. 28a and 28b also in that the two shaft sealing rings 36za and 38za are cast as a unit and the two hollow spaces 168za and 170za are connected to one another solely by a single line 180za. The line 180za here is run through the portion that connects the two shaft sealing rings 36za and 38za to one another.

The example of FIGS. 29a and 29b moreover differs from the example of FIGS. 28a and 28b substantially in that in the hollow spaces 168za and 170za there are sponge-like foam materials 179za and/or 181za, which fill part of the hollow spaces 168za and 170za and cover inlet openings of the channels 176za and 178za. The foam materials 179za and/or 181za have closing surfaces, which extend in axial direction and are situated radially above the inlet- and/or outlet openings of the line 180za. Lubricant situated in the foam-material-free parts of the hollow spaces 168za and 170za may therefore flow unimpeded through the line 180za. The foam materials 179za and/or 181za ensure that lubricant situated in the hollow spaces 168za and 170za does not flow off directly through the channels 176za and 178za but is first absorbed by the foam materials 179za and/or 181za and stored before then being released gradually into the channels 176za and 178za. In the illustrated example the channels 176za and 178za are also filled with sponge-like foam materials, this however not being absolutely necessary. Sponge-like foam materials 183za and/or 185za are moreover disposed in the intermediate spaces between the collars 60za and 62za and/or their sealing lips 64za and 66za, the main sealing lips 50za and 52za and the hub 12za. Lubricant that passes out of the hollow spaces 168za and 170za through the channels 176za and 178za into these intermediate spaces is absorbed by the foam materials 183za and/or 185za and then distributed thereby uniformly to the sealing surfaces of the shaft sealing rings 36za and 38za on the inner surface 80za of the hub 12za.

It is clear to a person skilled in the art that the features described with reference to FIGS. 27 to 29 may be combined in any desired manner with one another and are equally also applicable to the other embodiments of the described vehicle axle assembly. It is therefore feasible for example in the embodiments described with reference to FIGS. 3 to 20 also to provide corresponding stiffenings in the shaft sealing rings or to equip the shaft sealing rings with lubricant depots and/or sponge-like foam materials in the hollow spaces thereof.

The embodiments shown in FIGS. 28 and 29 are particularly advantageous in situations where, for spatial reasons, design limits are set on the vehicle axle assembly. For example, it may be that the material thickness of the axle body is not sufficient to run the first pressure medium line therein. The illustrated embodiments circumvent this problem in that they allow the first pressure medium line 28z and/or 28za to run through the shaft sealing ring 36z and/or 36za into the annular chamber 34z and/or 34za. As the collars 60z and 62z and/or 60za and 62za of both shaft sealing rings 36z and 38z and/or 36za and 38za are disposed radially outside, these arrangements manage with a minimal axial spatial requirement. When pressure is fed through the first pressure medium line 28z and/or 28za, the collars 60z and 62z and/or 60za and 62za are namely pressed apart from one another because the admission of the pressure medium is effected from the interior of the annular chamber 34z and/or 34za. The two shaft sealing rings 36z and 38z and/or 36za and 38za may therefore easily be disposed so closely adjacent to one another that their collars 60z and 62z and/or 60za and 62za are in mutual contact when normal pressure prevails in the chamber 34z and/or 34za.

FIGS. 30 to 32, a description of which now follows, take up again the vehicle axle assembly that suffices with only one sealing ring and extend the embodiments of FIGS. 21 to 26 in the sense of the features just described with reference to FIGS. 27 and 29.

FIGS. 30a and 30b extend the embodiment of FIGS. 21a and 21b. This example differs from the example of FIGS. 21a and 21b in that the sealing ring 128zb has a core 186zb made of a material that stiffens the sealing ring 128zb. The core 186zb strengthens and stabilizes the sealing ring 128zb, including the collars 138zb and 140zb thereof, so that they are better able to withstand an overpressure in the chamber 34zb.

The core 186zb may be realized for example by means of a sheet metal ring that is embedded into the material of the sealing ring 128zb. In the illustrated example the core 186zb extends substantially parallel to the side of the sealing ring 128zb facing the annular chamber 34zb. The portions 188zb and/or 190zb of the core 186zb in the region of the collars 138zb and 140zb follow the shape of the collars 138zb and 140zb and extend in the direction of the side walls 124zb and 126zb of the annular profile 122zb slightly obliquely towards the annular chamber 34zb.

The core 186zb shown here by way of example is of an integral construction, so that there is only a restricted mobility of the portions 188zb and 190zb relative to the adjoining portions of the core 186zb. It is however perfectly possible to provide in each case a material weakening, for example by using thinner material or by providing cutouts, in the region of the transition from the portions 188zb and 190zb to the adjoining portions of the core 186zb. The core 186zb may also be of a three-part construction, so that the portions 188zb and 190zb are separate from the adjoining portions of the core 186zb. In this way a pivotability of the portions 188zb and 190zb relative to the adjoining portions of the core 186zb may be realized, which in the event of an overpressure in the chamber 34zb allows the collars 138zb and 140zb—despite the stiffening—to deform more readily in order to come sealingly into contact with the side walls 124zb and 126zb of the annular profile 122zb.

The embodiment of FIGS. 30a and 30b moreover differs from that of FIGS. 21a and 21b in that the hollow space 192zb that is formed by the substantially axially extending limbs of the sealing ring 128zb is used as a lubricant depot. For this purpose the sides of the sealing ring 128zb remote from the annular chamber 34zb are provided with a cover 194zb. The cover 194zb may be realized for example in the form of an annular spring steel sheet, which is clamped between the axially extending limbs of the sealing ring 128zb and hence closes the hollow space 192zb in an outward direction. The first pressure medium line 28zb then extends through the cover 194zb. It is self-evident that, given such an arrangement, it is also possible to dispense with the tubular springs 134zb and 136zb of the sealing ring 128zb, because the application force, which is generated by the tubular springs 134zb and 136zb and presses the main sealing lips 130zb and 132zb against the side walls 124zb and 126zb of the annular profile 122zb, may alternatively be applied by the cover 194zb.

The dotted serpentines in the representation of FIGS. 30a and 30b indicate that the hollow space 192zb is filled with a lubricant. In order that lubricant situated disposed in the hollow space 192zb may reach the sealing surfaces of the sealing ring 128zb on the side walls 124zb and 126zb of the annular profile 122zb, channels 196zb and/or 198zb are provided, which extend out of the hollow space 192zb in substantially radial direction through the limbs of the sealing ring 128zb that connect the collars 138zb and 140zb and the main sealing lips 130zb and 132zb of the sealing ring 128zb to one another. The hollow space 192zb therefore serves as a lubricant depot, which gradually releases lubricant for lubricating and cooling the sealing surfaces of the sealing ring 128zb through the channels 196zb and 198zb.

What the embodiments of FIGS. 21 to 26 and 30 have in common is that the annular chamber is formed in each case inside the side walls of the annular profile that is connected to the hub. It is evident from the figures that a sealing between the axle body and the hub is not guaranteed by the annular profile alone. In order to prevent dust and dirt particles from penetrating into a ball bearing disposed adjacent to the annular profile and to prevent lubricant from escaping from the ball bearing, additional shaft sealing rings may be disposed axially inside or axially outside of the annular profile.

A possible embodiment, in which the mounting of additional shaft sealing rings may be avoided, is represented in FIGS. 31a and 31b. The example shown there is similar to the embodiment of FIGS. 30a and 30b and differs only in that the radially inner side wall 126zc of the annular profile 122zc is shorter than the radially outer side wall 124zc, so that the radially inner main sealing lip 132zc of the sealing ring 128zc is in contact with the axle body 14zc. The main sealing lip 132zc is pressed against the axle body 14zc by the application force generated by the tubular spring 136zc and/or by the cover 194zc and therefore effects a sealing between the axle body 14zc and the hub 12zc. Upon a rotation of the hub 12zc about the axle body 14zc the main sealing lip 132zc slides over the lateral surface 58zc of the axle body 14zc. It is self-evident that the hollow space 192zc formed by the sealing ring 128zc in this case need not be filled with lubricant, because lubricant that is situated in the space of a ball bearing 200zc disposed adjacent to the annular profile 122zc may pass into the hollow space 192zc before then being distributed from there to the sealing surfaces of the sealing ring 128zc.

FIGS. 32a and 32b finally show a development of the embodiment of FIGS. 31a and 31b. This example differs from the previous example in that in the hollow space 192zd there is a sponge-like foam material 202zd, which fills part of the hollow space 192zd and overlaps the channels 196zd and 198zd. The foam material 202zd has a radially extending closing surface and primarily ensures that lubricant situated in the foam-material-free part of the hollow space 192zd is not able to flow off unimpeded through the channels 196zd and 198zd but is first absorbed by the foam material 202zd and stored before then being gradually released into the channels 196zd and 198zd. In the illustrated embodiment the channels 196zd and 198zd are also filled with sponge-like foam material, this however not being absolutely necessary. Sponge-like foam materials 204zd and 206zd are moreover disposed in the intermediate spaces between the collars 138zd and/or 140zd, the main sealing lips 130zd and/or 132zd, and the side walls 124zd and 126zd of the annular profile 122zd. Lubricant which passes out of the hollow space 192zd through the channels 196zd and 198zd into these intermediate spaces is absorbed by the foam materials 204zd and 206zd and then uniformly distributed thereby to the sealing surfaces of the sealing ring 128zd on the side walls 124zd and 126zd of the annular profile 122zd.

It is clear to a person skilled in the art that the features described with reference to FIGS. 30 to 32 are equally applicable to the other embodiments of the described vehicle axle assembly. For the embodiments of FIGS. 22 and 23 also, it is therefore possible to provide stiffenings in the sealing rings or to equip the sealing rings with lubricant depots and sponge-like material in the hollow spaces thereof. The same applies to the embodiments of FIGS. 24 to 26, with the exception that the elements and/or features that were described above with an axial alignment are now to be denoted with a radial alignment, and the elements and/or features that were described above with a radial alignment and now to be denoted with an axial alignment.

The invention claimed is:

1. A vehicle axle assembly, comprising:
    a hub, which is mounted on a cylindrical axle body so that it can rotate about a central longitudinal axis;
    an axially inner shaft sealing ring and an axially outer shaft sealing ring for indirect or direct sealing between the axle body and the hub;
    an annular chamber that is formed between the two shaft sealing rings, the axle body and the hub;
    a first pressure medium line that extends through the axle body or one of the two shaft sealing rings and opens out into the annular chamber; and
    a second pressure medium line that extends out of the annular chamber through the hub and is designed to be connected to a wheel that is secured on the hub,
    wherein at least one of the shaft sealing rings adjacent to the annular chamber is provided radially inside or radially outside with a collar, and
    wherein at least one of the shaft sealing rings has at least one channel, which extends out of an inner hollow space of the shaft sealing ring in a substantially radial direction to a lateral portion of the shaft sealing ring that is situated in a region between the collar and a main sealing lip of the shaft sealing ring.

2. The vehicle axle assembly according to claim 1, wherein the collar has a sealing lip, which at least in an event of an overpressure in the chamber is in contact with the axle body and/or the hub.

3. The vehicle axle assembly according to claim 1, wherein on a lateral surface of the axle body opposite a radially inner collar there is an annular groove, into which the collar radially projects.

4. The vehicle axle assembly according to claim 1, wherein on an inner surface of the hub opposite a radially outer collar there is an annular groove, into which the collar radially projects.

5. The vehicle axle assembly according to claim 1, wherein on a lateral surface of the axle body there is a rib, which extends in a peripheral direction and against which a radially inner collar is axially supported at least in an event of an overpressure in the chamber.

6. The vehicle axle assembly according to claim 5, wherein on an inner surface of the hub there is a rib, which extends in a peripheral direction and against which a radially outer collar is axially supported at least in an event of an overpressure in the chamber.

7. The vehicle axle assembly according to claim 5, wherein the rib is formed integrally with the axle body or the hub.

8. The vehicle axle assembly according to claim 5, wherein the rib is formed by a retaining ring or O-ring that is inserted into a groove.

9. The vehicle axle assembly according to claim 5, wherein the rib has a substantially rectangular cross section.

10. The vehicle axle assembly according to claim 5, wherein at least one of a radially inner collar and a radially outer collar has a sealing lip, wherein the sealing lip of the radially inner collar at least in the event of an overpressure in the chamber is in contact with the axle body or the rib, and wherein the sealing lip of the radially outer collar at least in the event of an overpressure in the chamber is in contact with the hub or the rib.

11. The vehicle axle assembly according to claim 1, wherein on an inner surface of the hub there is a rib, which extends in a peripheral direction and against which a radially outer collar is axially supported at least in an event of an overpressure in the chamber.

12. The vehicle axle assembly according to claim 1, wherein between the two shaft sealing rings on the lateral surface of the axle body an annular flange with two flexible, radial side walls is mounted, wherein the first pressure medium line opens out in the annular flange between the two side walls into the annular chamber.

13. The vehicle axle assembly according to claim 12, wherein on an inner surface of the hub opposite the annular flange a ring with a U-shaped cross section is fastened, the side walls of which are directed radially inwards, and the second pressure medium line extends through the ring between the side walls thereof into the hub.

14. The vehicle axle assembly according to claim 1, wherein the two shaft sealing rings are coupled axially rigidly to one another.

15. The vehicle axle assembly according to claim 1, wherein the two shaft sealing rings are coupled axially flexibly to one another.

16. The vehicle axle assembly according to claim 1, wherein at least one of the two shaft sealing rings is integrated into a ball bearing, which is disposed between the axle body and the hub.

17. The vehicle axle assembly according to claim 1, wherein a valve is provided for pressure relief of the annular chamber.

18. The vehicle axle assembly according to claim 1, wherein at least one of the shaft sealing rings, in the region of the collar, has a core made of a material that stiffens the shaft sealing ring.

19. The vehicle axle assembly according to claim 18, wherein a portion of the core that is disposed in the region of the collar is pivotable relative to the rest of the core.

20. The vehicle axle assembly according to claim 1, wherein the hollow space at the side of the shaft sealing ring remote from the annular chamber is provided with a cover.

21. The vehicle axle assembly according to claim 20, wherein the hollow space is filled with a lubricant.

22. The vehicle axle assembly according to claim 1, wherein in the hollow space there is a sponge-like foam material, which fills at least part of the hollow space and overlaps an inlet opening of the at least one channel.

23. The vehicle axle assembly according to claim 1, wherein an intermediate space between the collar and the main sealing lip is filled at least partially with a sponge-like foam material.

24. The vehicle axle assembly according to claim 1, wherein an inner hollow space of the axially inner shaft sealing ring and an inner hollow space of the axially outer shaft sealing ring are connected to one another by at least one line.

25. The vehicle axle assembly according to claim 24, wherein the line ascends radially from one shaft sealing ring in the direction of the other shaft sealing ring and/or extends obliquely counter to a main direction of rotation of the hub.

26. A vehicle axle assembly, comprising:
a hub, which is mounted on a cylindrical axle body so that it can rotate about a central longitudinal axis;
an annular profile with a U-shaped cross section, which is connected to an inner surface of the hub and the side walls of which extend axially or radially;
a sealing ring, which is disposed between the side walls, is locked against rotation relative to the axle body and in the annular profile delimits an annular chamber;
a first pressure medium line, which extends through the sealing ring and opens out into the annular chamber; and
a second pressure medium line, which extends out of the annular chamber through the annular profile and the hub and is designed to be connected to a wheel that is secured on the hub,
wherein the sealing ring has at least one channel, which extends out of an inner hollow space of the sealing ring in a case of an annular profile with axially extending side walls in substantially radial direction and in a case of an annular profile with radially extending side walls in substantially axial direction to a lateral portion of the sealing ring that is situated in a region between a collar and a main sealing lip of the sealing ring.

27. The vehicle axle assembly according to claim 26, wherein the annular profile is formed integrally with the hub.

28. The vehicle axle assembly according to claim 26, wherein a bracket is provided, which in the case of an annular profile with axially extending side walls fixes the axial position of the sealing ring and in the case of an annular profile with radially extending side walls fixes the radial position of the sealing ring.

29. The vehicle axle assembly according to claim 26, wherein in the case of an annular profile with axially extending side walls the sealing ring adjacent to the annular chamber is provided radially inside and radially outside with a collar, and that in the case of an annular profile with radially extending side walls the sealing ring adjacent to the annular chamber is provided axially inside and axially outside with a collar.

30. The vehicle axle assembly according to claim 29, wherein in the case of an annular profile with axially extending side walls there is on the side walls of the annular profile a support structure, against which the radially inner and the radially outer collar are axially supported at least in the event of an overpressure in the chamber, and that in the case of an annular profile with radially extending side walls there is on the side walls of the annular profile a support structure, against which the axially inner and the axially outer collar are radially supported at least in the event of an overpressure in the chamber.

31. The vehicle axle assembly according to claim 29, wherein the sealing ring, in the region of at least one of the two collars, has a core made of a material that stiffens the sealing ring.

32. The vehicle axle assembly according to claim 31, wherein a portion of the core that is disposed in the region of a collar is pivotable relative to the rest of the core.

33. The vehicle axle assembly according to claim 26, wherein the hollow space at the side of the sealing ring remote from the annular chamber is provided with a cover.

34. The vehicle axle assembly according to claim 33, wherein the hollow space is filled with a lubricant.

35. The vehicle axle assembly according to claim 26, wherein in the hollow space there is a sponge-like foam material, which fills at least part of the hollow space and overlaps an inlet opening of the at least one channel.

36. The vehicle axle assembly according to claim 26, wherein an intermediate space between the collar and the main sealing lip is filled at least partially with a sponge-like foam material.

* * * * *